US012710668B2

(12) United States Patent
Back et al.

(10) Patent No.: US 12,710,668 B2
(45) Date of Patent: Aug. 18, 2026

(54) OPHTHALMIC LENSES UTILIZING BINARY AMPLITUDE MODULATION

(71) Applicant: Brien Holden Vision Institute Limited, Sydney (AU)

(72) Inventors: Arthur Back, Danville, CA (US); Ravi Chandra Bakaraju, Sydney (AU)

(73) Assignee: Brien Holden Vision Institute Limited, Sydney (AU)

( * ) Notice: Subject to any disclaimer, the term of this patent is extended or adjusted under 35 U.S.C. 154(b) by 332 days.

(21) Appl. No.: 18/566,435

(22) PCT Filed: Jun. 3, 2022

(86) PCT No.: PCT/IB2022/055184
§ 371 (c)(1),
(2) Date: Dec. 1, 2023

(87) PCT Pub. No.: WO2022/254389
PCT Pub. Date: Dec. 8, 2022

(65) Prior Publication Data

US 2024/0264467 A1 Aug. 8, 2024

Related U.S. Application Data

(60) Provisional application No. 63/196,476, filed on Jun. 3, 2021.

(51) Int. Cl.

| | |
|---|---|
| ***G02C 7/02*** | (2006.01) |
| ***G02C 7/04*** | (2006.01) |
| ***G02C 7/06*** | (2006.01) |

(52) U.S. Cl.
CPC ............. *G02C 7/041* (2013.01); *G02C 7/021* (2013.01); *G02C 7/06* (2013.01); *G02C 2202/24* (2013.01)

(58) Field of Classification Search
CPC ........................................................ G02C 7/021
USPC ....................................................... 351/159.79
See application file for complete search history.

(56) References Cited

U.S. PATENT DOCUMENTS

| | | | |
|---|---|---|---|
| 5,260,727 A | 11/1993 | Oksman et al. | |
| 5,662,706 A | 9/1997 | Legerton et al. | |
| 5,965,330 A | 10/1999 | Evans et al. | |
| 2006/0034003 A1 | 2/2006 | Zalevsky | |
| 2008/0221674 A1* | 9/2008 | Blum ........................ | G02C 7/04 623/5.11 |
| 2014/0277432 A1 | 9/2014 | Silvestrini | |

(Continued)

FOREIGN PATENT DOCUMENTS

WO WO 2020/261213 12/2020

OTHER PUBLICATIONS

International Search Report for PCT/IB2022/055184 dated Aug. 3, 2022.
Written Opinion for PCT/IB2022/055184 dated Aug. 3, 2022.

*Primary Examiner* — Darryl J Collins
(74) *Attorney, Agent, or Firm* — Jones Day

(57) ABSTRACT

An ophthalmic lens for myopia control comprising patterns or masks which block and/or attenuate light (e.g., by amplitude modulation). The amplitude modulation may be binary, for example, where zero amplitude means absorption or blocking of light and a value of one means that light may be transmitted through the lens without change (e.g., without significant change). Alternatively, in some embodiments, the amplitude modulation may not be binary.

19 Claims, 70 Drawing Sheets

(56) References Cited

U.S. PATENT DOCUMENTS

| | | | | |
|---|---|---|---|---|
| 2017/0146820 | A1 | 5/2017 | Brennan | |
| 2018/0095296 | A1* | 4/2018 | Lin | G02C 7/16 |
| 2018/0373059 | A1 | 12/2018 | Lin et al. | |
| 2019/0212583 | A1* | 7/2019 | Wu | G02C 7/105 |
| 2019/0235279 | A1 | 8/2019 | Chalberg et al. | |
| 2019/0314146 | A1 | 10/2019 | Vilupuru | |
| 2021/0165244 | A1* | 6/2021 | Hones | G02C 7/165 |
| 2022/0011602 | A1* | 1/2022 | Chalberg, Jr. | G02C 7/06 |
| 2023/0176399 | A1* | 6/2023 | Bakaraju | G02C 7/021 351/159.69 |

* cited by examiner

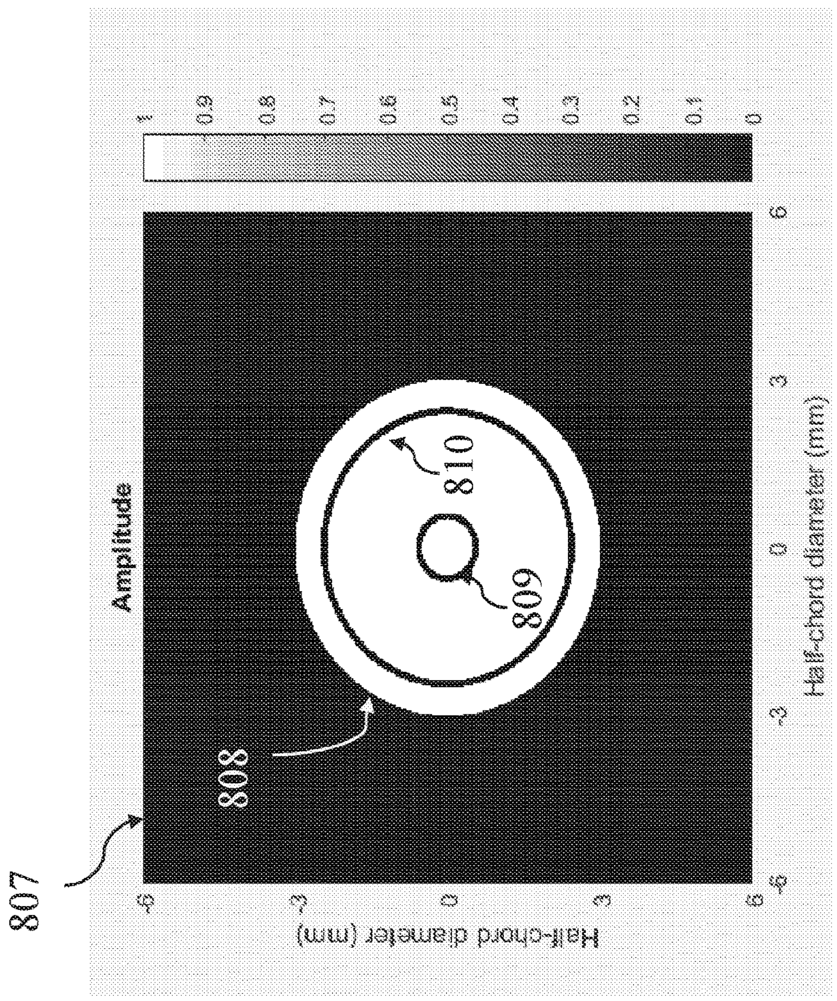
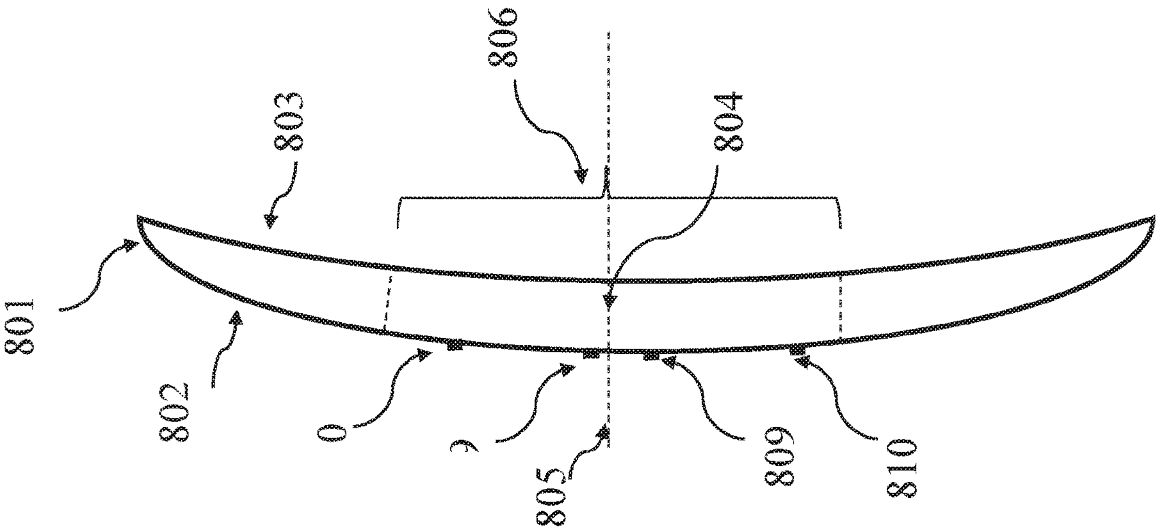
FIGURE 8A

FIGURE 14. is a schematic diagram representing emmetropic model eye. The incoming, monochromatic (nm) light has a vergence of zero diopters.
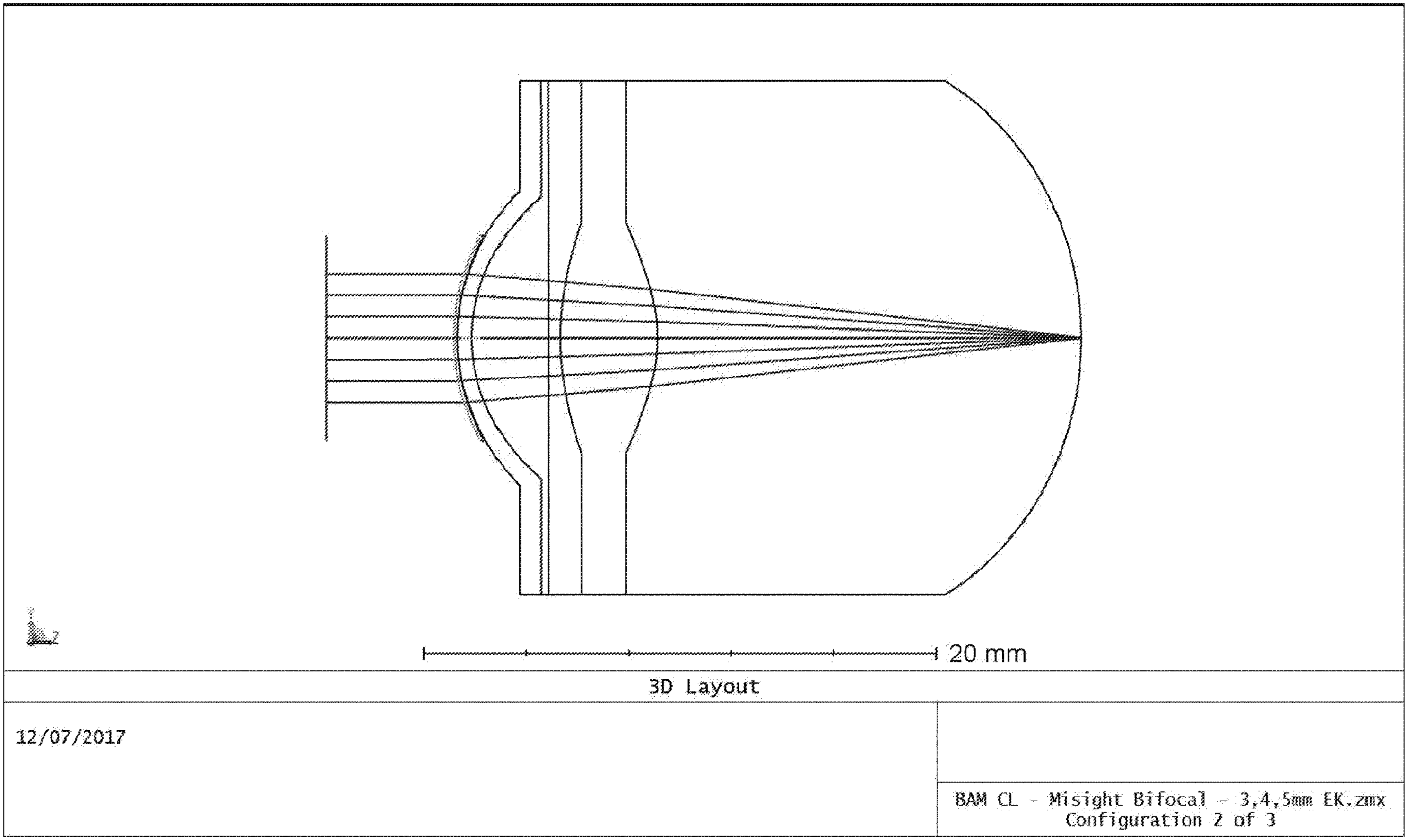

Results - Misight Transmission Plot and MTF

Results - Misight Transmission Plot and MTF

Results - Misight Transmission Plot and MTF

| | | | | | |
|---|---|---|---|---|---|
| r1 Rad: v | 0.064019 | r2 Rad: v | 0.939 | r3 Rad: v | 1.752 |
| r1 Thick: v | 0.156686 | r2 Thick: v | 0.227798 | r3 Thick: v | 0.436323 |

Results - 3 Rings testCase5 – Transmission Plot and MTF

Results - 3 Rings testCase5 – Transmission Plot and MTF

Results - 3 Rings testCase5 – Transmission Plot and MTF

20/07/2017

BAM CL Misight Bifocal - 3,4,5mm EK.zmx
Configuration 3 of 3

| | | | | | | | | | |
|---|---|---|---|---|---|---|---|---|---|
| r1 Rad: | 0.1 | r2 Rad: | 0.5 | r3 Rad: | 1.0 | r4 Rad: | 1.5 | r5 Rad: | 2.0 |
| r1 Thick: | 0.119 | r2 Thick: | 0.119 | r3 Thick: | 0.134 | r4 Thick: | 0.241 | r5 Thick: | 0.340 |

Results - 5 Rings testCase2 – Transmission Plot and MTF

Results - 5 Rings testCase2 – Transmission Plot and MTF

Results - 5 Rings testCase2 – Transmission Plot and MTF

| | | | |
|---|---|---|---|
| r1 Rad: | 1.0 | r2 Rad: | 1.5 |
| r1 Thick | 0.305 | r2 Thick: | 0.885 |

2 Rings testCase7 – Transmission Plot and MTF

2 Rings testCase7 – Transmission Plot and MTF

2 Rings testCase7 – Transmission Plot and MTF

26/07/2017

BAM CL Misight Bifocal - 3,4,5mm EK.zmx
Configuration 3 of 3

| | | | | | | | | | |
|---|---|---|---|---|---|---|---|---|---|
| r1 Rad: | 0.10 | r2 Rad: | 0.30 | r3 Rad: | 0.50 | r4 Rad: | 0.70 | r5 Rad: | 0.90 |
| r1 Thick: v | 0.055508 | r2 Thick: | 0.05 | r3 Thick: v | 0.047223 | r4 Thick: | 0.05 | r5 Thick: v | 0.061985 |
| r6 Rad: | 1.10 | r7 Rad: | 1.30 | r8 Rad: | 1.50 | r9 Rad: | 1.60 | r10 Rad: | 1.70 |
| r6 Thick: | 0.05 | r7 Thick: v | 0.089992 | r8 Thick: | 0.05 | r9 Thick: v | 0.099293 | r10 Thick: | 0.05 |
| r11 Rad: | 1.80 | r12 Rad: | 1.90 | r13 Rad: | 2.00 | r14 Rad: | 2.10 | r15 Rad: | 2.20 |
| r11 Thick: v | 0.074985 | r12 Thick: | 0.05 | r13 Thick: v | 0.100824 | r14 Thick: | 0.05 | r15 Thick: v | 0.138195 |

Results – 15 Rings testCase8 – Transmission Plot and MTF

Results – 15 Rings testCase8 – Transmission Plot and MTF

Results – 15 Rings testCase8 – Transmission Plot and MTF

Modulus of the OTF
1.0
0.8
0.6
0.4
0.2
0
0
0.69
1.38
2.07
2.76
3.45
4.14
4.83
5.52
6.23
6.9
Angular Frequency in cycles per mr
0.0000 (deg)-Tangential
0.0000 (deg)-Sagittal
Diffraction MTF
Data for 0.5890 µm.
Surface: Image (Retina)
Legend items refer to Field positions

FIGURE 20C

| FIG. 20C | | testcase3 | | | |
|---|---|---|---|---|---|
| Misght Bifocal - 5mm EK v3 08122017.zmx | | | | | |
| Variables: | 3 | Initial MF: | 0.4526 6976 | Current MF: | 0.14357989 |
| Targets: | 261 | Time (min): | 15.72 | | |
| Mode: | 1 | | | | |
| NumTerms: | 3 | | | | |
| Length: | 1.00 | | | | |
| 1:sin(1) | 3.11E-05 | | | | |
| 2:sin(2) | 3.30E-05 | | | | |
| 3:sin(3) | 8.27E-05 | | | | |

FIGURE 21C

| FIG. 21C | testcase7 | | | | |
|---|---|---|---|---|---|
| Misght Bifocal - 5mm EK v3 08122017.zmx | | | | | |
| Variables: | 3 | Initial MF: | 0.45266976 | Current MF: | 0.13582217 |
| Targets: | 261 | Time (min): | 49.53 | | |
| Mode: | 2 | | | | |
| NumTerms: | 3 | | | | |
| Length: | 0.20 | | | | |
| 1:sin(1) | -2.43E-05 | | | | |
| 2:sin(2) | -3.16E-03 | | | | |
| 3:sin(4) | -3.22E-03 | | | | |

| testcase9 | | | | | |
|---|---|---|---|---|---|
| Misght Bifocal - 5mm EK v3 08122017.zmx | | | | | |
| **Variables:** | 7 | **Initial MF:** | 0.452669<br>76 | **Current MF:** | 0.12990765 |
| **Targets:** | 261 | **Time (min):** | 1.67 hrs | | |
| **Mode:** | 2 | | | | |
| **NumTerms:** | 7 | | | | |
| **Length:** | 0.40 | | | | |
| **1:sin(1)** | 5.91E-05 | **6:sin(32)** | -1.23E-04 | | |
| **2:sin(2)** | 5.01E-05 | **7:sin(64)** | 1.83E-05 | | |
| **3:sin(4)** | 8.88E-06 | | | | |
| **4:sin(8)** | 1.48E-05 | | | | |
| **5:sin(16)** | -5.65E-05 | | | | |

| FIG. 23C | testcase1 | | | | |
|---|---|---|---|---|---|
| Misght Bifocal - 5mm EK v3 08122017.zmx | | | | | |
| **Variables:** | 10 | **Initial MF:** | 0.19081971 | **Current MF:** | 0.09929833 |
| **Targets:** | 261 | **Time (min):** | 57.1 | | |
| **NormRadius** | 4 | | | | |
| **NumTerms** | 10 | | | | |
| **IsobarPitch** | 0.50 | | | | |
| **IsobarThick** | 0.50 | | | | |
| Z(0) | -3.02E-04 | Z(6) | -1.80E-02 | | |
| Z(1) | 6.63E-02 | Z(7) | 1.09E-04 | | |
| Z(2) | 6.36E-02 | Z(8) | -4.45E-05 | | |
| Z(3) | -3.63E-02 | Z(9) | -1.53E-02 | | |
| Z(4) | 9.95E-02 | Z(10) | | | |
| Z(5) | -1.05E-02 | Z(11) | | | |

FIGURE 24C

| FIG. 24C | | testcase9 | | | |
|---|---|---|---|---|---|
| Misght Bifocal - 5mm EK v3 08122017.zmx | | | | | |
| **Variables:** | 6 | **Initial MF:** | 0.19081971 | **Current MF:** | 0.16295166 |
| **Targets:** | 261 | **Time (min):** | 48.3 | **f** | |
| **NormRadius** | 4 | | | | |
| **NumTerms** | 15 | | | | |
| **IsobarPitch** | 0.60 | | | | |
| **IsobarThick** | 2.00E-01 | | | | |
| Z(0) | | Z(6) | | Z(12) | -3.66E-04 |
| Z(1) | | Z(7) | | Z(13) | -2.64E-03 |
| Z(2) | | Z(8) | | Z(14) | |
| Z(3) | -2.27E-03 | Z(9) | | Z(15) | |
| Z(4) | -8.25E-06 | Z(10) | | Z(16) | |
| Z(5) | -5.98E-04 | Z(11) | -7.50E-05 | Z(17) | |

FIGURE 25C

| FIG. 25C | | testcase11 | | | |
|---|---|---|---|---|---|
| Misght Bifocal - 5mm EK v3 08122017.zmx | | | | | |
| **Variables:** | 23 | **Initial MF:** | 0.19081971 | **Current MF:** | 0.09066014 |
| **Targets:** | 261 | **Time (min):** | 55.39 | | |
| **NormRadius** | 4 | | | **Z(40)** | 0.000 |
| **NumTerms** | 45 | | | **Z(41)** | 1.31E-07 |
| **IsobarPitch** | 0.10 | | | **Z(42)** | 1.51E-08 |
| **IsobarThick** | 2.00E-01 | **Z(44)** | 4.46E-06 | **Z(43)** | 5.56E-08 |
| Z(3) | **1.47E-04** | Z(13) | **8.53E-07** | Z(26) | **2.43E-07** |
| Z(4) | **-3.74E-05** | Z(14) | 1.73E-06 | Z(27) | 5.64E-06 |
| Z(5) | **-3.73E-04** | Z(22) | 5.02E-06 | Z(36) | 4.05E-06 |
| Z(10) | **-2.27E-04** | Z(23) | 0.0000015 | Z(37) | 2.93E-07 |
| Z(11) | **-4.90E-06** | Z(24) | -0.0000007 | Z(38) | 3.46E-08 |
| Z(12) | **-1.91E-06** | Z(25) | -0.0000001 | Z(39) | -9.83E-09 |

FIGURE 26

| testcase4 | | | | | |
|---|---|---|---|---|---|
| **Misght Bifocal - 5mm EK v3 08122017.zmx** | | | | | |
| **Variables:** | 21 | **Initial MF:** | 0.19081971 | **Current MF:** | 0.05512701 |
| **Targets:** | 261 | **Time (min):** | | **1.01** | f |
| **NormRadius** | 4 | | | **Z(18)** | 0.000 |
| **NumTerms** | 16 | | | **Z(19)** | 3.96E-05 |
| **IsobarPitch** | 0.70 | | | **Z(20)** | -1.56E-03 |
| **IsobarThick** | 5.00E-01 | | | | |
| Z(0) | 1.04E-01 | Z(6) | -8.22E-05 | Z(12) | -2.19E-03 |
| Z(1) | -4.60E-04 | Z(7) | 4.07E-05 | Z(13) | -3.86E-03 |
| Z(2) | 5.71E-04 | Z(8) | 4.58E-03 | Z(14) | 1.54E-03 |
| Z(3) | 6.42E-04 | Z(9) | -8.96E-04 | Z(15) | -1.23E-02 |
| Z(4) | 1.18E-03 | Z(10) | -2.64E-05 | Z(16) | -7.47E-04 |
| Z(5) | -9.14E-06 | Z(11) | -1.26E-03 | Z(17) | |

2900
2901
2902
2903
2904
29A-1
29A-2
2910
2911
2912
29A-3
2913
2914
2915
2925
2926
2927
2928
2930
29C-1
29C-2
29C-3
29C-4
29C-5
29C-6
29C-7
29C-8
9.08E-01
8.17E-01
7.27E-01
6.36E-01
5.45E-01
4.54E-01
3.63E-01
2.72E-01
1.82E-01
9.08E-02
0.00E+00

OPHTHALMIC LENSES UTILIZING BINARY AMPLITUDE MODULATION

CROSS-REFERENCE TO RELATED APPLICATIONS

This application is the National Phase application of International Application No. PCT/IB2022/055184, filed Jun. 3, 2022, which designates the United States and was published in English, which claims priority to U.S. Provisional Application No. 63/196,476, filed on Jun. 3, 2021. These applications are herein incorporated by reference in its their entirety.

TECHNICAL FIELD

This disclosure relates to ophthalmic lenses for preventing and/or slowing myopia progression and more specifically to ophthalmic lenses that block or attenuate light by utilizing amplitude modulation. Some embodiments relate, at least in part, to introducing light amplitude modulation between zero and one to incoming fields to produce a stop signal to a myopic eye (e.g., a progressing myopic eye) without comprising vision (e.g., without substantially compromising vision).

BACKGROUND

Myopia, also known as short-sightedness, is a condition where the refractive power of the eye is too high causing rays of light from distant objects to focus in front of the retina, instead of on the retina. Myopia generally occurs because the axial length of the eye is too long and/or the anterior surface of the cornea is too steep.

Myopia affects up to 33% of the population of the US and up to 75% in some Asian population. Thus, a large percentage of the world's population has myopia. Myopic refractive error, in particular, may be progressive in younger patients. High amounts of myopia can lead to some forms of retinal pathology; with increased risk of retinal detachment, posterior cataract and glaucoma. The cause of myopia is unknown, however may be due to combination of genetic and environmental factors.

There are number of methods, which have been proposed and developed to slow myopia progression using ophthalmic lenses e.g. with multifocal contact lenses or spectacle lenses. These include using various refractive optical configurations that create a myopic defocus e.g., a focus in front of the retina; or higher order aberrations; or lenses with off-axis power; lenses that temporarily induce aberrations on the eye by corneal reshaping; or lenses with dot features to scatter light and/or reduce contrast.

In some instances, the methods may provide certain advantages and disadvantages in terms of myopia control efficacy, vision clarity, ease of lens wearing and/or cosmetic appearance that may impact a wearer's compliance to using the ophthalmic lens for the intended length of time and thus potentially compromise optimal treatment.

Accordingly, there is a need for ophthalmic lenses that prevent and/or slow myopia progression. Exemplary embodiments described herein may provide a design that in whole or in part contributes to improved treatments of myopia, e.g., for progressing myopes. Embodiments described herein may solve or address one or more of these and/or other problems disclosed herein. The present disclosure is also directed to pointing out one or more advantages to using exemplary ophthalmic lenses described herein

SUMMARY

The present disclosure is directed, at least in part, to overcoming and/or ameliorating one or more of the problems described herein.

The present disclosure is directed, at least in part, to ophthalmic lenses designed or configured to correct, slow, reduce, and/or prevent myopia (e.g., myopia progression).

In some embodiments, the ophthalmic lens for myopia control may comprise patterns or masks which block and/or attenuate light (e.g., by amplitude modulation). The amplitude modulation may be binary, for example, where zero amplitude means absorption or blocking of light and a value of one means that light may be transmitted through the lens without change (e.g., without significant change).

In some embodiments, the amplitude modulation may not be binary. For example, in some embodiments, the amplitude modulation may be multiple steps where zero amplitude means absorption or blocking of light and a value of one means that light may be transmitted through the lens without change (e.g., without significant change) and a value between zero and one means only a portion of the light is absorbed or blocked. In some embodiments, the amplitude modulation may have 2 (binary), 3, 4, 5, 6, 7, 8, 9, or 10 steps. In some embodiments, the amplitude modulation may be continuous between zero and one.

In some embodiments, the ophthalmic lens system may be one of a spectacle lens, a contact lens, a corneal onlay or inlay, an intraocular lens or a combination thereof. In some embodiments, the lens of the ophthalmic lens system may be a spectacle lens and a contact lens.

In some embodiments, the amplitude modulation pattern may be symmetrical, for example radially, vertically and/or horizontally symmetrical In some embodiments the amplitude modulation pattern may be asymmetrical. In some embodiments, the amplitude modulation pattern may be localized to one or more regions of the lens (e.g., a central portion and/or a peripheral portion).

In some embodiments, the amplitude modulation patterns may be composed of shapes, concentric rings (in whole or in part), in a form of a grid, in the form of a circular distribution, in the form of a hexagonal array, in the form of a spiral array, in the form of a rectangular array, and/or any other random or predetermined pattern.

In some embodiments, the amplitude modulation pattern may form a transmission that may be uniform or not uniform. For example, in some embodiments, an amplitude may vary spatially across at least a portion of the lens from center to periphery. The variation may be continuous or discrete, monotonic or non-monotonic and/or periodic or aperiodic or any combination of one or more therefrom.

In some embodiments, the pattern may be incorporated into a plurality of spaced apart shapes that are distributed over at least a portion of the lens. In some embodiments, the shapes may be adjoining, (e.g., conjoined), and in some embodiments, the shapes may be spaced apart.

In some embodiments the modulation transfer function (MTF) of the lens over a fixed portion or over the amplitude modulating shape may be reduced by 10% or more or 20% or more or 30% or more. In some embodiments the MTF may be selectively reduced by 10% or 20% or more, or 30% or more at low (<6 cycles/degree), medium (6-10 cycles/degree) or high (>10 cycles/degree) spatial frequencies or across one or more spatial frequencies in a uniform manner or selectively attenuated or boosted for one or more spatial frequencies.

In some embodiments, the amplitude modulation elements may be implemented across the entire lens or may only be located within certain visual fields of a lens.

In some embodiments, the ophthalmic lens system may be implemented within only certain portions of the aperture of an overall lens system, e.g., any combination of one or more of centrally or peripherally or inferiorly or superiorly or nasally or temporally.

In some embodiments the lens may have a clear center zone and in some embodiments the center zone may contain amplitude modulation patterns. In some embodiments, a plurality of the amplitude modulation elements may be distributed across the lens.

In some embodiments, the plurality of amplitude modulation elements may be patterned in an array or randomly distributed.

In some embodiments, the amplitude modulation elements may be identical or may be different, e.g., have any combination of one or more of different sizes, different features and/or different degrees of light amplitude modulation.

In some embodiments, the light amplitude modulation elements may be implemented in any combination of about a central 5 or 10 or 15 degrees of the field of view by using a round-segment that is centered to the visual axis; or a peripheral field beginning from 5 or 10 or 20 degrees or more; or dropped segments similar to the outline shape of bifocal or multifocal ophthalmic lens configurations.

In some embodiments, the light amplitude modulation elements may be implemented within a portion or portions of the aperture. For example, they may be implemented within the central 50% area of the aperture, or the central 30% of the aperture, or the central 35% of the aperture, or the central 40% of the aperture, or the central 45% of the aperture, or the central 55% of the aperture, or the central 60% of the aperture, or the central 65% of the aperture, or the central 70% of the aperture, or implemented within the peripheral 50% area of the aperture, or the peripheral 60% area of the aperture, or the peripheral 55% area of the aperture, or the peripheral 45% area of the aperture, or the peripheral 40% area of the aperture, or the peripheral 35% area of the aperture, or the peripheral 30% area of the aperture.

In some embodiments, the light amplitude modulation patterns or element may be positioned within the lens or may be located on the front of or the back surfaces or both surfaces.

In some embodiments the ophthalmic lens described herein may be implemented in various combinations with other technologies for correcting vision. For example, in some embodiments, the ophthalmic lens described herein may be implemented as a single-vision lens or as a multifocal lens or as an extended depth of focus (EDOF) lens or as a lens that includes an astigmatic correction or a multifocal astigmatic lens.

In some embodiments, the lens system may be used to correct vision of an eye and any amplitude modulated light may be focused at positions located in front, on and/or behind the retina and may be at the central retina (e.g. the fovea or macula region) or paracentral retina or peripheral retina.

In some embodiments, the ophthalmic lens comprising light amplitude modulation features may also comprise myopia controlling optical elements or features, including, for example, any combination of one or more of refractive, diffractive or phase designs providing a power profile or wavefront that creates a desirable light focus distribution on or in front of or behind the retinal plane. In some embodiments, the ophthalmic lens comprising light amplitude modulation features may also comprise myopia controlling optical elements or features, including, for example light scattering or contrast reducing elements. In some embodiments, the ophthalmic lens comprising light amplitude modulation features may also comprise myopia controlling optical elements or features, including, for example light scattering or contrast reducing elements that may form at least one or more focal points or focal regions or locus of focal points.

In some embodiments, the light amplitude modulating features may be applied to at least a portion of a front surface or a back surface or matrix or one or more layers of an ophthalmic lens e.g. a fully finished spectacle lens or a lens blank finished using a freeform manufacturing process to provide a lens prescription surface and/or a power profile useful for myopia control.

In some embodiments, the ophthalmic lens comprising light amplitude modulation features may also comprise at least one or more myopia controlling optical elements or features, including, for example coaxial or non-coaxial refractive elements (e.g. concentric annular rings, non-concentric annular rings, partial annular rings, a plurality of sectors of annular rings formed by surfaces including spheroidal torus', non-spheroidal torus', astigmatic elements and non-astigmatic elements formed by surface curvatures or lines curvatures or flat portions).

In some embodiments, the amplitude modulation features may be incorporated in at least a portion of the myopia controlling optical element(s) e.g., at least a portion of the myopia controlling optical element may be amplitude modulated.

In some embodiments, the myopia controlling optical element may be incorporated into at least a portion of amplitude modulating features or region(s) e.g. at least a portion of the amplitude modulation feature(s) or region(s) may contain myopia controlling optical element.

In some embodiments, the amplitude modulation feature may surround or be conjoined with, at least in part, the myopia controlling optical element to introduce at least one of a conflicting optical signal or a discontinuous optical signal with eye movements associated with looking in different directions of gaze. Similarly, in some embodiments, the myopia controlling optical element may surround or be conjoined with, at least in part, the amplitude modulation feature(s) to also introduce at least one of a conflicting optical signal or a discontinuous optical signal with eye movements associated with looking in different directions of gaze.

In some embodiments, the refractive optical elements may have a power in the range of −30 D to +30 D, (e.g., +/−5 D, +/−10 D, +/−15 D, +/−20 D, +/−25 D, +/−30 D or more).

In some embodiments, the zone modulating the amplitude of light may have a different optical power from the portion of the lens that does not provide the light modulation. For example, in some embodiments, a lenslet or a segment of the lens may be more positive in power than a base power to introduce relative myopic defocus over those parts of the visual field and also have a different e.g., more light modulation amplitude than the region of the lens having the base power and may enhance myopia control signals to the retinal receptors.

In some embodiments, the zone modulating the amplitude of light may have the same optical power as the portion of the lens that does not provide the light modulation. For example, in some embodiments, a lenslet or a segment of the lens may incorporate features that impart a myopia controlling optical signal to the retinal receptors e.g., relative myopic defocus, but without any light amplitude modulation and the ophthalmic lens may limit the light modulation properties to the region of the lens having the base power and may enhance myopia control signals to the retinal receptors.

In some embodiments, the base power of the lens may have at least one or lens powers distributed across the optical zone in different zones or continuously e.g. a zonal refractive lens, a diffractive lens, a phase lens, a progressive power profile or a freeform surface, and the light amplitude modulating zones or regions or features modulating may be distributed across at least one or more of the different lens powers. For example, in some embodiments, the light amplitude modulating mask may comprise light modulating features configured e.g. in concentric annular rings that may be spatially discontinuous i.e. the rings may be spaced apart and the spacings or widths may be regular and constant or may be irregular and not constant or the spacings or widths may be random to introduce relative myopic defocus over those parts of the visual field and also have a different e.g., more light modulation amplitude than the region of the lens having the base power and may enhance myopia control signals to the retinal receptors especially with eye movements. In some embodiments, the light amplitude mask may be configured in any symmetrical or asymmetrical shape and may be annular and concentric or may be non-concentric or non-annular including partial or sectoral or patches or segments or sections of the ophthalmic lens surface.

In some embodiments, any combination of one or more of the following advantages may be found in one or more of the ophthalmic lenses described herein:

A. The ophthalmic lens may provide a stop signal to reduce or stop eye growth (or the state of refractive error) to the wearer's eye irrespective (or substantially irrespective) of the direction of gaze of the wearer's eye relative to the center of the ophthalmic lens;

B. For effective myopia control, the wearer of the spectacle lens system may not have to look through a specific portion of the ophthalmic lens;

C. The ophthalmic lens may cosmetically appear like a typical ophthalmic lens and may not suffer from the potential dislike shown by certain wearers (e.g., executive bifocal spectacles or where at least one or more lens power element(s) may be distributed in an array); and D. The ophthalmic lens may have the ability to alter the aberrations or optical signals impacting axial eye growth using optical elements in conjunction with the ophthalmic lens.

In some embodiments, the devices, methods and/or systems described herein may be capable of providing an ophthalmic lens that provides a stop signal to the myopically progressing eye no matter what portion of the ophthalmic lens system the individual (e.g., child) is using.

In some embodiments, the ophthalmic lens incorporating the light amplitude modulating element or elements disclosed herein may vary substantially in their properties. In some embodiments, the element may be manufactured in sheets that may be made up of more than 1 layer, for example 2, 3, 4 or 5 layers. In some embodiments, the element may be manufactured in sheets that may be made up of at least 1, 2, 3, 4 or 5 layers. The sheets may then be cut or configured to properly fit or work in conjunction with a precursor form of the final ophthalmic lens. The elements may be located on the anterior surface of the lens, the posterior surface of the lens, embedded in the lens matrix, in the first layer of the lens, in the second layer of the spectacle lens, in the third layer of the spectacle lens, in the fourth layer of the spectacle lens, in the fifth layer of the spectacle lens or combinations of one or more thereof. The element may be applied or adhered to or be sandwiched within the lens.

In exemplary embodiments, the element may be solid or partially filled and circular, semi-circular, non-circular, oval, rectangular, hexagonal, triangular, or square in shape or any other shape wherein at least a portion of the shape border or edge or boundary or circumference as curved or linear.

In certain embodiments, the shape of the base lens may be described by any combination of one or more of the following: a sphere, an asphere, extended odd polynomial, extended even polynomial, conic section, biconic section, toric surface or Zernike polynomials. The surface of the element may be described as a binary-step, 2-step, 4-step, 8-step, kinoform or a blazed grating.

In some embodiments, fabrication of the element can be through construction of a continuous surface laser direct writing, molding, thin films or photolithography methods directly onto the lens or during the processing of the ophthalmic lens. Other encapsulation or additive or material removal or material modification or dyeing processes e.g. 2 step molding, printing (pad, inkjet, laser, 3 D, nano), nanolithography, sputtering, etching, etc.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Other features and advantages of the subject matter described herein will be apparent from the description and drawings, and from the claims provided herein.

BRIEF DESCRIPTION OF THE DRAWINGS

Aspects of the embodiments described herein may be best understood from the following detailed description when read with the accompanying figures.

FIG. 8A illustrates an exemplary embodiment of amplitude modulation between zero and one to incoming fields across 6 mm circular aperture size. Zero means absorption and one means that light may pass the transmission without change. The embodiment includes a two annular concentric ring mask each 0.125 mm wide and 0 amplitude modulation transmission located between at 0.5-0.625 mm and 2.375-2.5 mm semi-diameter positions from the mask center.

FIG. 14. is a schematic diagram from Zemax representing an emmetropic model eye with the annular bifocal contact lens from FIG. 13. in place on the model eye for incoming monochromatic light having a vergence of zero diopters.

DETAILED DESCRIPTION

Figure 1A:
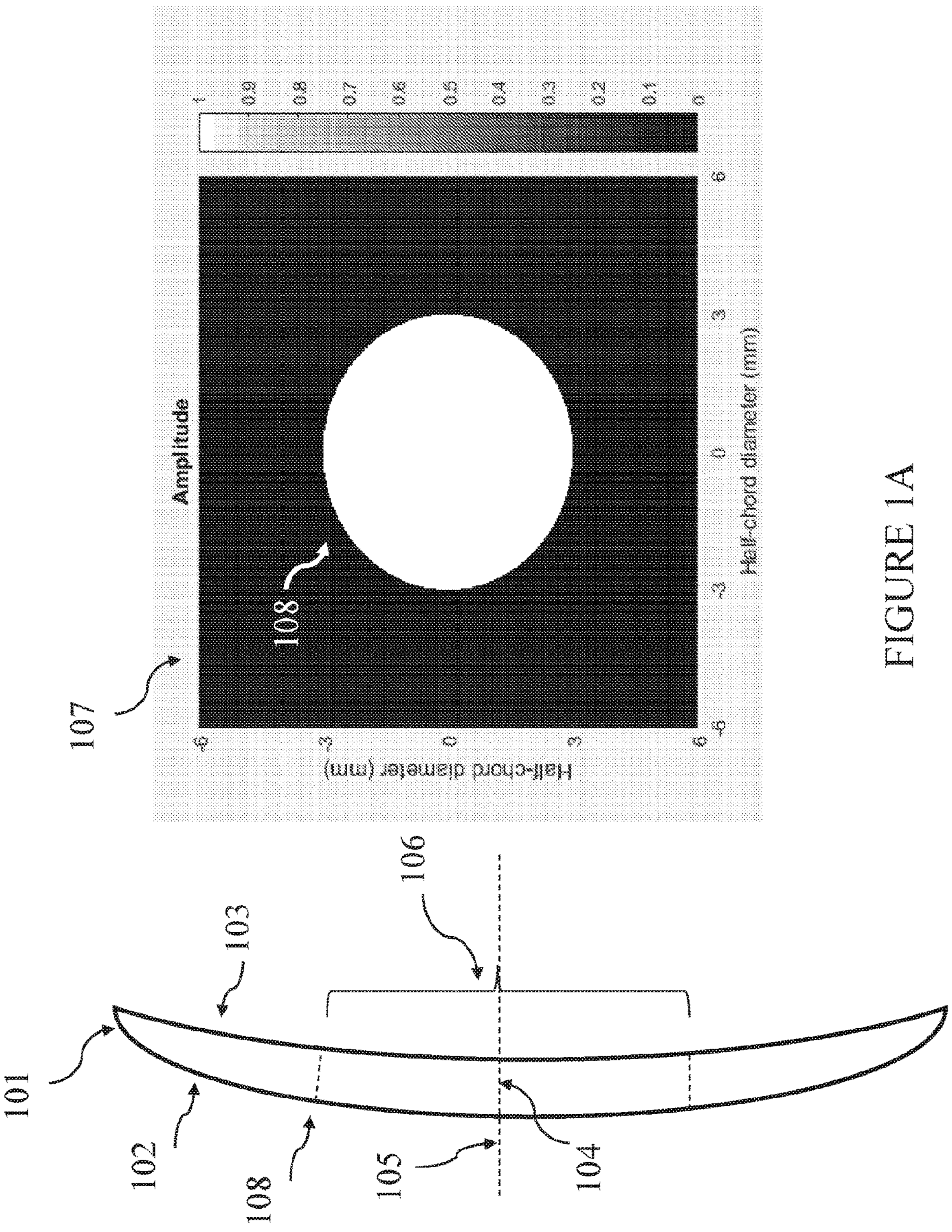
FIG. 1A illustrates an exemplary embodiment of amplitude modulation between zero and one to incoming fields across 6 mm circular aperture size. Zero means absorption and one means that light may pass the transmission without change.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The following description is provided in relation to several embodiments that may share common characteristics and features. It is to be understood that one or more features of one embodiment may be combined with one or more features of other embodiments. In addition, a single feature or combination of features in certain of the embodiments may constitute additional embodiments. Specific structural and functional details disclosed herein are not to be interpreted as limiting, but merely as a representative basis for teaching one skilled in the art to variously employ the disclosed embodiments and variations of those embodiments.

The subject headings used in the detailed description are included only for the ease of reference of the reader and should not be used to limit the subject matter found throughout the disclosure or the claims. The subject headings should not be used in construing the scope of the claims or the claim limitations.

The term "about" as used in this disclosure is to be understood to be interchangeable with the term approximate or approximately.

The term "comprise" and its derivatives (e.g., comprises, comprising) as used in this disclosure is to be taken to be inclusive of features to which it refers, and is not meant to exclude the presence of additional features unless otherwise stated or implied.

The term "myopia" or "myopic" as used in this disclosure is intended to refer to an eye that is already myopic, is pre myopic, or has a refractive condition that is progressing towards myopia.

The term "slow myopia" or "slow[ing] the progression of myopia" as used in this disclosure is intended to refer to attempts that either slow or reduce or minimize or arrest the rate of progression of myopia.

The term "ophthalmic lens" as used in this disclosure is intended to include any lens used for vision and may include one or more of a spectacle lens, a contact lens, a corneal onlay or inlay, an intraocular lens or a combination thereof. In some embodiments, the lens of an ophthalmic lens system may be a spectacle lens and a contact lens.

FIG. 1A illustrates a cross-section of an ophthalmic lens, for example a single vision contact lens 101, with a front surface 102, a back surface 103, central thickness 104, an optical axis 105 and a central optical zone 106. Alongside the lens cross-section is a 12 mm×12 mm square 107 illustrating a zone 108 corresponding to the central optical zone 106 of the contact lens 101. In the example of FIG. 1A, no amplitude modulation mask is patterned on the zone 106 and so the zone 108 appears white i.e., scaled at 1 across the zone indicating no modulation of transmittance.

Figure 1B:
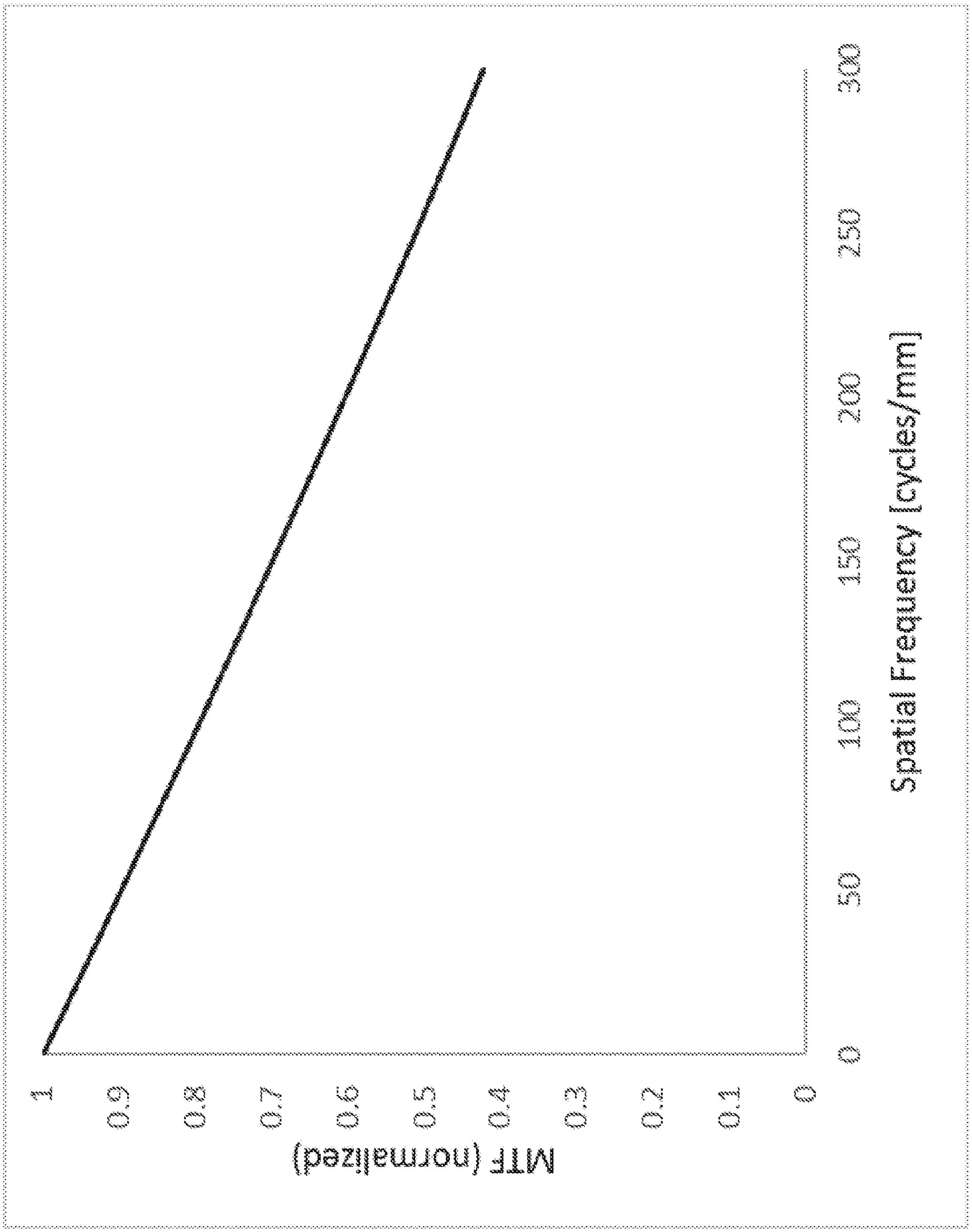
FIG. 1B illustrates the Modulation Transfer Function corresponding to the amplitude modulation of FIG. 1A, calculated for 555 nm wavelength.

FIG. 1B shows the plot of the Modulation Transfer Function resulting from the example lens shown in FIG. 1A calculated for a 555 nm wavelength passing through the central zone 106 of the contact lens 101.

Figure 2A:
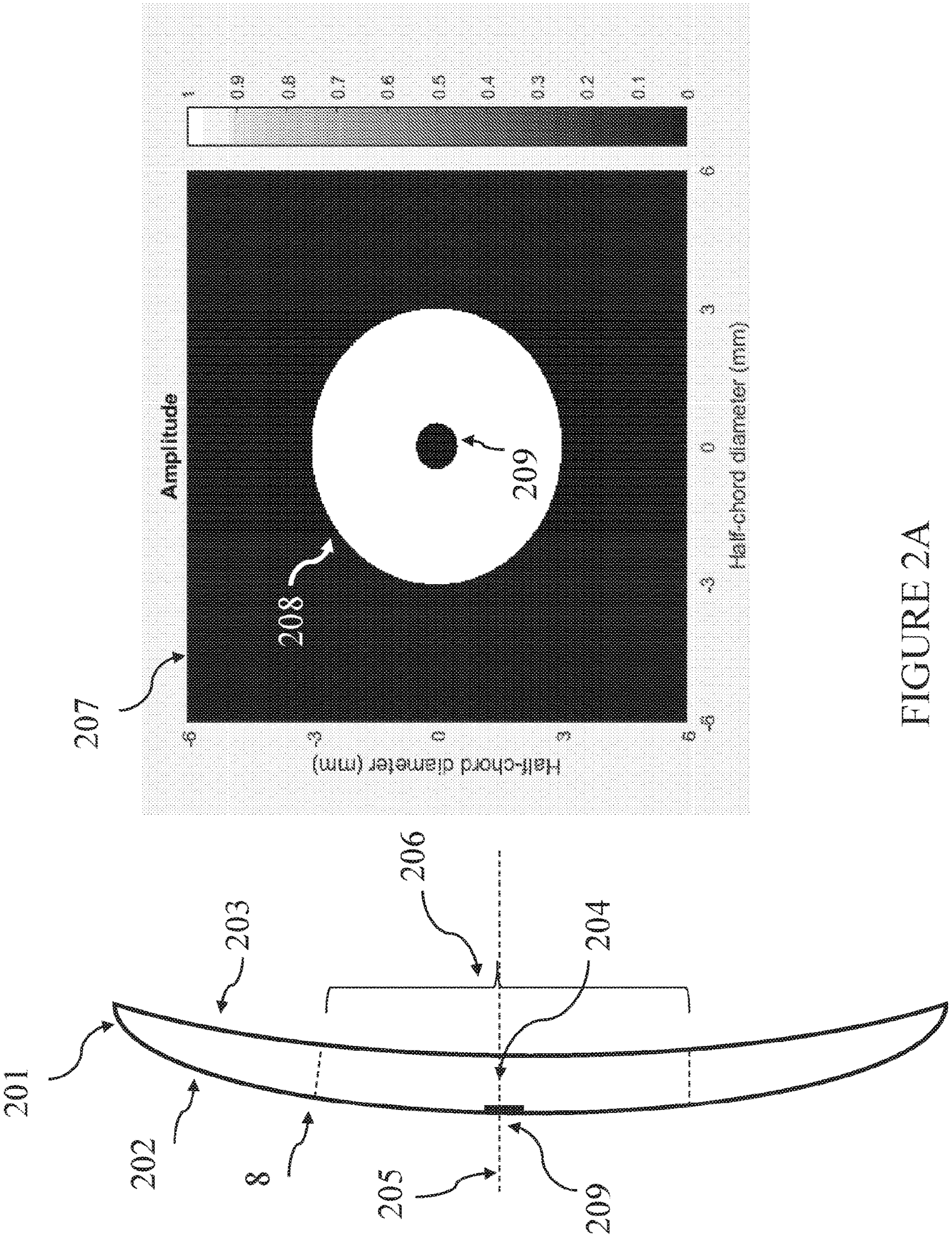
FIG. 2A illustrates an exemplary embodiment of amplitude modulation between zero and one to incoming fields across 6 mm elliptical aperture size. Zero means absorption and one means that light may pass the transmission without change. The embodiment includes a centrally located solid filled 1 mm diameter circle mask of 0 amplitude modulation transmission pattern.

FIG. 2A illustrates a cross-section of an ophthalmic lens, for example a single vision contact lens 201, with a front surface 202, a back surface 203, a central thickness 204, an optical axis 205 and a central optical zone 206. Alongside the lens cross-section is a 12 mm×12 mm square 207 illustrating the pattern of an amplitude modulation mask 208 included in the 6 mm central optic zone 206 on the front surface 202 of the contact lens 201. In this example the mask patterned is a centrally located solid filled 1 mm diameter circle 209. The amplitude gradient scale indicates the modulation amplitude of the circle 209 is 0, i.e., no transmittance. In some embodiments, pattern may have a varying amplitude and may have values ranging between 0.0 and 1. In some embodiments, the amplitudes may be random or patterned or progressively increasing away from the lens center or progressively decreasing toward the periphery of zone.

Figure 2B:
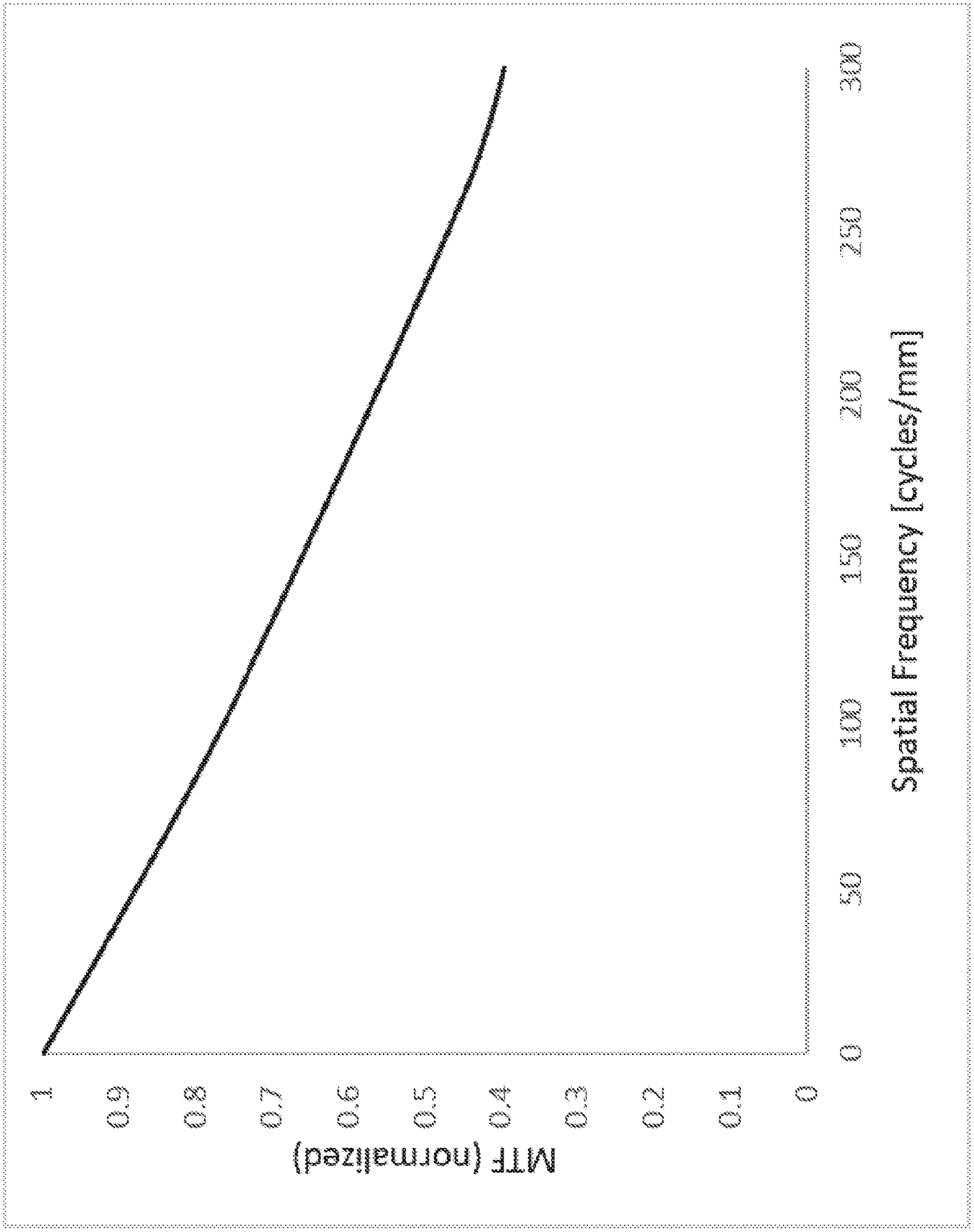
FIG. 2B illustrates the Modulation Transfer Function corresponding to the amplitude modulation of FIG. 2A, calculated for 555 nm wavelength.

FIG. 2B plots the Modulation Transfer Function of the amplitude modulation mask 207 formed over the zone 206 of the contact lens 201 of FIG. 2A, calculated for 555 nm wavelength. As illustrated, the mask pattern resulted in a very small change in the MTF across the spatial frequencies. As illustrated, the small central circular mask made little impact (e.g., <5%) on the MTF compared to the MTF of the no mask control of FIG. 1.

Figure 3A:
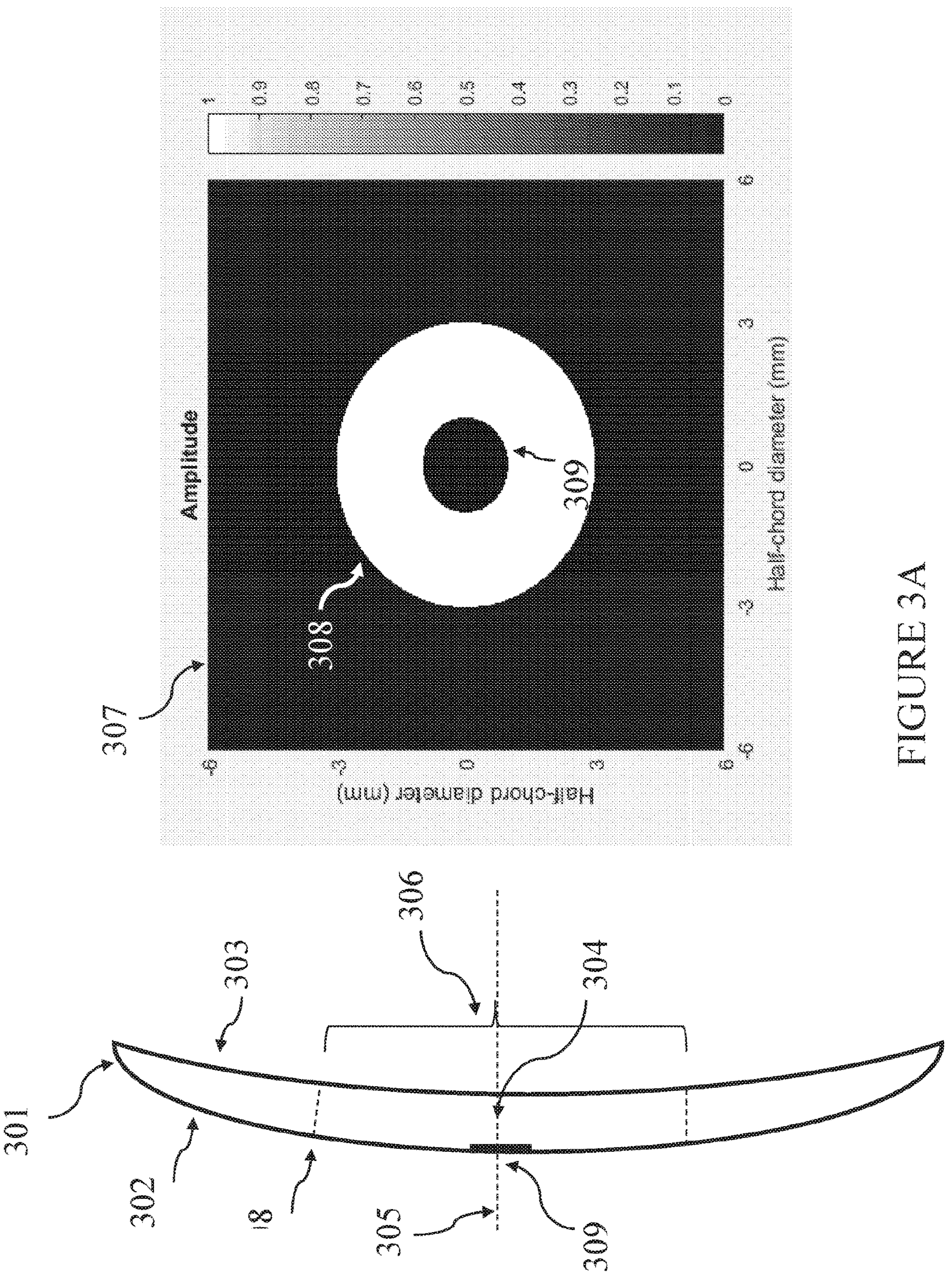
FIG. 3A illustrates an exemplary embodiment of amplitude modulation between zero and one to incoming fields across 6 mm circular aperture size. Zero means absorption and one means that light may pass the transmission without change. The embodiment includes a centrally located solid filled 2 mm diameter circle mask of 0 amplitude modulation transmission pattern.

FIG. 3A illustrates a cross-section of an ophthalmic lens, for example a single vision contact lens 301, with a front surface 302, a back surface 303, a central thickness 304, an optical axis 305 and a central optical zone 306. Alongside the lens cross-section is a 12 mm×12 mm square 307 illustrating the pattern of an amplitude modulation mask 308 included in the 6 mm central optic zone 306 on the front surface 302 of the contact lens 301. In this example the mask patterned is a centrally located solid filled 2 mm diameter circle 309. The amplitude gradient scale indicates the modulation amplitude of the circle 309 is 0, i.e., no transmittance.

In some embodiments, pattern may have a varying amplitude and may have values ranging between 0.0 and 1. In some embodiments, the amplitudes may be random or patterned or progressively increasing away from the lens center or progressively decreasing toward the periphery of zone.

Figure 3B:
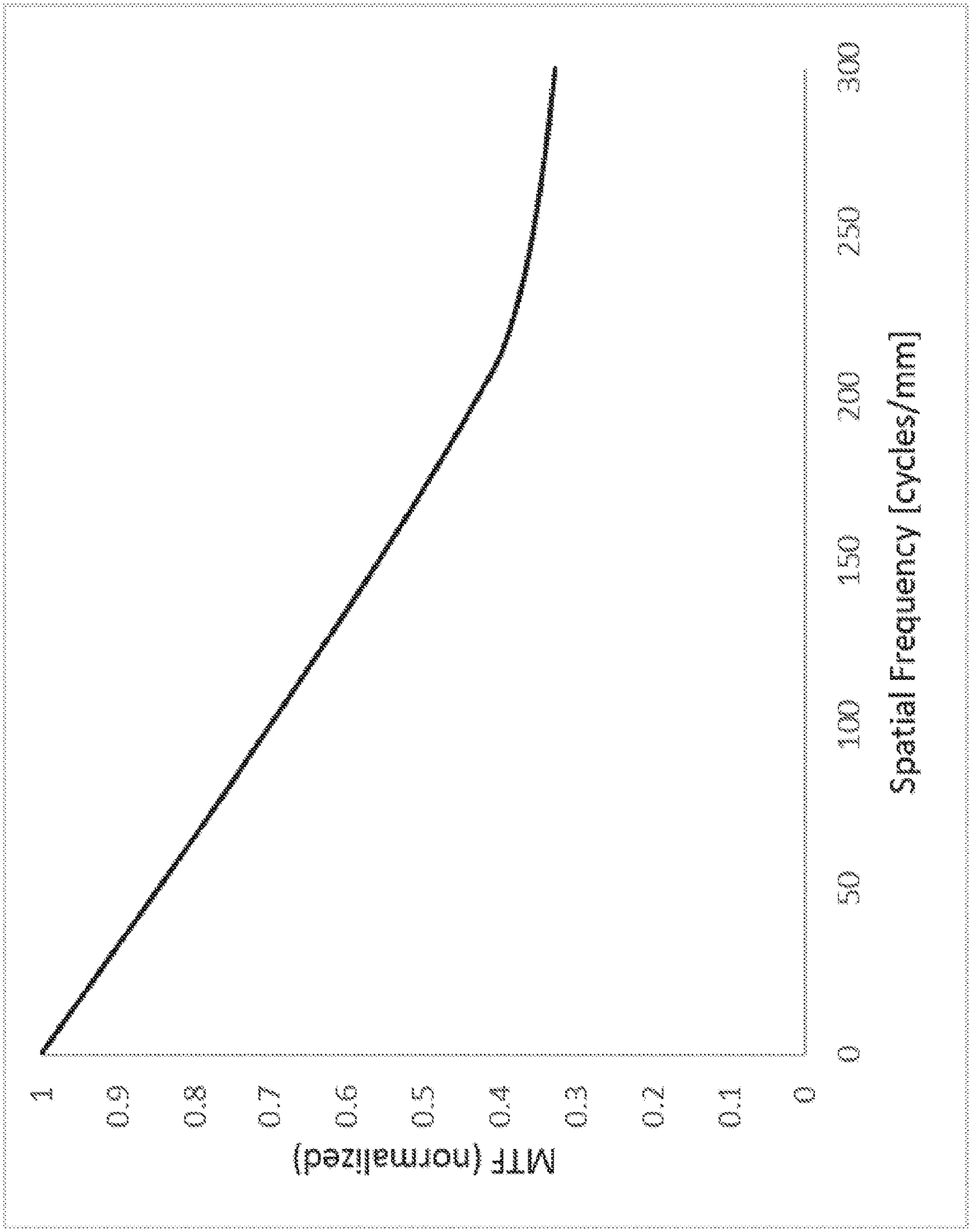
FIG. 3B illustrates the Modulation Transfer Function corresponding to the amplitude modulation of FIG. 3A, calculated for 555 nm wavelength.

FIG. 3B plots the Modulation Transfer Function of the amplitude modulation mask 307 formed over the zone 306 of the contact lens 301 of FIG. 3A, calculated for 555 nm wavelength. The mask pattern resulted in a small change in the MTF across the spatial frequencies (e.g., increasing the diameter of the mask had a more significant change in MTF, relative to the previous embodiment, being about 12% at low and medium spatial frequencies and around 20% at higher spatial frequencies).

Figure 4A:
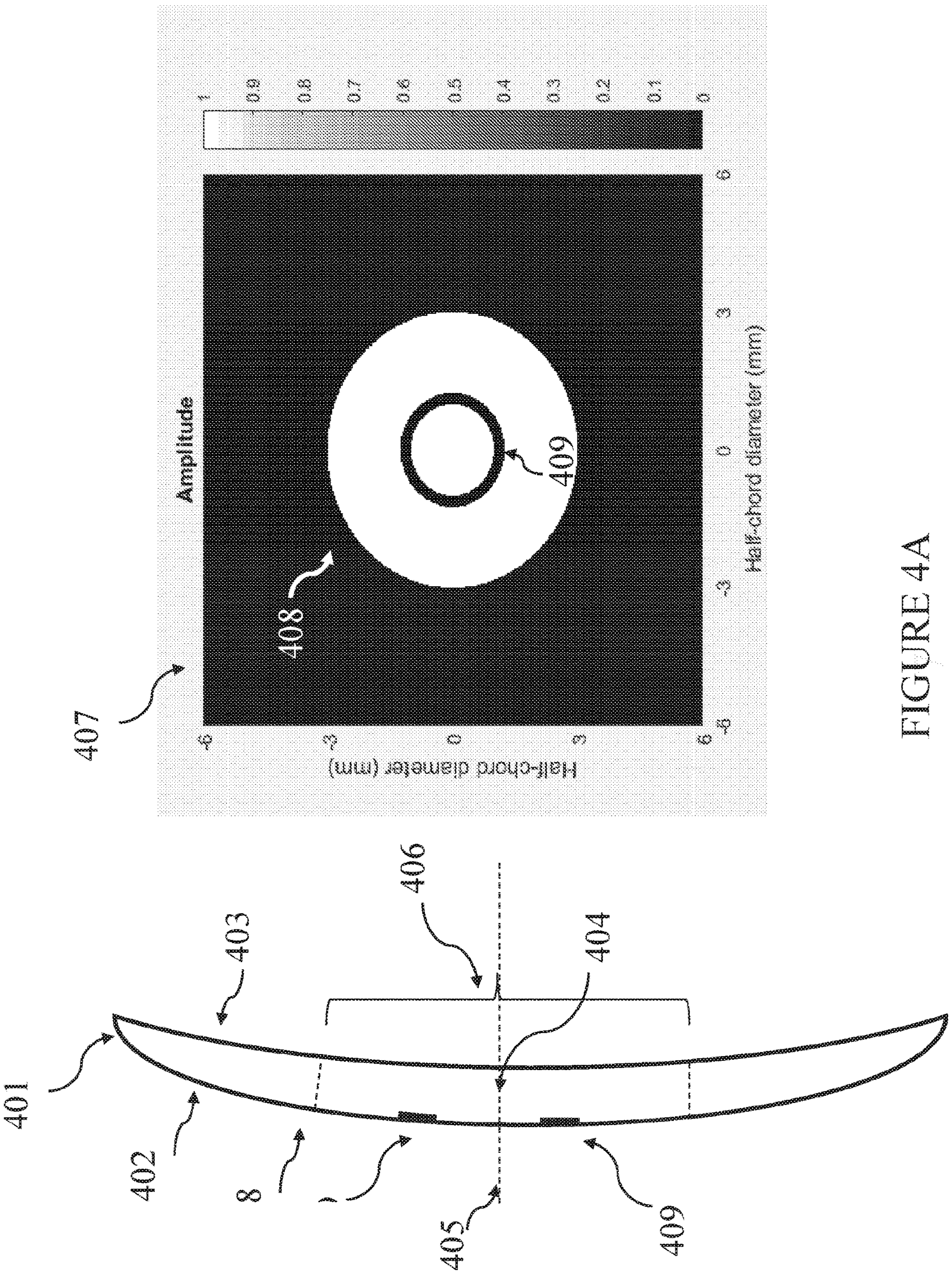
FIG. 4A illustrates an exemplary embodiment of amplitude modulation between zero and one to incoming fields across 6 mm circular aperture size. Zero means absorption and one means that light may pass the transmission without change. The embodiment includes a solid filled annular ring mask 0.25 mm wide of 0 amplitude modulation transmission located between 1-1.25 mm semi-diameter from the mask center.

FIG. 4A illustrates a cross-section of an ophthalmic lens, for example a single vision contact lens 401, with a front surface 402, a back surface 403, a central thickness 404, an optical axis 405 and a central optical zone 406. Alongside the lens cross-section is a 12 mm×12 mm square 407 illustrating the pattern of an amplitude modulation mask 408 included in the 6 mm central optic zone 406 on the front surface 402 of the contact lens 401. In this example the mask patterned is a solid filled annular ring 409 0.25 mm wide of 0 amplitude modulation transmission located between 1-1.25 mm semi-diameter from the mask center. The amplitude gradient scale indicates the modulation amplitude of the ring 409 is 0, i.e., no transmittance. In some embodiments, pattern may have a varying amplitude and may have values ranging between 0.0 and 1. In some embodiments, the amplitudes may be random or patterned or progressively increasing away from the lens center or progressively decreasing toward the periphery of zone.

Figure 4B:
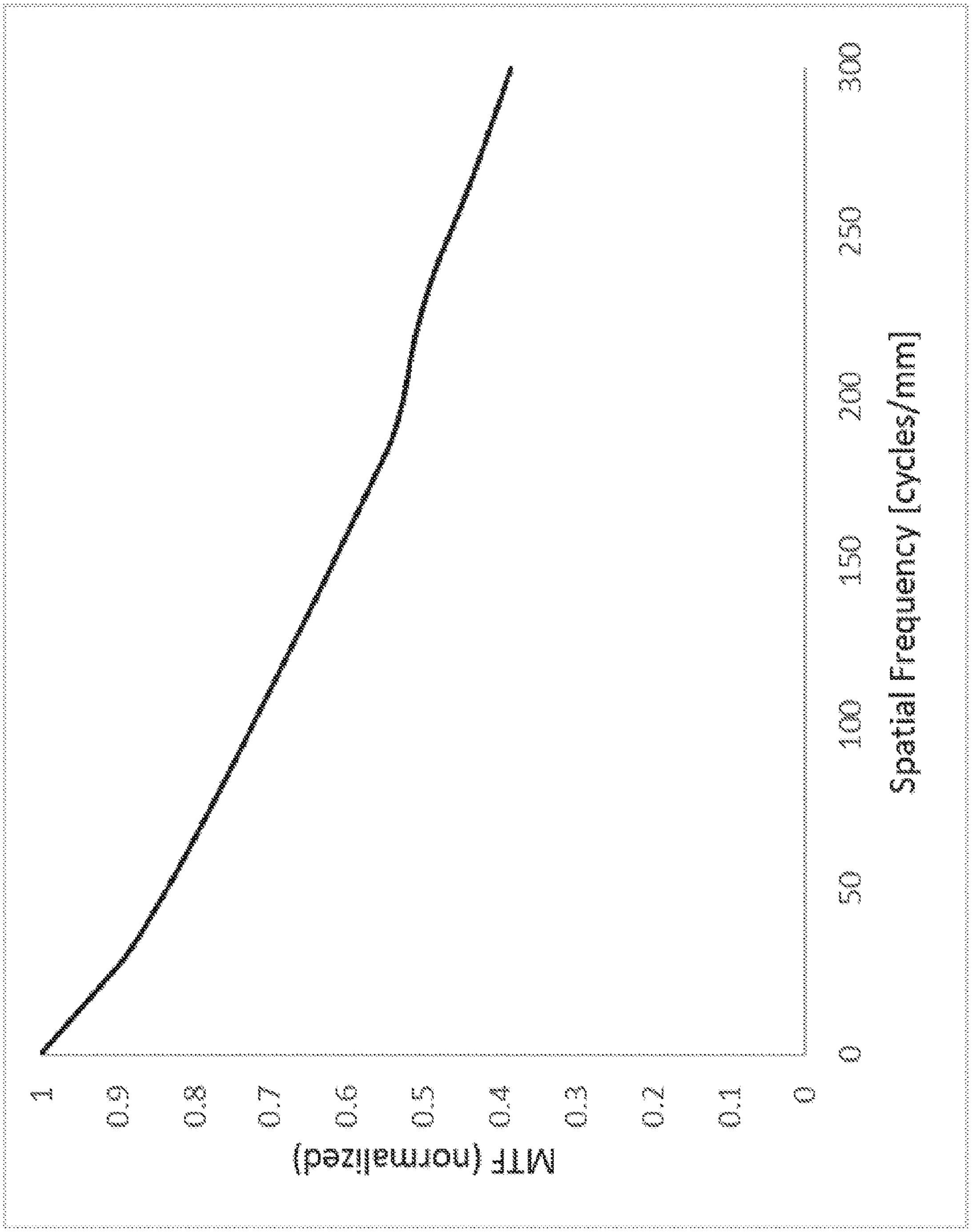
FIG. 4B illustrates the Modulation Transfer Function corresponding to the amplitude modulation of FIG. 4A, calculated for 555 nm wavelength.

FIG. 4B plots the Modulation Transfer Function of the amplitude modulation mask 407 formed over the zone 406 of the contact lens 401 of FIG. 4A, calculated for 555 nm wavelength. The mask pattern resulted in a mildly/moderately significant change in the MTF across the spatial frequencies (e.g., in the range of the eye's sensitivity, the MTF change introduced by the relatively narrow single ring was similar to the larger central solid circle of the previous embodiment across the spatial frequencies (up to 160c/mm) suggesting a greater effectiveness of the annular ring masks vs solid masks in some situations).

Figure 5A:
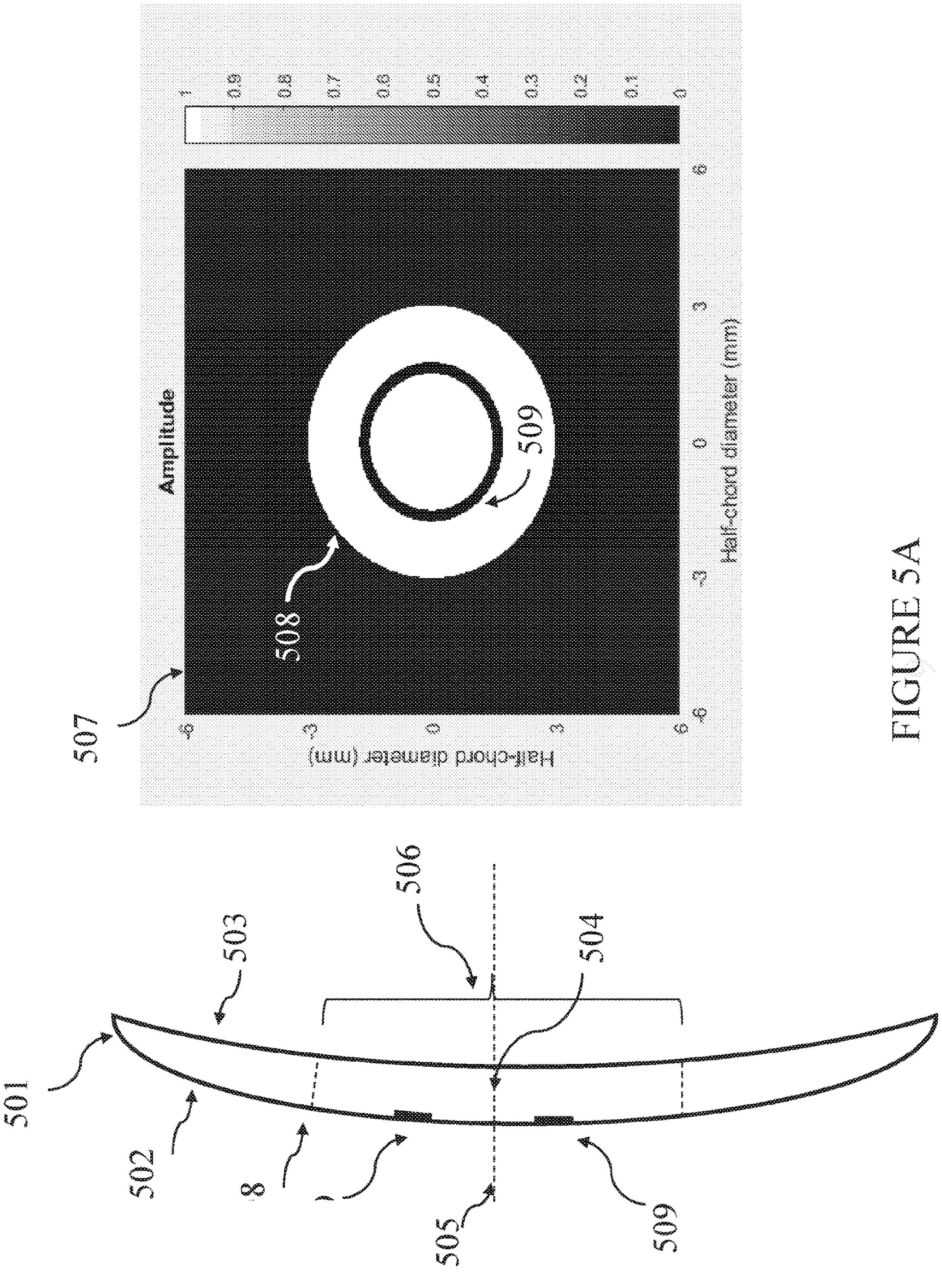
FIG. 5A illustrates an exemplary embodiment of amplitude modulation between zero and one to incoming fields across 6 mm circular aperture size. Zero means absorption and one means that light may pass the transmission without change. The embodiment includes a solid filled annular ring mask 0.25 mm wide of 0 amplitude modulation transmission located between 1.5-1.75 mm semi-diameter from the mask center.

FIG. 5A illustrates a cross-section of an ophthalmic lens, for example a single vision contact lens 501, with a front surface 502, a back surface 503, a central thickness 504, an optical axis 505 and a central optical zone 506. Alongside the lens cross-section is a 12 mm×12 mm square 507 illustrating the pattern of an amplitude modulation mask 508 included in the 6 mm central optic zone 506 on the front surface 502 of the contact lens 501. In this example the mask patterned is a solid filled annular ring 509 0.25 mm wide of 0 amplitude modulation transmission located between 1.5-1.75 mm semi-diameter from the mask center. The amplitude gradient scale indicates the modulation amplitude of the ring 509 is 0, i.e., no transmittance. In some embodiments, pattern may have a varying amplitude and may have values ranging between 0 and 1. In some embodiments, the amplitudes may be random or patterned or progressively increasing away from the lens center or progressively decreasing toward the periphery of zone.

Figure 5B:
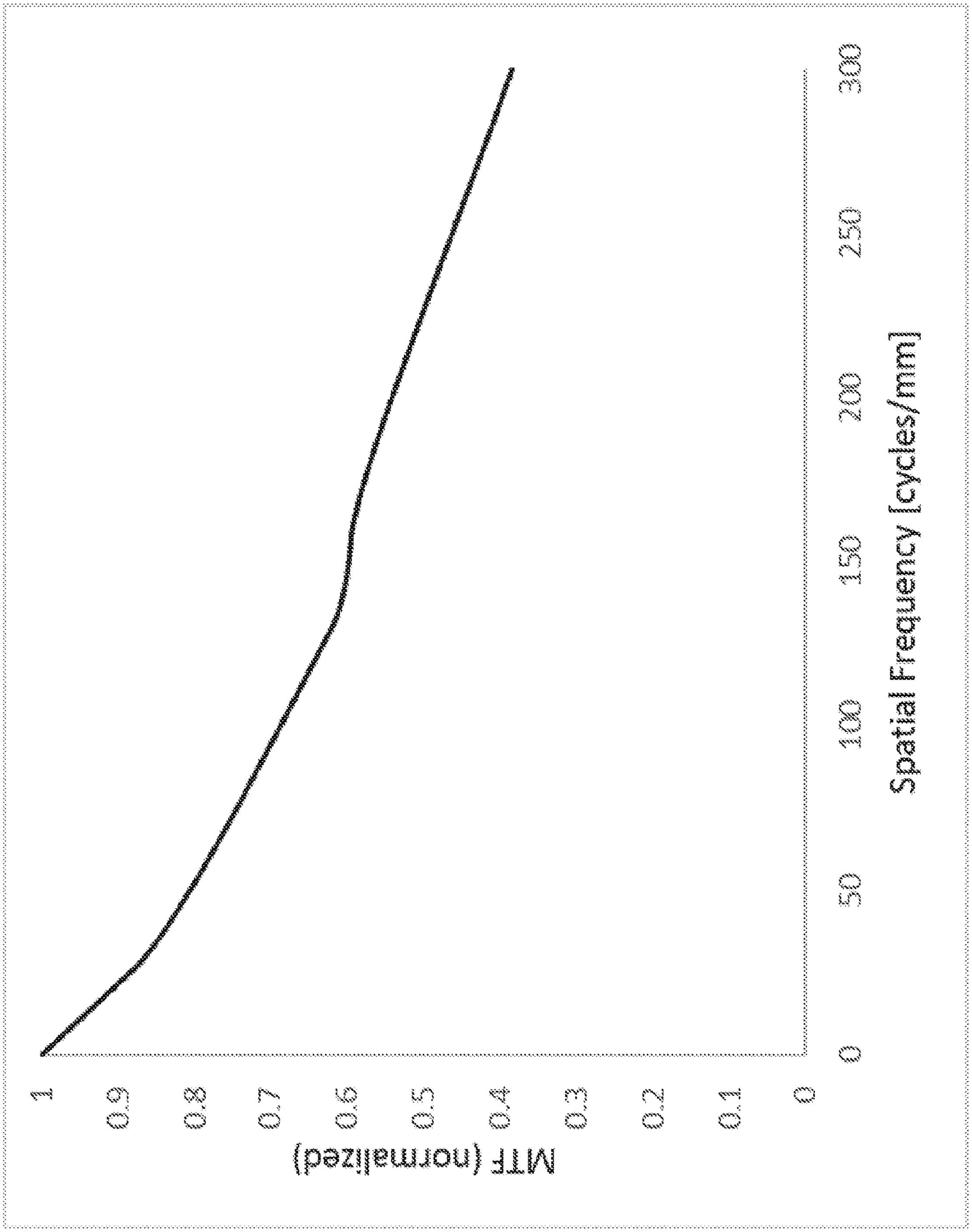
FIG. 5B illustrates the Modulation Transfer Function corresponding to the amplitude modulation of FIG. 5A, calculated for 555 nm wavelength.

FIG. 5B plots the Modulation Transfer Function of the amplitude modulation mask 507 formed over the zone 506 of the contact lens 501 of FIG. 5A, calculated for 555 nm wavelength. The mask pattern resulted in a moderately significant change in the MTF across the spatial frequencies. In some embodiments, as the ring location changes within the aperture (pupil) more change in the MTF may be observed (e.g., the design in FIG. 5 shows a greater deviation in MTF than FIG. 4).

Figure 6A:
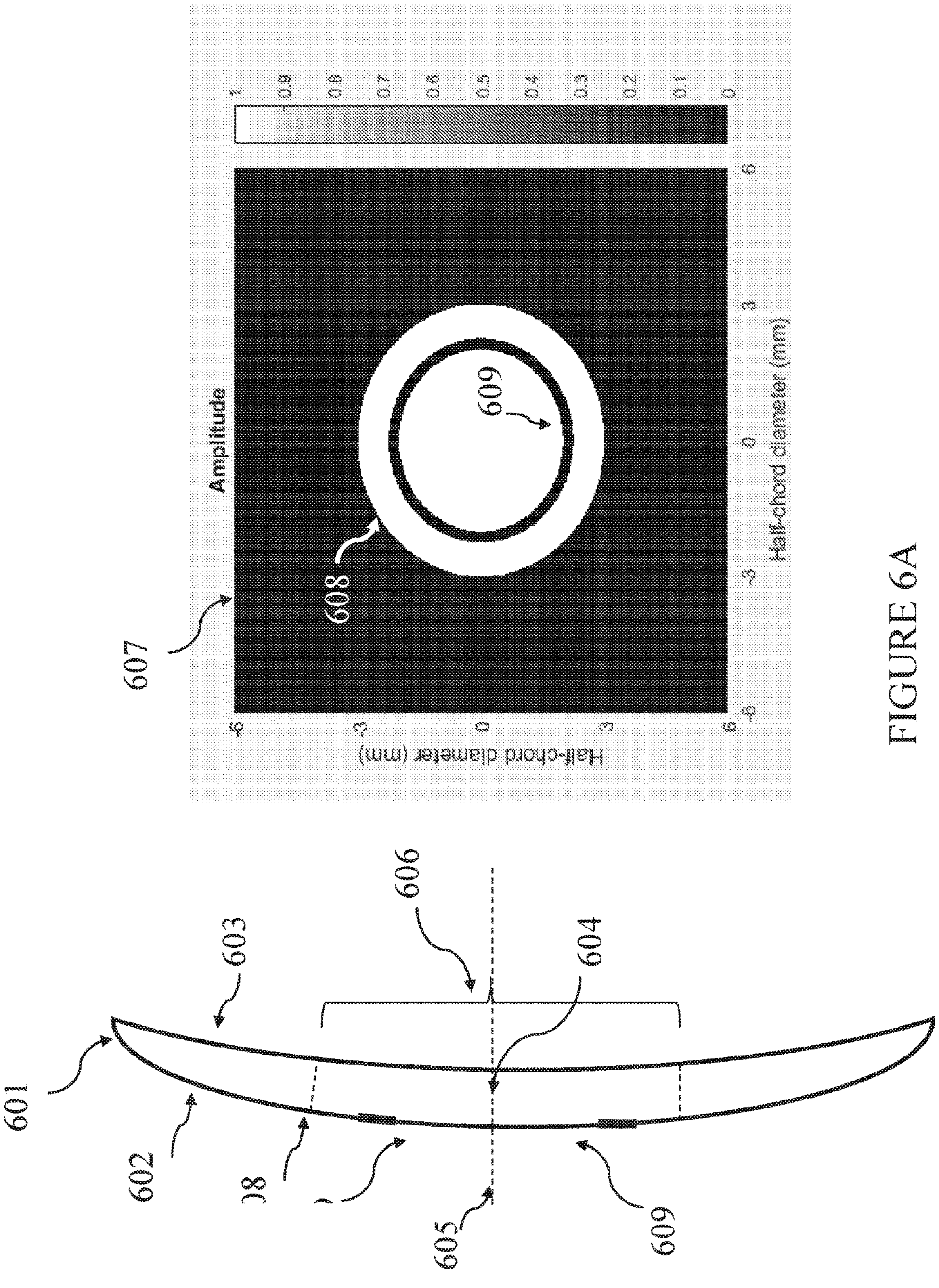
FIG. 6A illustrates an exemplary embodiment of amplitude modulation between zero and one to incoming fields across 6 mm circular aperture size. Zero means absorption and one means that light may pass the transmission without change. The embodiment includes a solid filled annular ring mask 0.25 mm wide of 0 amplitude modulation transmission located between 2-2.25 mm semi-diameter from the mask center.

FIG. 6A illustrates a cross-section of an ophthalmic lens, for example a single vision contact lens 601, with a front surface 602, a back surface 603, a central thickness 604, an optical axis 605 and a central optical zone 606. Alongside the lens cross-section is a 12 mm×12 mm square 607 illustrating the pattern of an amplitude modulation mask 608 included in the 6 mm central optic zone 606 on the front surface 602 of the contact lens 601. In this example the mask patterned is a solid filled annular ring mask 0.25 mm wide of 0 amplitude modulation transmission located between 2-2.25 mm semi-diameter from the mask center. The amplitude gradient scale indicates the modulation amplitude of the ring 609 is 0, i.e., no transmittance. In some embodiments, pattern may have a varying amplitude and may have values ranging between 0 and 1. In some embodiments, the amplitudes may be random or patterned or progressively increasing away from the lens center or progressively decreasing toward the periphery of zone.

Figure 6B:
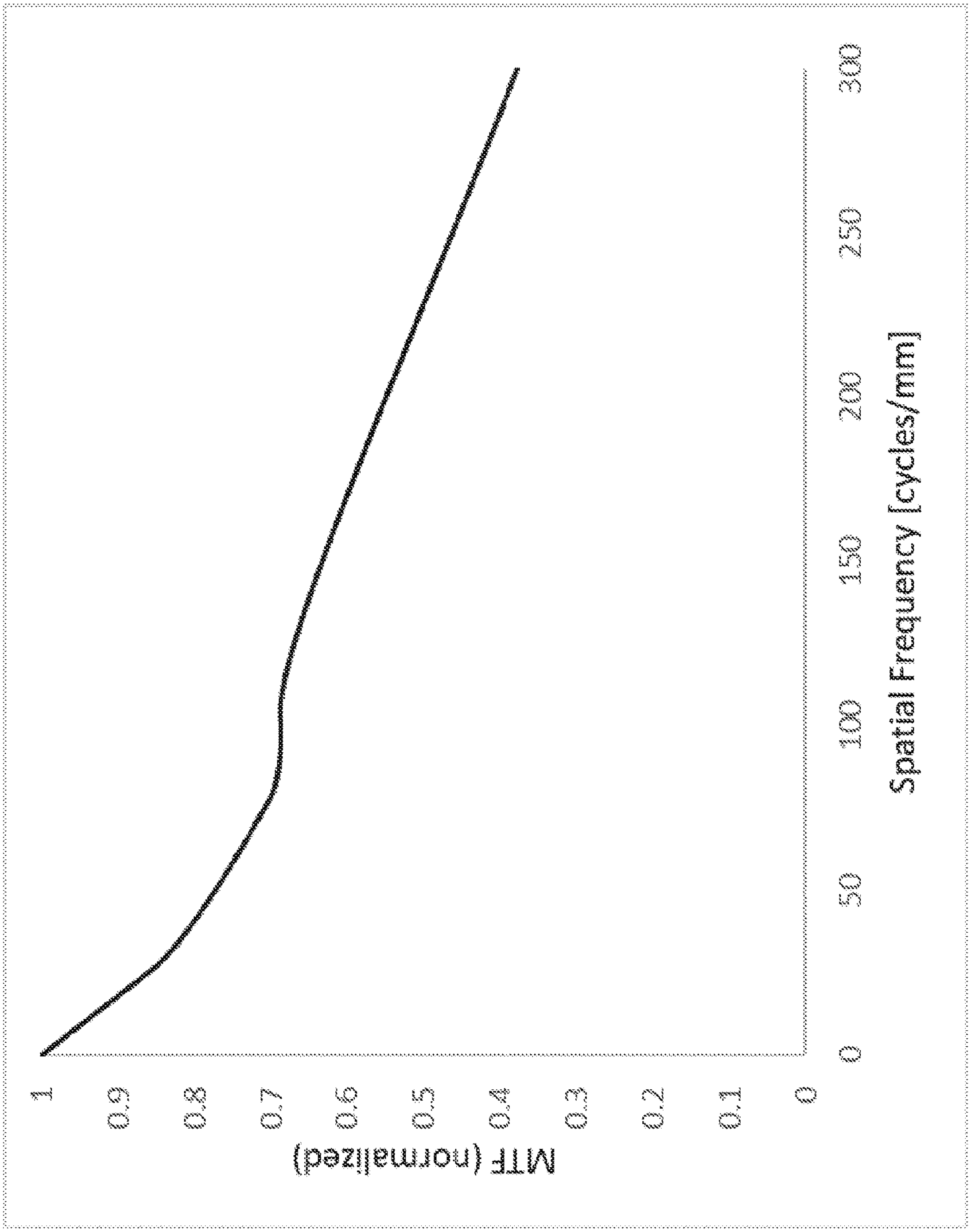
FIG. 6B illustrates the Modulation Transfer Function corresponding to the amplitude modulation of FIG. 6A, calculated for 555 nm wavelength.

FIG. 6B plots the Modulation Transfer Function of the amplitude modulation mask 607 formed over the zone 606 of the contact lens 601 of FIG. 6A, calculated for 555 nm wavelength. The mask pattern resulted in a moderately significant change in the MTF across the spatial frequencies (e.g., greater than FIGS. 4 and 5).

Figure 7A:
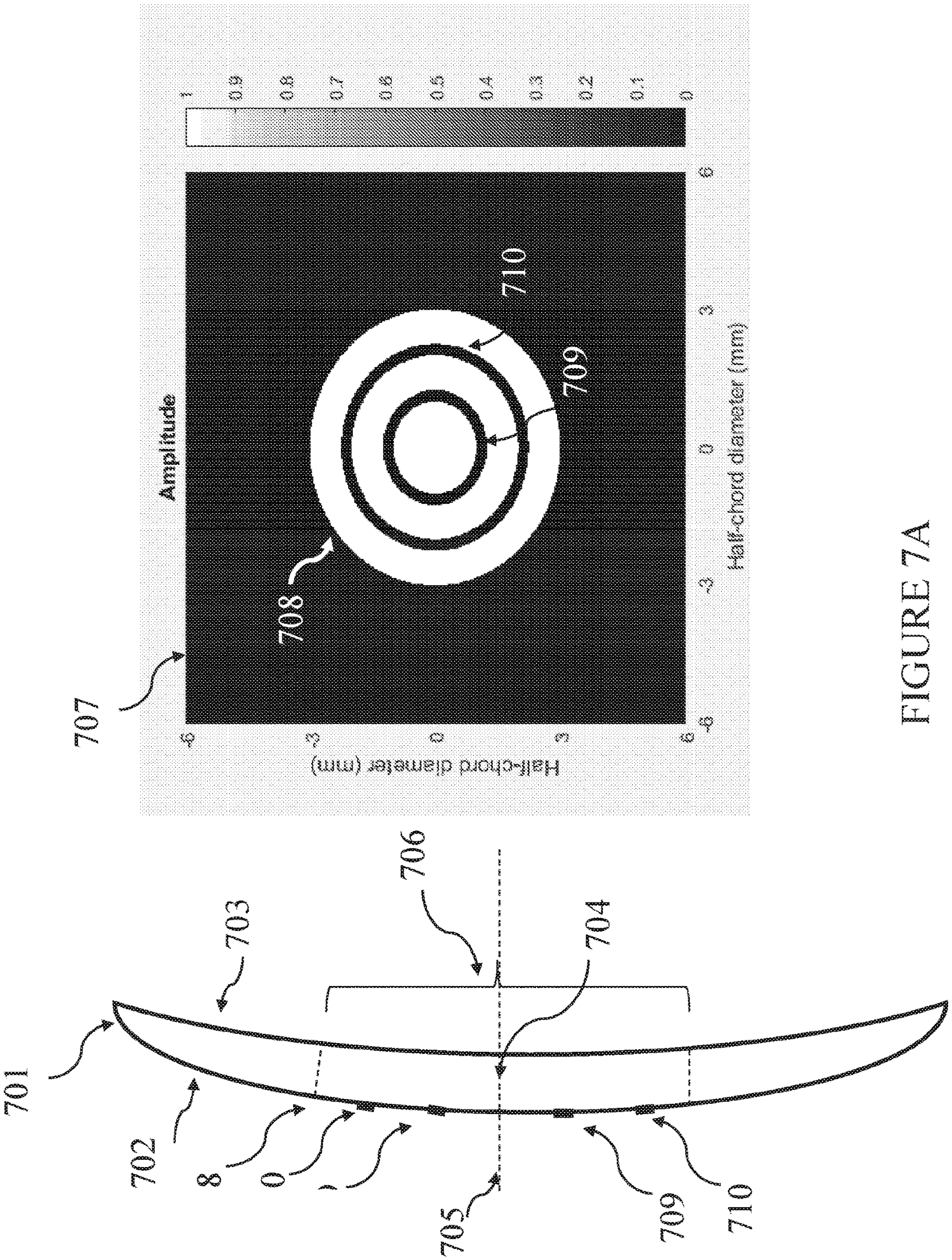
FIG. 7A illustrates an exemplary embodiment of amplitude modulation between zero and one to incoming fields across 6 mm circular aperture size. Zero means absorption and one means that light may pass the transmission without change. The embodiment includes a two annular concentric ring mask each 0.25 mm wide and 0 amplitude modulation transmission located between at 1-1.25 mm and 2-2.25 mm semi-diameter positions from the mask center.

FIG. 7A illustrates a cross-section of an ophthalmic lens, for example a single vision contact lens 701, with a front surface 702, a back surface 703, a central thickness 704, an optical axis 705 and a central optical zone 706. Alongside the lens cross-section is a 12 mm×12 mm square 707 illustrating the pattern of an amplitude modulation mask 708 included in the 6 mm central optic zone 706 on the front surface 702 of the contact lens 701. In this example, the mask patterned is a two annular concentric ring mask each 0.25 mm wide and 0 amplitude modulation transmission located between at 1-1.25 mm and 2-2.25 mm semi-diameter positions from the mask center. The amplitude gradient scale indicates the modulation amplitude of the rings 709 and 710 is 0, i.e., no transmittance. In some embodiments, patterns may have a varying amplitude and may have values ranging between 0.0 and 1. In some embodiments, the amplitudes may be random or patterned or progressively increasing away from the lens center or progressively decreasing toward the periphery of zone.

Figure 7B:
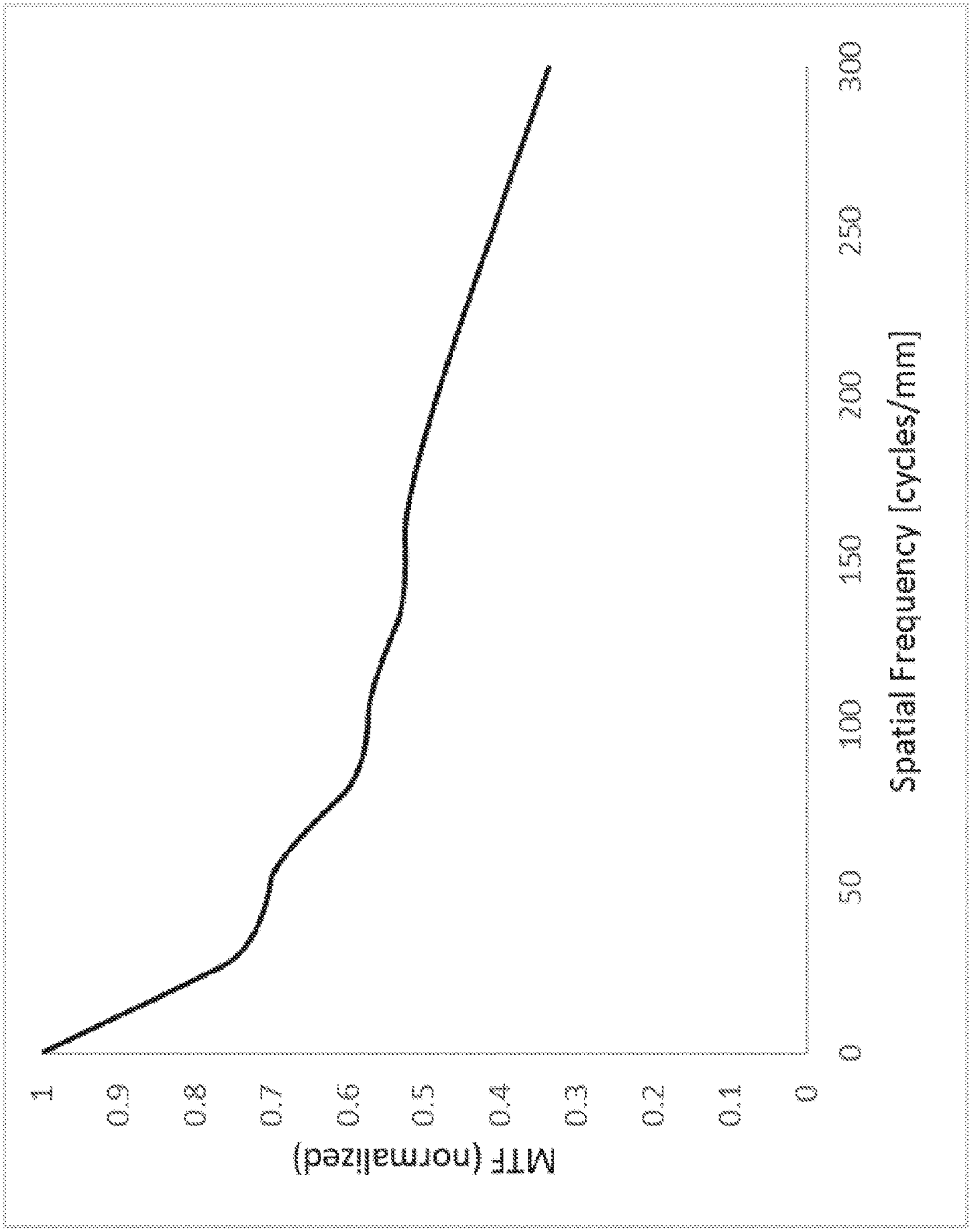
FIG. 7B illustrates the Modulation Transfer Function corresponding to the amplitude modulation of FIG. 7A, calculated for 555 nm wavelength.

FIG. 7B plots the Modulation Transfer Function of the amplitude modulation mask 707 formed over the zone 706 of the contact lens 701 of FIG. 7A, calculated for 555 nm wavelength. The mask pattern resulted in a moderately significant change in the MTF across the spatial frequencies (e.g., the mask with 2 rings may have a significant and moderate impact on the MTF curve, especially at low and mid frequencies compared to a single vision lens and the previous masks in FIGS. 2-6).

FIG. 8A illustrates a cross-section of an ophthalmic lens, for example a single vision contact lens 801, with a front surface 802, a back surface 803, central thickness 804, an optical axis 805 and a central optical zone 806. Alongside the lens cross-section is a 12 mm×12 mm square 807 illustrating the pattern of an amplitude modulation mask 808 included in the 6 mm central optic zone 806 on the front surface 802 of the contact lens 801. In this example, the mask patterned is a two annular concentric ring mask each 0.125 mm wide and 0 amplitude modulation transmission located between at 0.5-0.625 mm and 2.375-2.5 mm semi-diameter positions from the mask center. The amplitude gradient scale indicates the modulation amplitude of the rings 809 and 810 is 0, i.e., no transmittance. In some embodiments, patterns may have a varying amplitude and may have values ranging between 0.0 and 1. In some embodiments, the amplitudes may be random or patterned or progressively increasing away from the lens center or progressively decreasing toward the periphery of zone.

Figure 8B:
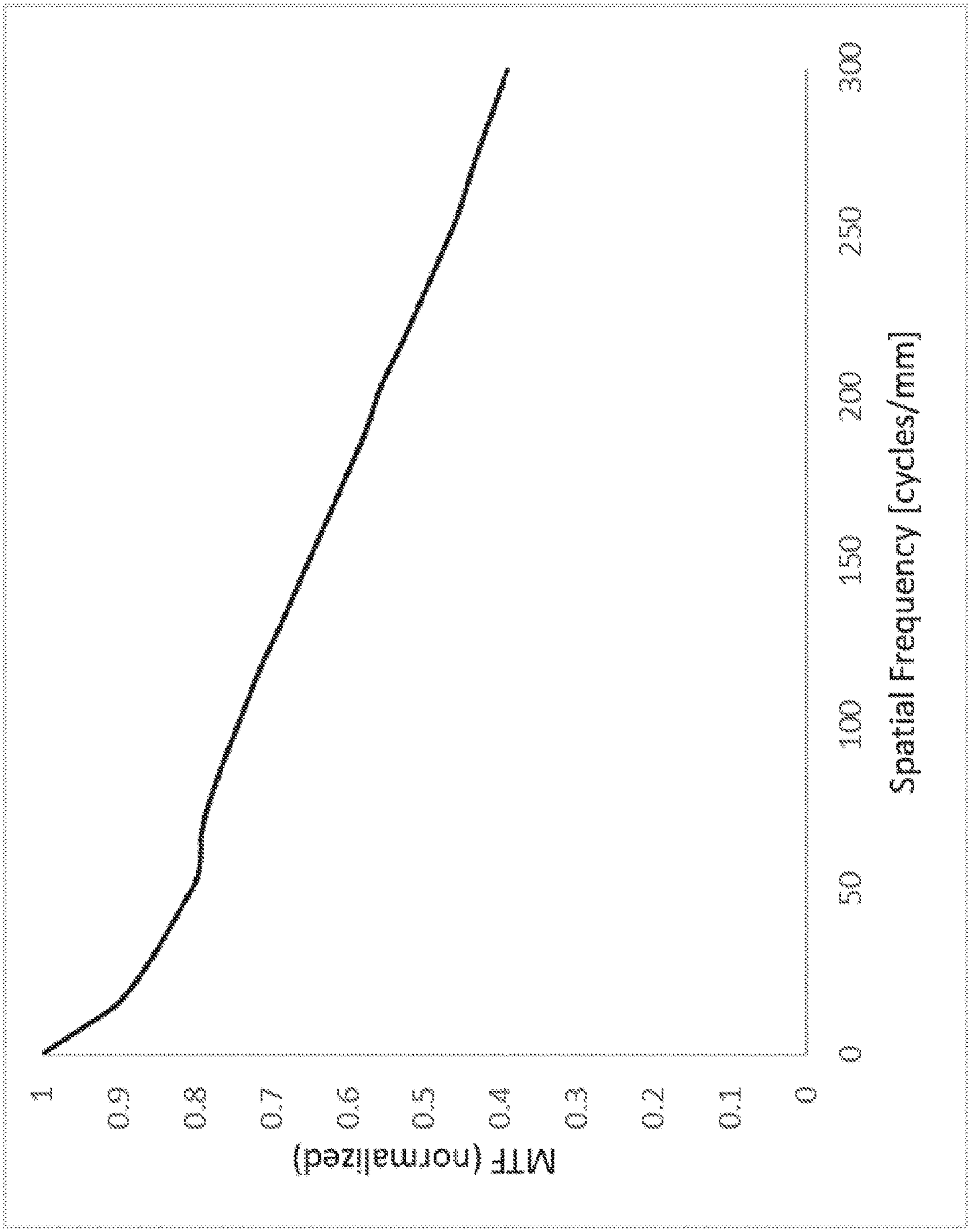
FIG. 8B illustrates the Modulation Transfer Function corresponding to the amplitude modulation of FIG. 8A, calculated for 555 nm wavelength.

FIG. 8B plots the Modulation Transfer Function of the amplitude modulation mask 807 formed over the zone 806 of the contact lens 801 of FIG. 8A, calculated for 555 nm wavelength. The mask pattern resulted in a moderately significant change in the MTF across the spatial frequencies (e.g., a greater distance between the rings and thinner thickness of the rings may not be as effective in changing the MTF curve versus single vision).

Figure 9A:
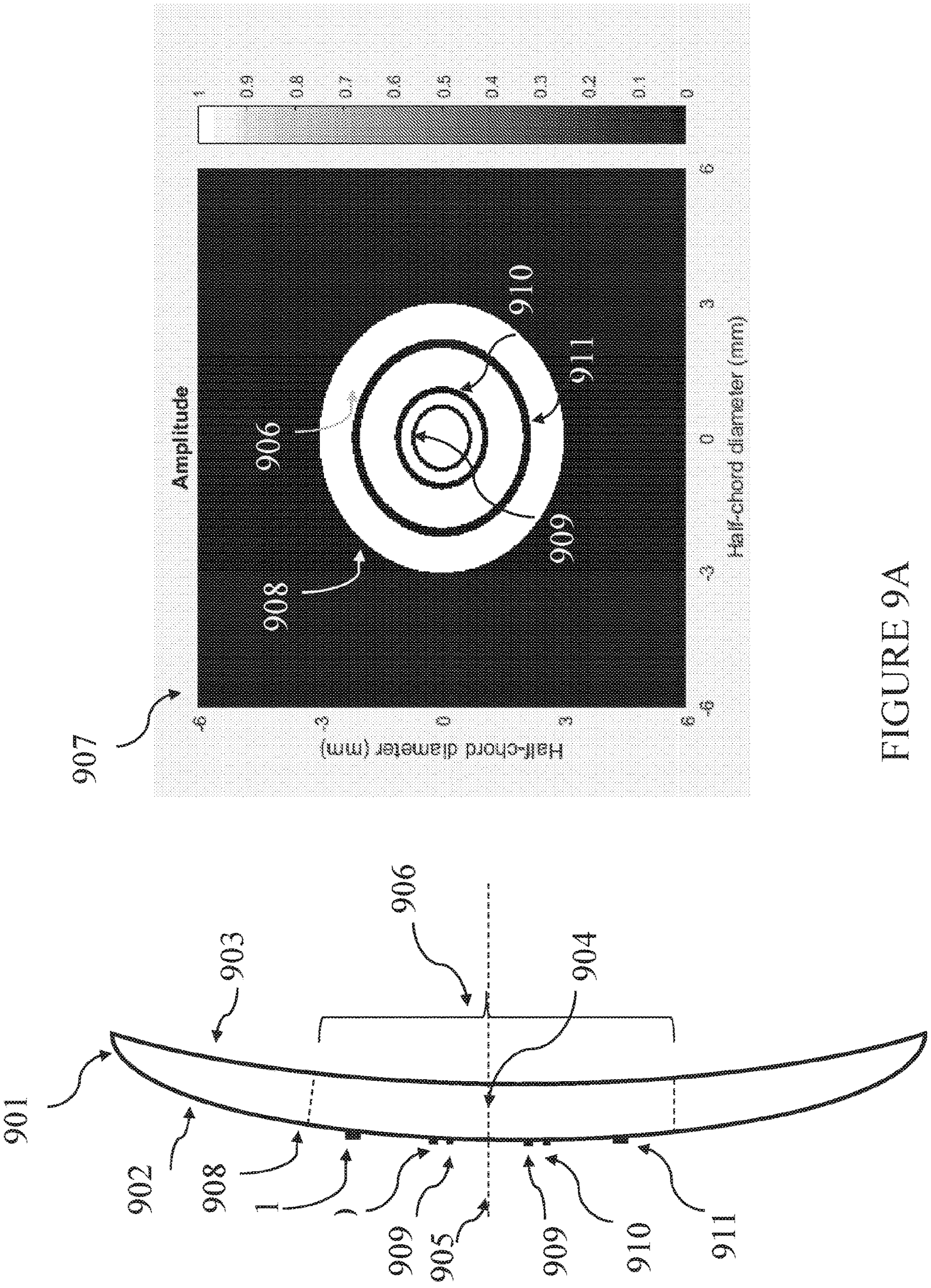
FIG. 9A illustrates an exemplary embodiment of amplitude modulation between zero and one to incoming fields across 6 mm circular aperture size. Zero means absorption and one means that light may pass the transmission without change. The embodiment includes a three annular concentric ring mask of varying widths (0.1 mm, 0.15 mm and 0.2 mm) each with 0 amplitude modulation transmission located between at 0.65-0.75 mm, 1-1.15 mm and 2-2.2 mm semi-diameter positions from the mask center.

FIG. 9A illustrates a cross-section of an ophthalmic lens, for example a single vision contact lens 901, with a front surface 902, a back surface 903, a central thickness 904, an optical axis 905 and a central optical zone 906. Alongside the lens cross-section is a 12 mm×12 mm square 907 illustrating the pattern of an amplitude modulation mask 908 included in the 6 mm central optic zone 906 on the front surface 902 of the contact lens 901. In this example, the mask patterned is a three annular concentric ring mask of varying widths 909-911 (0.1 mm, 0.15 mm and 0.2 mm, respectively) each with 0 amplitude modulation transmission located between at 0.65-0.75 mm, 1-1.15 mm and 2-2.2 mm semi-diameter positions from the mask center. The amplitude gradient scale indicates the modulation amplitude of the rings 909, 910 and 911 is 0, i.e., no transmittance. In some embodiments, patterns may have a varying amplitude and may have values ranging between 0.0 and 1. In some embodiments, the amplitudes may be random or patterned or progressively increasing away from the lens center or progressively decreasing toward the periphery of zone.

Figure 9B:
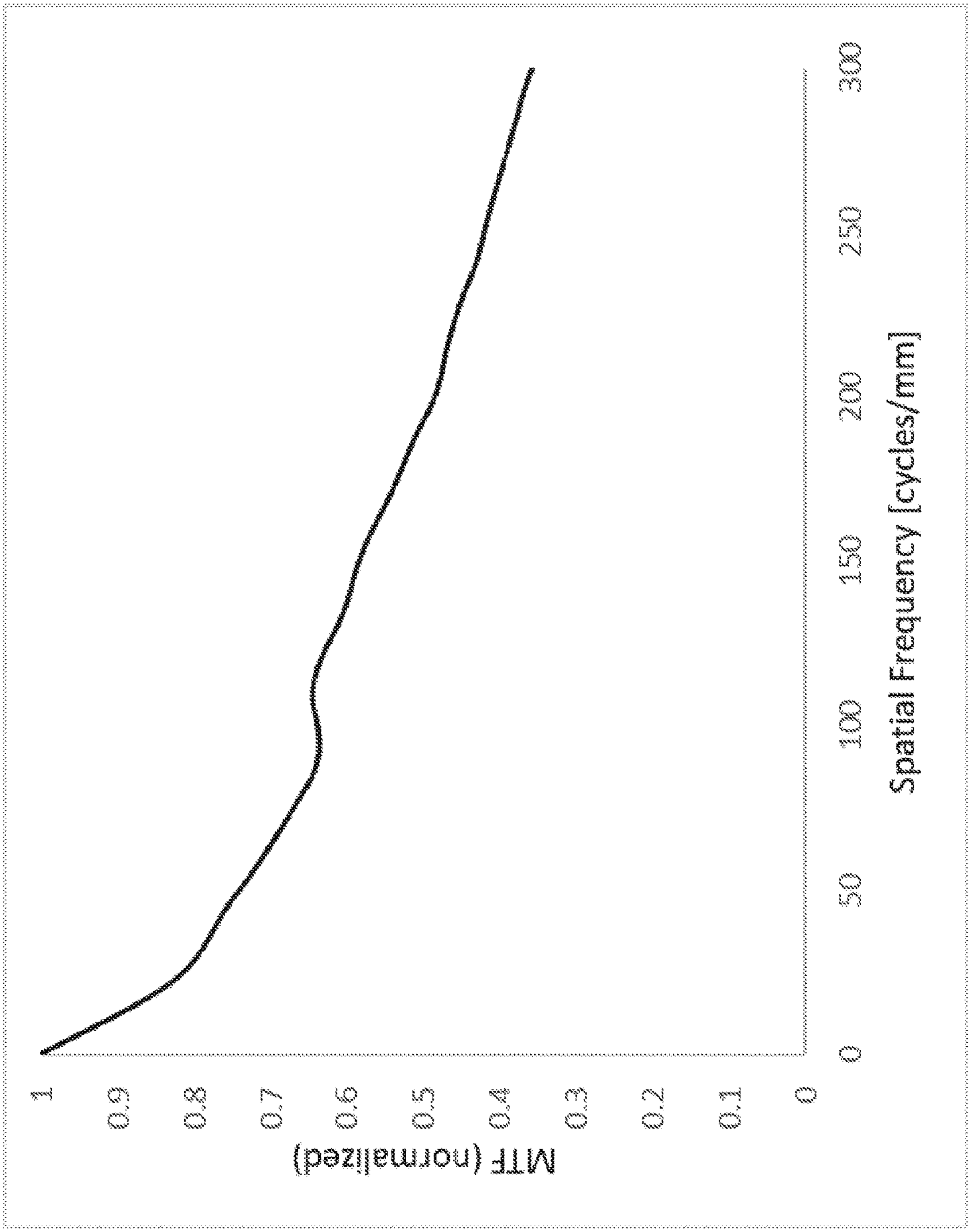
FIG. 9B illustrates the Modulation Transfer Function corresponding to the amplitude modulation of FIG. 9A, calculated for 555 nm wavelength.

FIG. 9B plots the Modulation Transfer Function of the amplitude modulation mask 907 formed over the zone 906 of the contact lens 901 of FIG. 9A, calculated for 555 nm wavelength. The mask pattern resulted in a moderately significant change in the MTF across the spatial frequencies. As illustrated, in some embodiments, the number, distribution and/or spacing of ring masks may be configured to selectively manipulate the change in MTF curve at different spatial frequencies (e.g., the narrower gap between the rings 909 and 910 moderately decreased the MTF at mid spatial frequencies but also was able to create a plateau in the curve across a band of spatial frequencies). The 3rd ring in the periphery continued to have a mild effect at low spatial frequencies in the 1-30 c/mm range. However, to substantially decrease the MTF it may be desirable to add further rings and control their respective spacing.

Figure 10A:
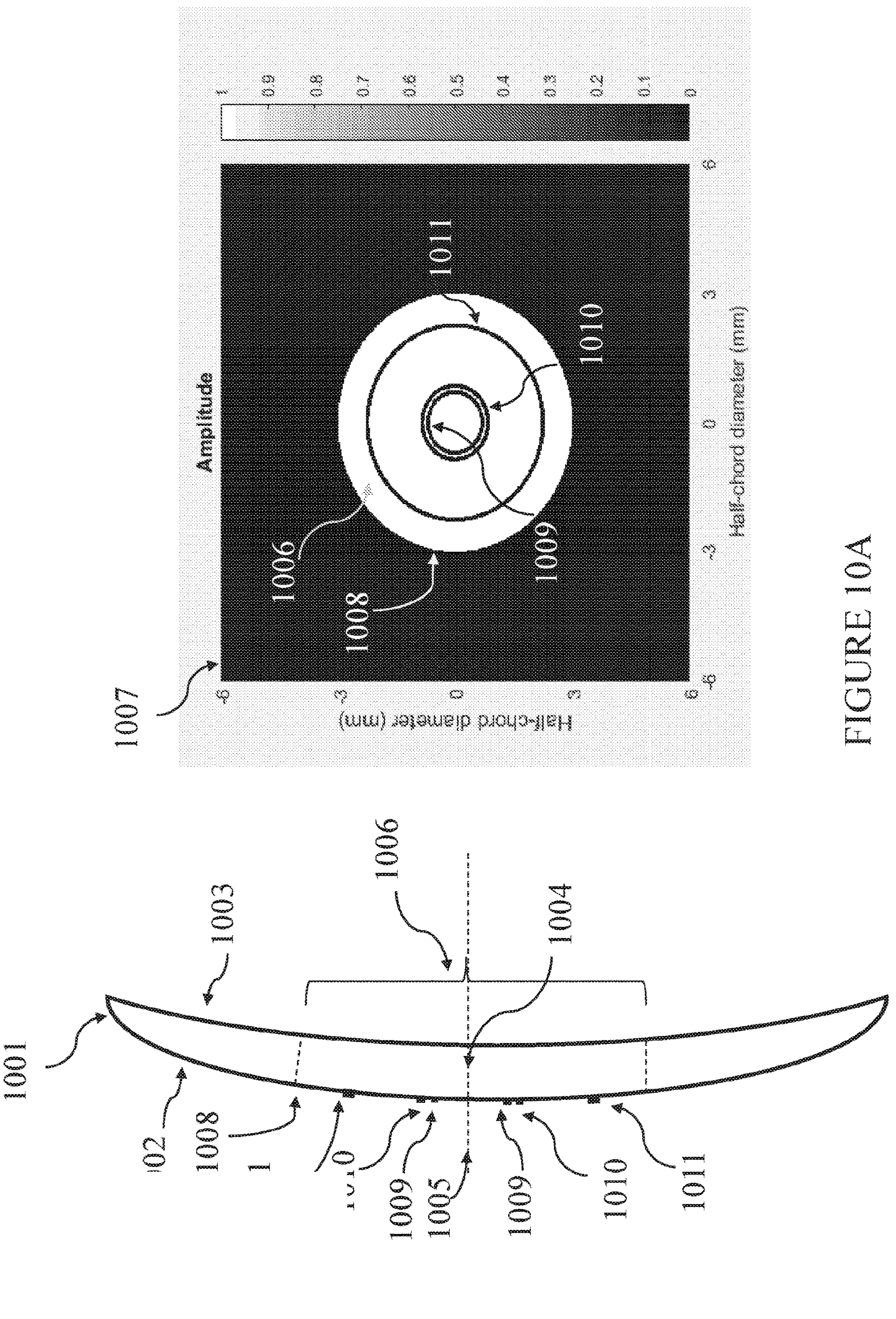
FIG. 10A illustrates an exemplary embodiment of amplitude modulation between zero and one to incoming fields across 6 mm circular aperture size. Zero means absorption and one means that light may pass the transmission without change. The embodiment includes a three annular concentric ring mask with each ring of 0.1 mm width and with 0 amplitude modulation transmission located between at 0.65-0.75 mm, 0.8-0.9 mm and 2.2-2.3 mm semi-diameter positions from the mask center.

FIG. 10A illustrates a cross-section of an ophthalmic lens, for example a single vision contact lens 1001, with a front surface 1002, a back surface 1003, a central thickness 1004, an optical axis 1005 and a central optical zone 1006. Alongside the lens cross-section is a 12 mm×12 mm square 1007 illustrating the pattern of an amplitude modulation mask 1008 included in the 6 mm central optic zone 1006 on the front surface 1002 of the contact lens 1001. In this example, the mask patterned is a three annular concentric ring mask with each ring 1009-1011 of 0.1 mm width and with 0 amplitude modulation transmission located between at 0.65-0.75 mm, 0.8-0.9 mm and 2.2-2.3 mm semi-diameter positions from the mask center. The amplitude gradient scale indicates the modulation amplitude of the rings 1009, 1010 and 1011 is 0, i.e., no transmittance. In some embodiments, patterns may have a varying amplitude and may have values ranging between 0.0 and 1. In some embodiments, the amplitudes may be random or patterned or progressively increasing away from the lens center or progressively decreasing toward the periphery of zone.

Figure 10B:
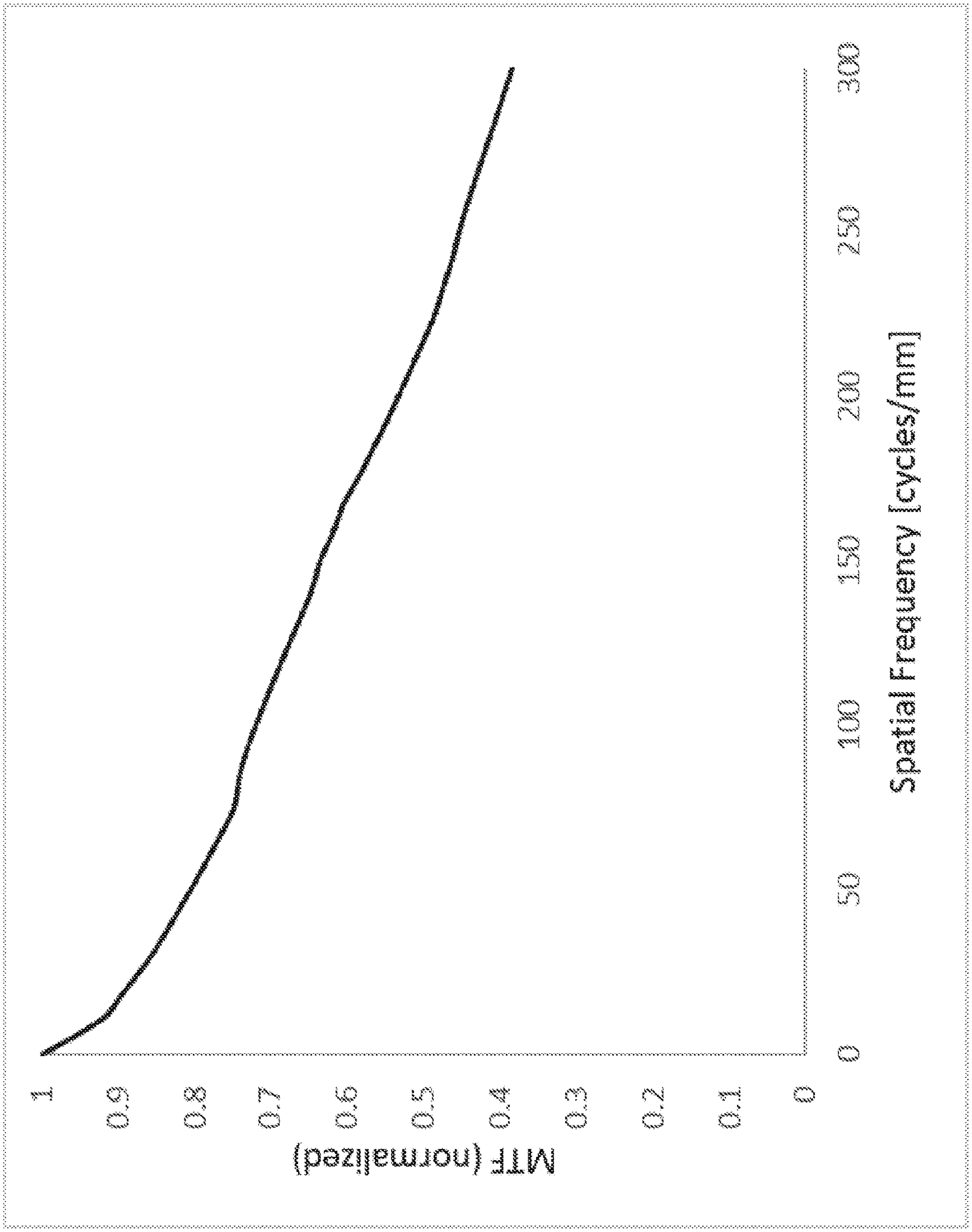
FIG. 10B illustrates the Modulation Transfer Function corresponding to the amplitude modulation of FIG. 10A, calculated for 555 nm wavelength.

FIG. 10B plots the Modulation Transfer Function of the amplitude modulation mask 1008 formed over the zone 1006 of the contact lens 1001 of FIG. 10A, calculated for 555 nm wavelength. The mask pattern resulted in a moderately significant change in the MTF across the spatial frequencies. As further illustrated by this figure, the thinner thickness and very close spacing of this 3 ring mask may not be as effective as the mask in FIG. 9 to selectively manipulate the change in MTF curve at different spatial frequencies (e.g. this mask of FIG. 10 only mildly decreased the MTF at low and mid spatial frequencies). The very thin ring 1010 in the periphery continued to have a mild effect at low spatial frequencies in the 1-30 c/mm range but was less than ring 911 of FIG. 9.

Figure 11A:
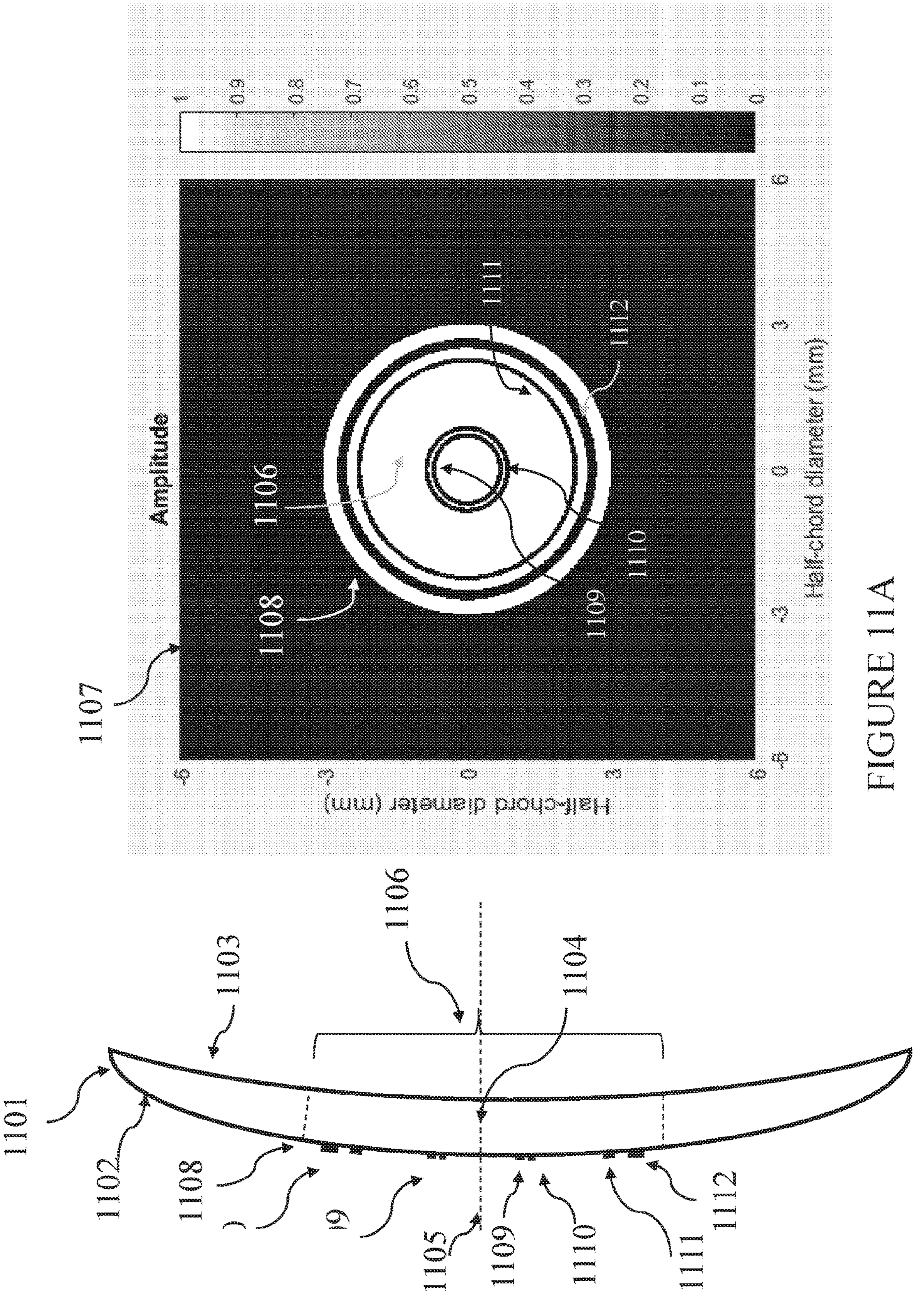
FIG. 11A illustrates an exemplary embodiment of amplitude modulation between zero and one to incoming fields across 6 mm circular aperture size. Zero means absorption and one means that light may pass the transmission without change. The embodiment includes a four annular concentric ring mask of varying widths (0.1 mm, 0.1 mm, 0.1 mm and 0.2 mm) each with 0 amplitude modulation transmission located between at 0.65-0.75 mm, 0.8-0.9 mm, 2.2-2.3 mm and 2.5-2.7 mm semi-diameter positions from the mask center.

FIG. 11A illustrates a cross-section of an ophthalmic lens, for example a single vision contact lens 1101, with a front surface 1102, a back surface 1103, a central thickness 1104, an optical axis 1105 and a central optical zone 1106. Alongside the lens cross-section is a 12 mm×12 mm square 1107 illustrating the pattern of an amplitude modulation mask 1108 included in the 6 mm central optic zone 1106 on the front surface 1102 of the contact lens 1101. In this example, the mask patterned is a four annular concentric ring mask of varying widths 1109-1112 (0.1 mm, 0.1 mm, 0.1 mm and 0.2 mm, respectively) each with 0 amplitude modulation transmission located between at 0.65-0.75 mm, 0.8-0.9 mm, 2.2-2.3 mm and 2.5-2.7 mm semi-diameter positions from the mask center. The amplitude gradient scale indicates the modulation amplitude of the rings 1109, 1110, 1111 and 1112 is 0, i.e., no transmittance. In some embodiments, patterns may have a varying amplitude and may have values ranging between 0.0 and 1. In some embodiments, the amplitudes may be random or patterned or progressively increasing away from the lens center or progressively decreasing toward the periphery of zone.

Figure 11B:
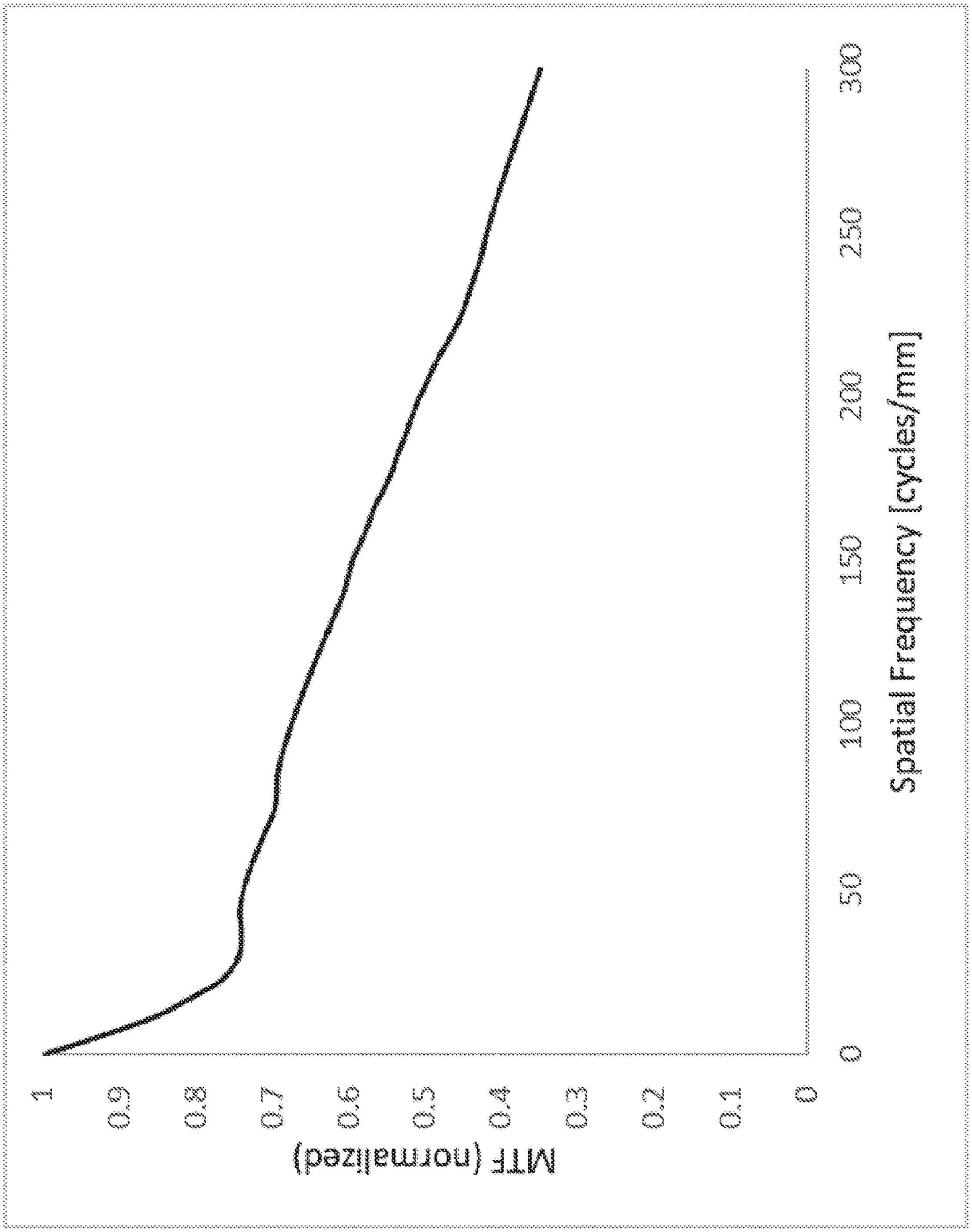
FIG. 11B illustrates an exemplary embodiment of the Modulation Transfer Function corresponding to the amplitude modulation of FIG. 11A, calculated for 555 nm wavelength.

FIG. 11B plots the Modulation Transfer Function of the amplitude modulation mask 1107 formed over the zone 1106 of the contact lens 1101 of FIG. 11A, calculated for 555 nm wavelength. The mask pattern resulted in a moderately significant change in the MTF across the spatial frequencies. As further illustrated by this figure, two rings 1111 and 1112 paired closely e.g. with a small gap, in the periphery of aperture 1106 and of different thickness may significantly and/or moderately degrade the MTF at low spatial frequencies while the two closely paired thinner rings 1109 and 1110 more centrally located in aperture 1106 had about the same (e.g., within 10% or less) and a mild impact on the high spatial frequencies as the central ring pair included in the mask of FIG. 9 (e.g., 909, 910) and FIG. 10 (e.g., 1009, 1010). Therefore, in some embodiments, more rings and/or of thicker dimensions may be desirable to have a substantial change to the MTF comparable to existing myopic control ophthalmic lenses.

Figure 12A:
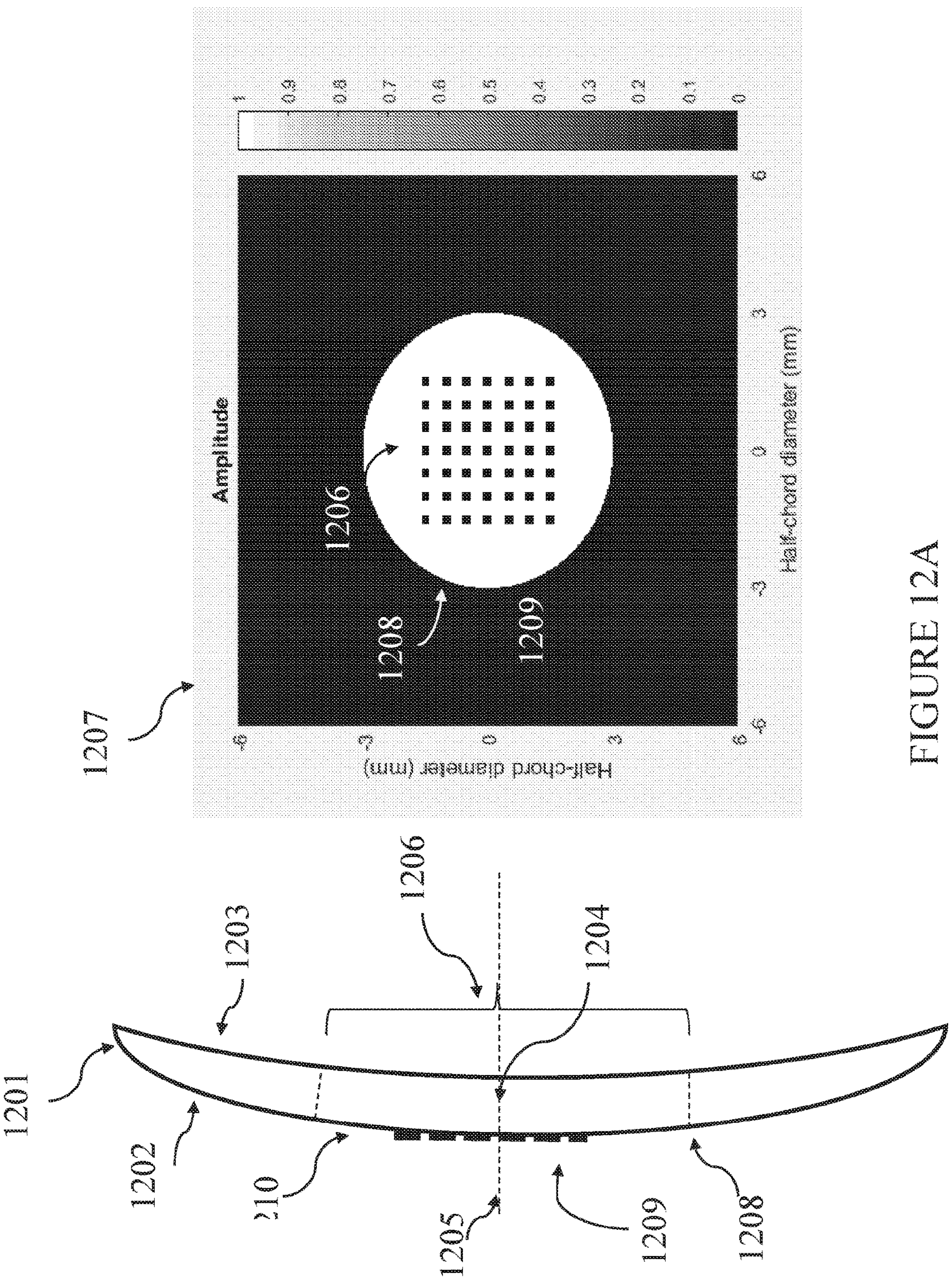
FIG. 12A illustrates amplitude modulation between zero and one to incoming fields across 6 mm circular aperture size. Zero means absorption and one means that light may pass the transmission without change. The embodiment includes a mask made up of solid filled square shaped elements of 0.2 mm×0.2 mm diameter spaced 0.5 mm apart patterned into a 7×7 square grid array. Each square has an amplitude modulation transmission of 0.

FIG. 12A illustrates a cross-section of an ophthalmic lens, for example a single vision contact lens 1201, with a front surface 1202, a back surface 1203, a central thickness 1204, an optical axis 1205 and a central optical zone 1206. Alongside the lens cross-section is a 12 mm×12 mm square 1207 illustrating the pattern of an amplitude modulation mask 1208 included in the 6 mm central optic zone 1206 on the front surface 1202 of the contact lens 1201. In this example, the mask patterned is a mask made up of a plurality of solid filled square shaped elements of 0.2 mm×0.2 mm diameter spaced 0.5 mm apart and patterned into a 7×7 square grid array 1209. In this example, the squares may have an amplitude modulation transmission of 0, i.e. no transmittance. In some embodiments, the plurality of square elements may be of unequal amplitudes and may have values ranging between 0.0 and 1. In some embodiments, the amplitudes may be random or patterned or progressively increasing away from the lens center or progressively decreasing toward the periphery of zone 1206.

Figure 12B:
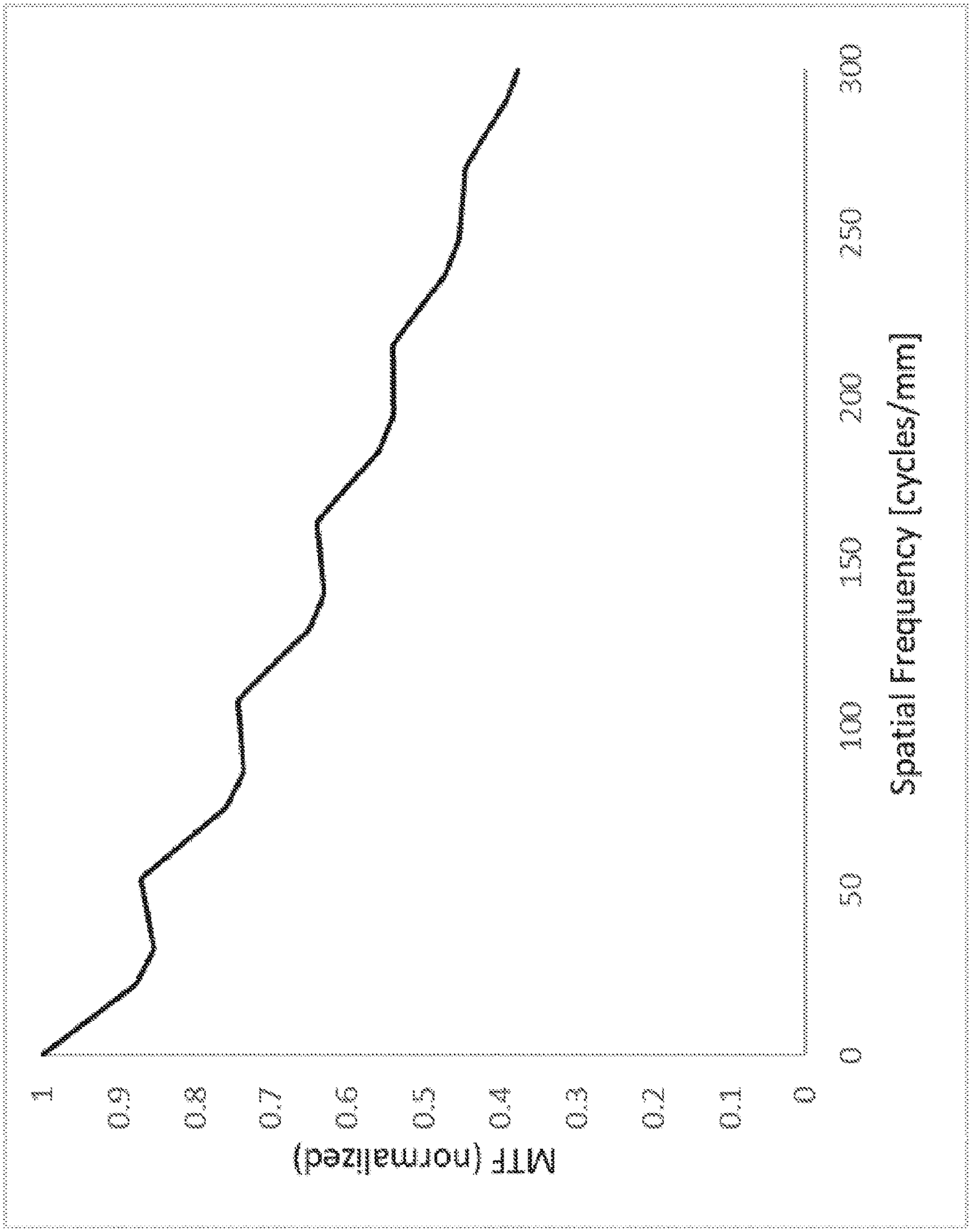
FIG. 12B illustrates the Modulation Transfer Function corresponding to the amplitude modulation of FIG. 12A, calculated for 555 nm wavelength.

FIG. 12B plots the Modulation Transfer Function of the amplitude modulation mask 1207 formed over the zone 1206 of the contact lens 1201 of FIG. 12A, calculated for 555 nm wavelength. The mask pattern resulted in a moderately significant change in the MTF across the spatial frequencies. As further illustrated by this figure, an array of small dots overall may reduce the MTF compared to single vision lenses by only a mild amount but may significantly change the shape of the MTF curve from a smooth change across spatial frequency to multiple stepped changes. Therefore, masks including arrays of spot shaped amplitude masks may be useful to alter the progression of MTF changes across spatial frequencies. In some embodiments, arrays combining larger and smaller spots may be useful to selectively alter the shape of the MTF curve. In some embodiments arrays combining different shaped binary amplitude elements making up the array, for example, squares, triangular, multisided or irregular, solid or hollow shapes and freeform shapes may be useful to selectively alter the shape of the MTF curve. In some embodiments arrays combining shaped binary amplitude elements making up the array may be uniformly spaced or may be non-uniformly spaced, for example, irregularly or randomly spaced and may be useful to selectively alter the shape of the MTF curve. In some embodiments arrays combining shaped binary and non-binary amplitude elements making up the array may be useful to selectively alter the shape of the MTF curve. In some embodiments any combination of one or more of the above may be applied in a mask on an ophthalmic lens in order to substantially change the MTF overall and/or selectively at different spatial frequencies.

Figure 13:
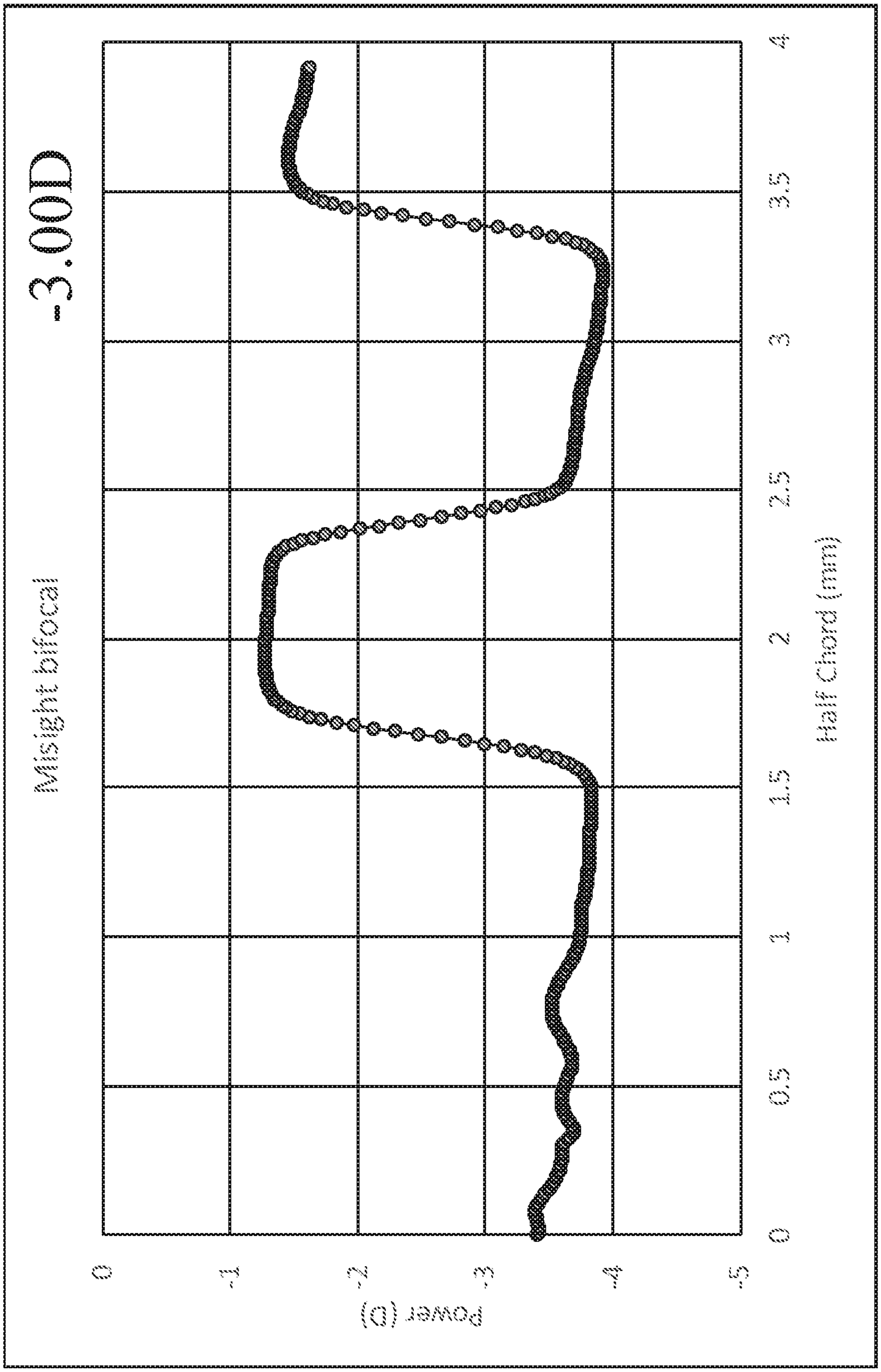
FIG. 13. shows the power profile of an annular ring bifocal contact lens (MiSight by Coopervision, Inc.) in a −3.00 D base power and +2.00 D addition power.

FIG. 13. shows the plan view of an image and power profile of an annular ring bifocal contact lens (MiSight™, Coopervision, Inc., in a −3 D base power and +2 D addition power that may be utilized in slowing myopia progression. The lens is designed with a base power of −3 D to correct the distance refractive error of the myope configured into a central zone 1301 of 3.2 mm and a second concentric annular ring 1302 of 1 mm width. A first 1303 and third 1304 annular ring of +2.00 D additional power over the base power are incorporated to provide a myopic defocus for the slow myopia progression.

FIG. 14. is a schematic diagram from Zemax representing an emmetropic model eye with the annular bifocal contact lens from FIG. 13. in place on the model eye for incoming monochromatic (e.g., 589 nm) light having a vergence of zero diopters.

Figure 15A:
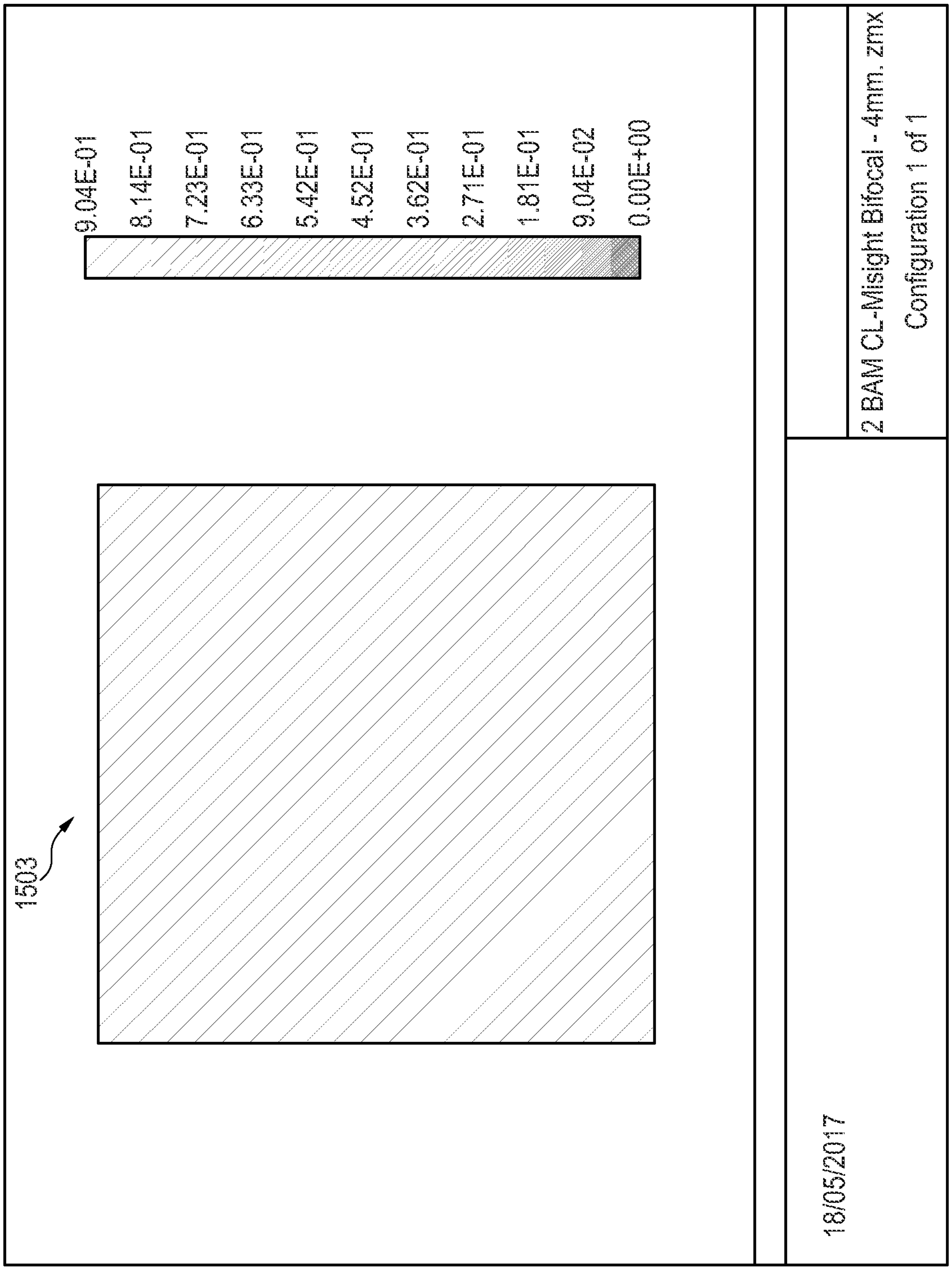
FIG. 15A displays the light (e.g., unimpeded or unmodulated light) transmittance map through a central portion of an ophthalmic lens, for example, the MiSight contact lens of FIG. 13 placed on the cornea of a model eye system from FIG. 14.
Figure 15B:
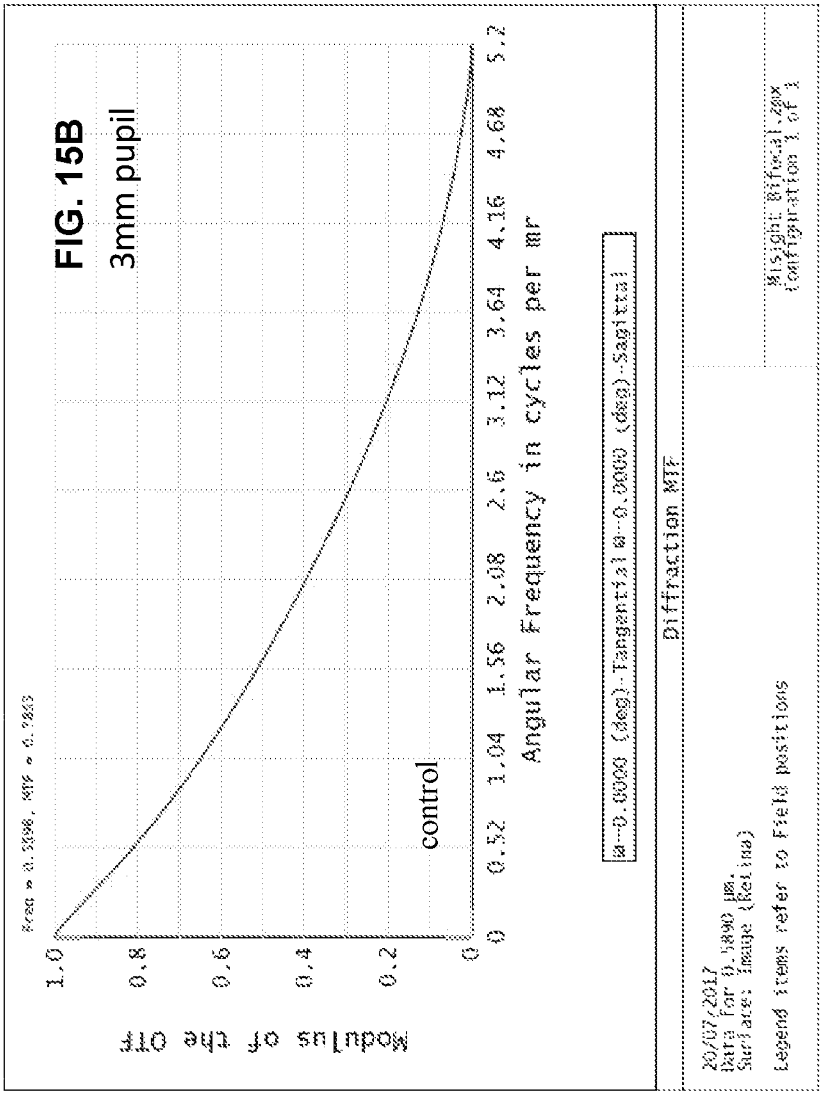
FIGS. 15B-D show plots of the modulation transfer functions (MTFs) measured through the MiSight contact lens and model eye system over pupil diameters of 3 mm, 4 mm and 5 mm, respectively.
Figure 15C:
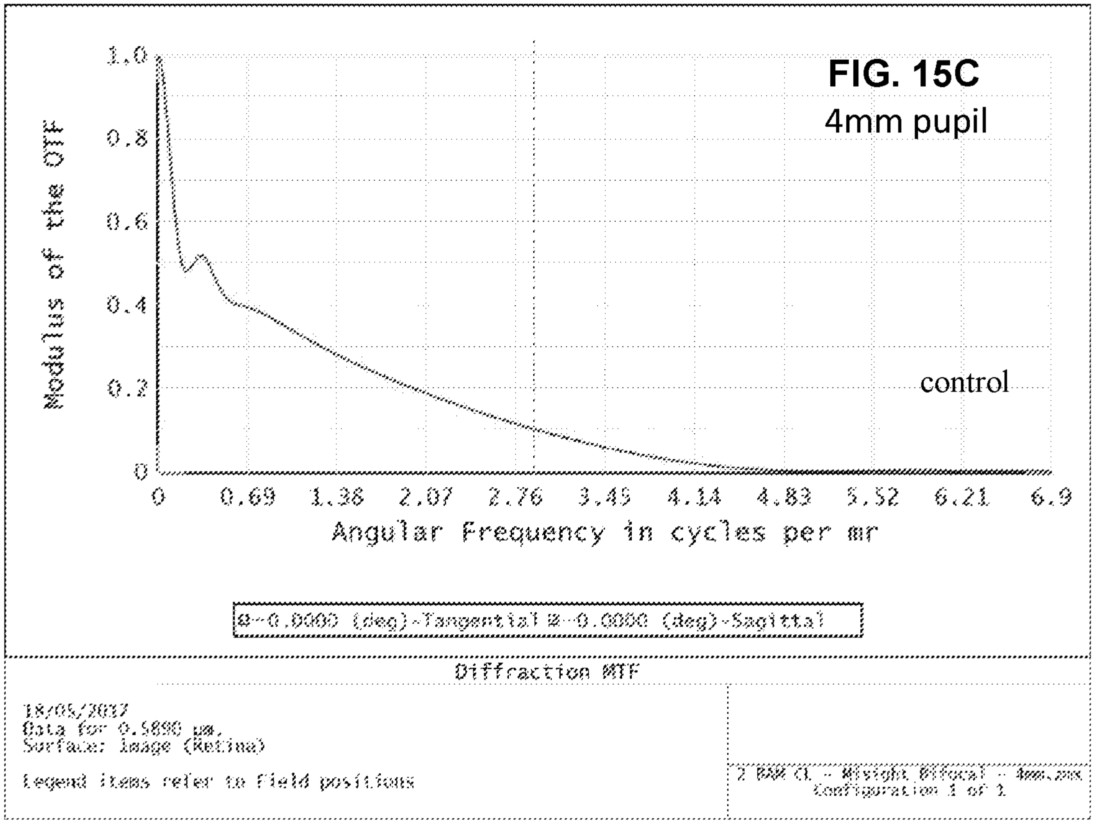
Figure 15D:
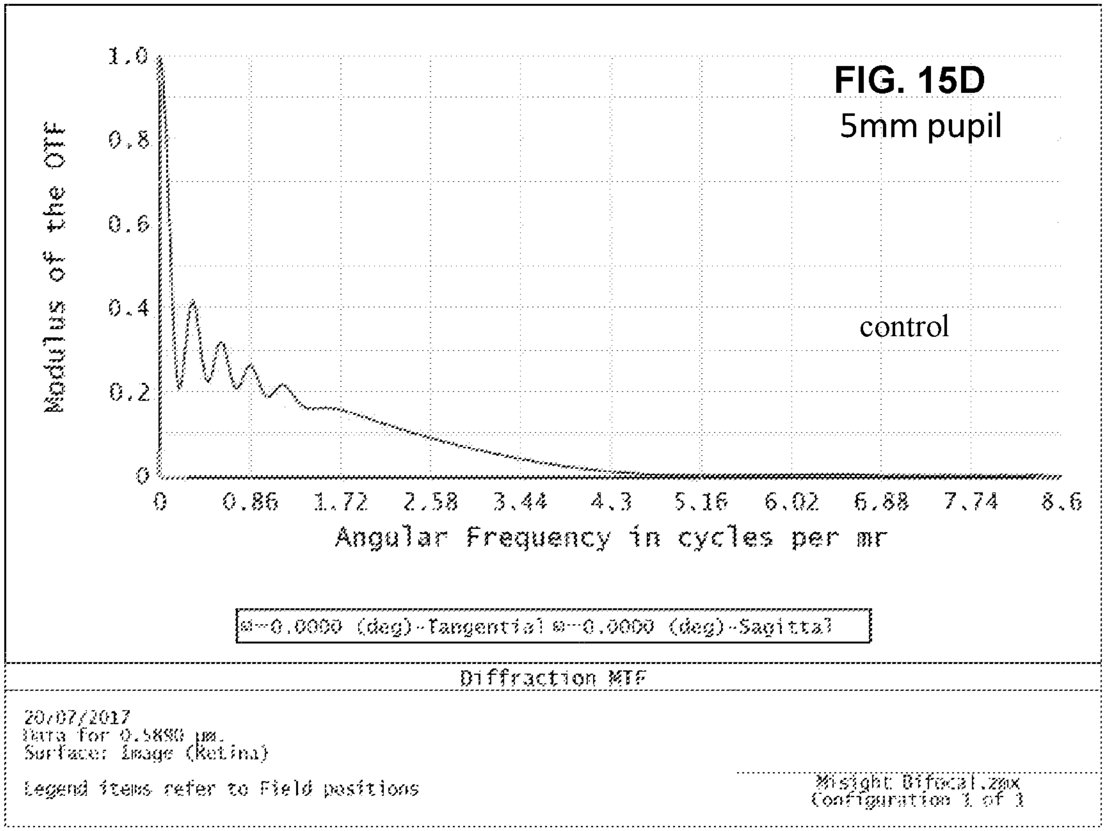

FIG. 15A displays the light (e.g., unimpeded or unmodulated light) transmittance map through a central portion of an ophthalmic lens, for example, the MiSight contact lens of FIG. 13 placed on the cornea of a model eye system from FIG. 14. FIGS. 15B-D show plots of the modulation transfer functions (MTFs) measured through the MiSight contact lens and model eye system over pupil diameters of 3 mm, 4 mm and 5 mm, respectively. In some embodiments, the MTF may be used as a metric to describe the performance of the optical system in terms of the contrast in the image at a spatial frequency. Because the lens and model eye system has no binary mask in place the transmittance map shown in FIG. 15A may have no modulation of the light amplitude over the central portion of the lens and therefore the light transmittance may not be impeded as indicated on the map by a value of 1.0 on the light amplitude scale. The MTFs at each pupil size shown in FIGS. 15B-D demonstrate the power profile of the MiSight contact lens may substantially change, for example reduce, the contrast in the image across the spatial frequencies compared to a no lens control measurement previously shown in FIG. 1A.

In some embodiments, a binary amplitude mask may be configured to closely mimic the MTF of ophthalmic lenses, for example, contact lenses or spectacle lenses incorporating optical designs that may control the eye growth of progressive myopes. In some embodiments, the binary mask may be configured with no defocus power e.g., the power profile of the base lens in which the mask may be combined may contain a power profile to correct the refractive error of the wearer but may not include an additional power profile in a portion of the lens and may not form a defocus, for example a focal point either in front of (myopic defocus) or behind (hyperopic defocus) the retinal image plane. In some embodiments, the binary mask may be designed with defocus power e.g., the power profile of the base lens in which the mask may be combined may contain a power profile to correct, at least in part, the refractive error of the wearer and may also include an additional power profile in a portion of the lens that may form at least one defocus, for example at least one focal point either in front of (myopic defocus) or behind (hyperopic defocus) the retinal image plane or a combination of myopic and hyperopic defocus. In some embodiments, the binary mask may be designed with multiple defocus powers and the additional power profiles incorporated in a portion of the lens may be a single additional power profile e.g., a bifocal power profile or may include a multifocal power profiles that may be used to form multiple focal points in front and/or behind the retina that may control the eye growth of progressive myopes. In some embodiments, the total change in MTF, for example, the change in image contrast at a spatial frequency, resulting from the combined base lens and mask system, may result from, at least in part, a contribution from the defocus power profile included in the base lens and from, at least in part, the contribution of the binary amplitude mask. In some embodiments, the binary mask may be designed with multiple focal powers e.g., the power profile of the base lens in which the mask may be combined, may contain one or more power profiles to correct, at least in part, the refractive error of the wearer at far distances, at intermediate viewing distances and/or near working distances as may be required for the correction of presbyopia. In some embodiments, for example in the correction of presbyopia with simultaneous vision optics, the MTF of the combined lens and binary amplitude mask system may be used to provide a more optimal image quality than the base lens without the mask, for example, the MTF may be changed to eliminate, reduce or minimize visual disturbances on in focus images from out of focus images including ghost images or haloes and glare from disturbances to lights at night. In some embodiments, the mask may be useful to minimize the visual disturbances or discomfort from other undesirable optical effects such as decentrations, optical distortions from magnification effects or from defocus or from power transitions or optical junctions.

Accordingly, a binary amplitude mask, for example with no defocus power, may be designed and optimized through a merit function process in optical simulation software, for example, Zemax to approximate the MTF of another ophthalmic lens that may have be used for special applications. For example, the MiSight dual focus contact lens may be utilized for myopia control because the optical design incorporates annular rings of defocus power (FIG. 13) that may also effect the MTF (FIG. 15) over spatial frequencies sensitive to the retinal receptors. Consequently, the MTF of MiSight may be used as a merit function in Zemax as an additional surface in a standard model eye (FIG. 14) in order to design binary amplitude masks with zero defocus power, for example, annular ring masks. As part of the design and optimization process, a starting mask, for example annular ring masks, may be configured including setting the number of rings along with a starting radial location for each ring and then selecting the thicknesses of the rings as variables in the optimization within a range, for example between 0.1 mm and 0.4 mm and defining the Merit Function in Zemax, for example the MTF of MiSight as discussed and as shown in FIG. 15. Arrangements of these binary light amplitude modulation zones may enable the ophthalmic lens with no defocus power, for example a contact lens, to slow myopia progression by providing an MTF comparable to the MTF resulting from an ophthalmic lens incorporating defocus power, for example, the MiSight contact lens. In some embodiments, the rings may be set with a light transmittance, for example a zero light transmittance and the base lens in between the rings may be set, for example, as regions where no modulation of light amplitude may occur thus enabling no additional impedance of light transmittance over the base lens transmittance. In some embodiments, portions of the mask may be designed with a light amplitude modulation that may have a gradient or non-binary modulation and so light transmittance in regions may fall between complete blockage and no blockage of light transmittance.

FIGS. 16-19 show the output of the design optimization process for a series of annular ring masks incorporating zero defocus optical power. The figures provide plots of the transmittance through a central portion of a lens-model eye system for a range of zero defocus optical power optical designs utilizing binary amplitude modulation masks with 2, 3, 5 and 15 annular rings with radial locations and widths optimized through the optical simulation process. The figures also show the plots of the modulation transfer functions (MTFs) of the optimized model eye-mask system over pupil diameters of 3 mm, 4 mm and 5 mm and the plot also includes the MTF results for the control (MiSight dual focus) contact lens from FIG. 15B-C used as the merit function. Overall, the results presented in the figures demonstrate amplitude modulation, in these cases binary amplitude modulation, using rings designs may reduce the MTF selectively across spatial frequencies and pupil sizes, for example low vs medium vs high spatial frequencies and accordingly may mimic or approximate the MTF provided by ophthalmic lenses based on any other optical principles impacting retinal image quality e.g. MiSight (incorporating myopic defocus from refractive power profiles and/or optical aberrations, including higher order aberrations).

Figure 16A:
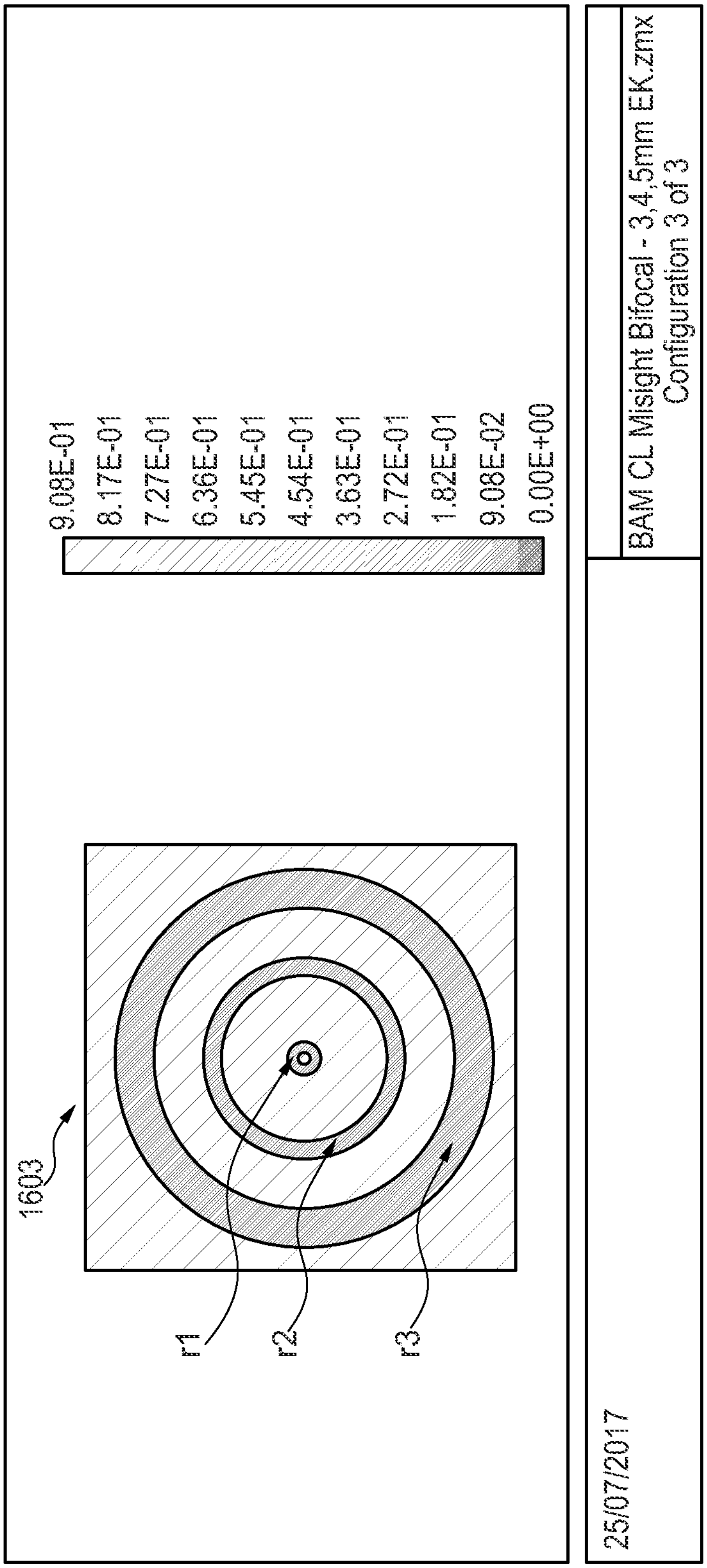
FIGS. 16A-19D illustrate exemplary embodiments of the output of the design optimization process for a series of annular ring masks incorporating zero defocus optical power.
Figure 16B:
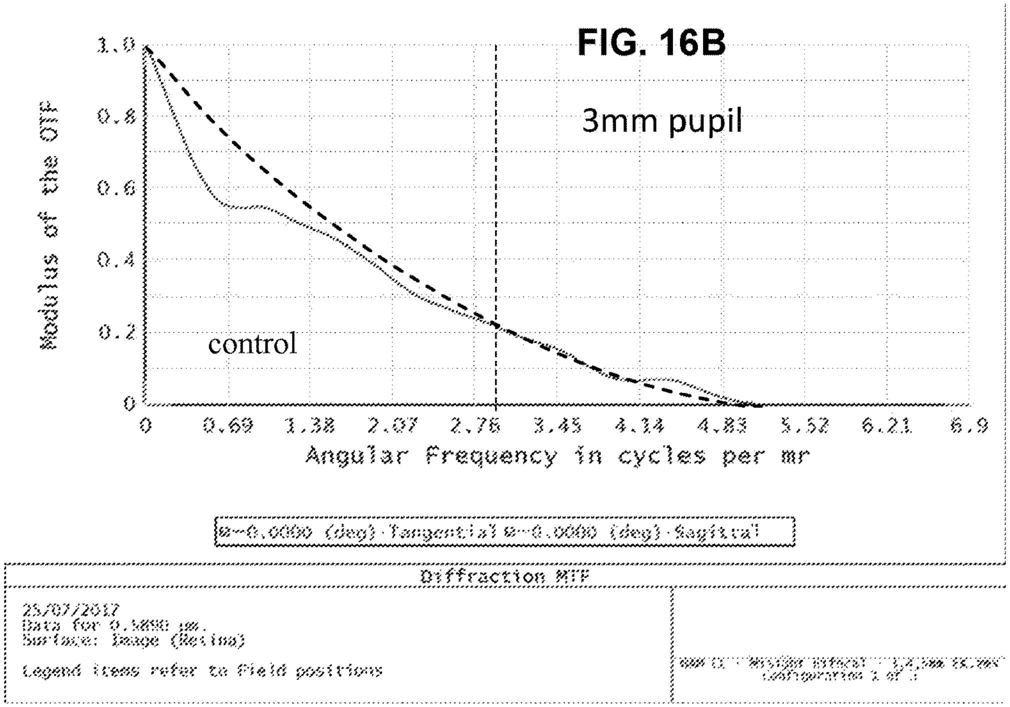
Figure 16C:
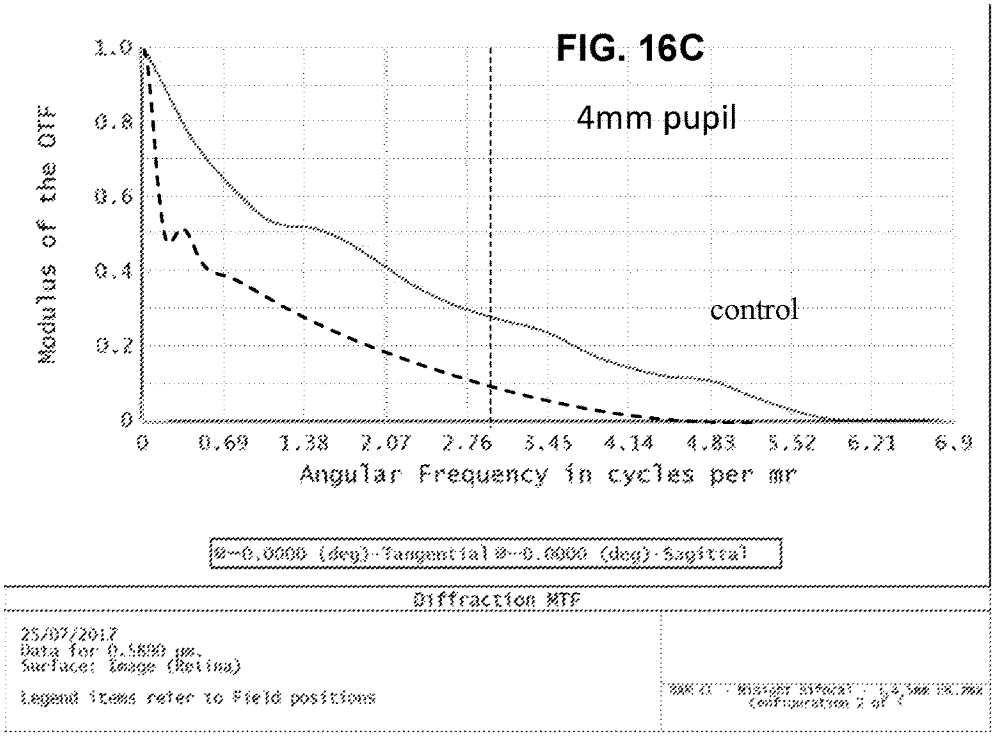
Figure 16D:
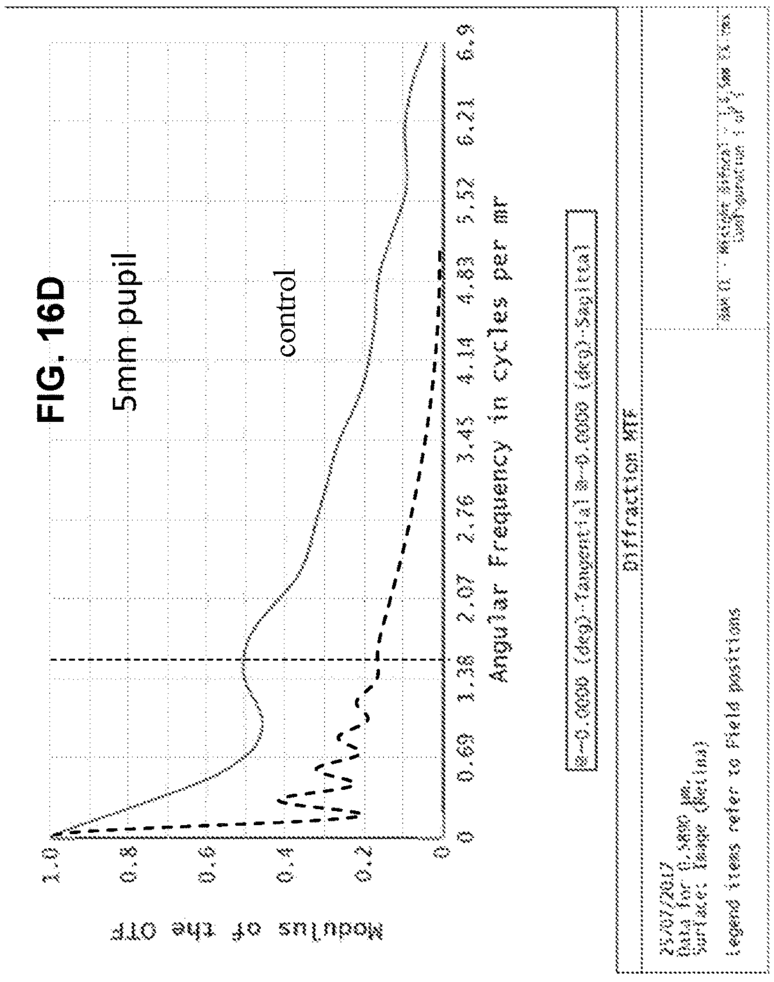

FIG. 16A shows the post optimization binary amplitude modulation map over a central 5 mm×5 mm rectangular portion 1603 of mask designed with no defocus power and 3 annular concentric rings. Prior to optimization, the binary amplitude mask was set with 3 radially spaced apart concentric rings r1 to r3 with 0.0 amplitude modulation i.e., no light transmittance, at starting radial locations 'r1 Rad' to 'r3 Rad' as shown in data table and with post optimization thicknesses 'r1 Thick' to 'r3 Thick' also output in the data table. The remaining regions of the binary amplitude modulation map i.e. the lighter regions may have a modulation value of 1.0 indicating no additional reduction of light transmittance than expected for the base lens. The MTF plots of the no defocus mask design incorporating the 3 ring mask of dimensions shown in the data table resulting from the optimization process described previously compared to the with mask and control (MiSight) lens over 3 mm, 4 mm and 5 mm pupils are shown in FIGS. 16B-D. As can be seen in FIG. 16B, the best approximation of the control lens MTF that may be achieved by the test mask occurred for 3 mm pupils and more so for medium and high spatial frequencies.

Figure 17A:
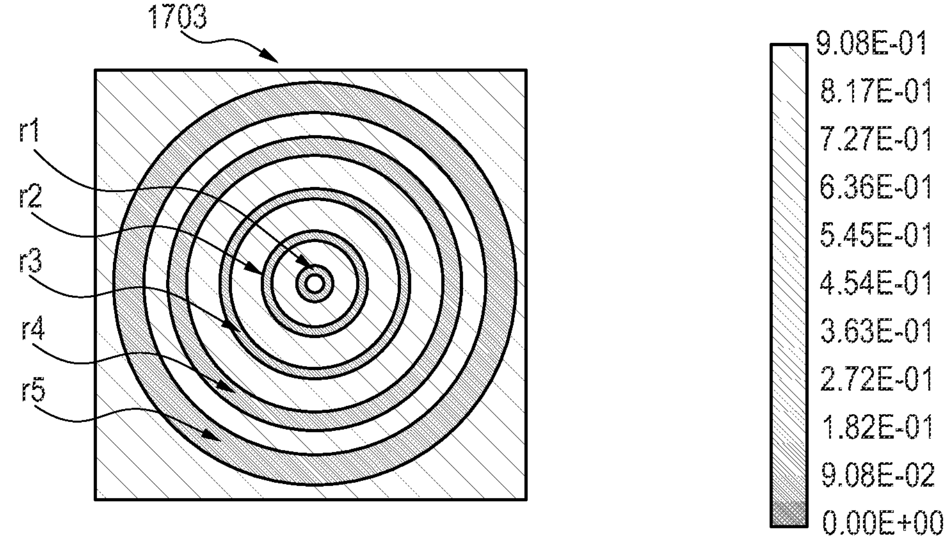
Figure 17B:
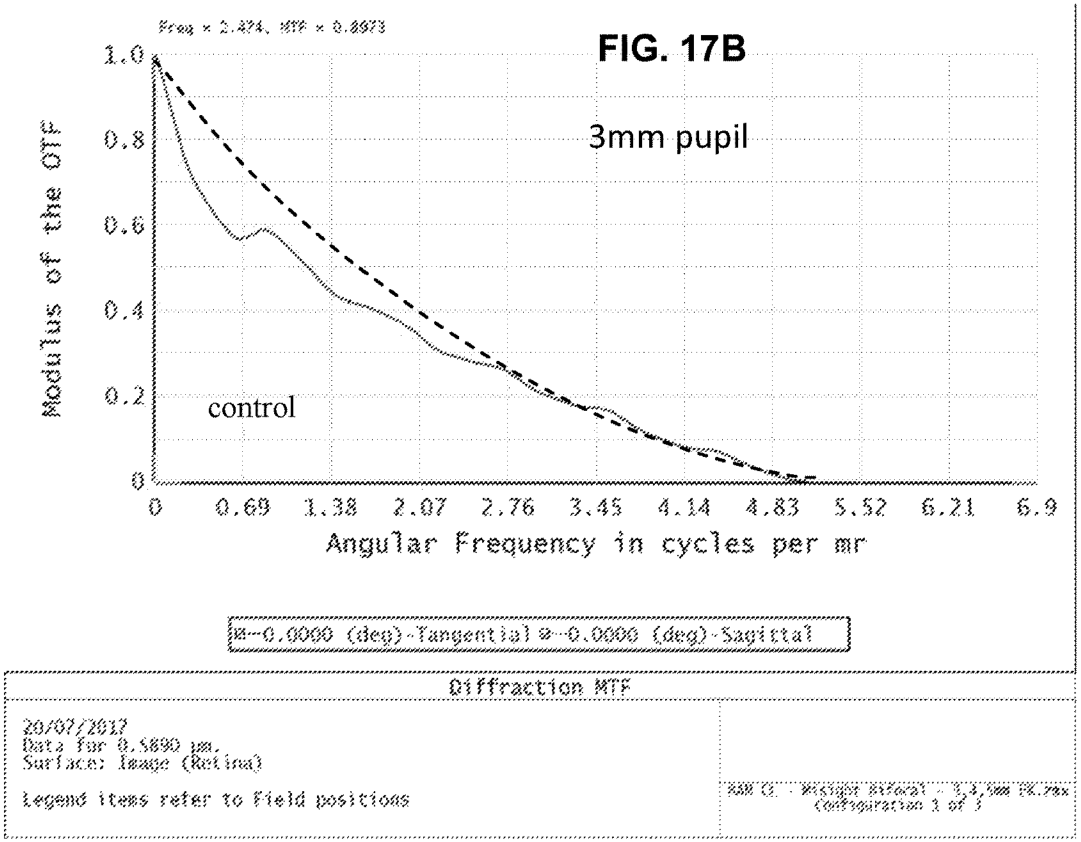
Figure 17C:
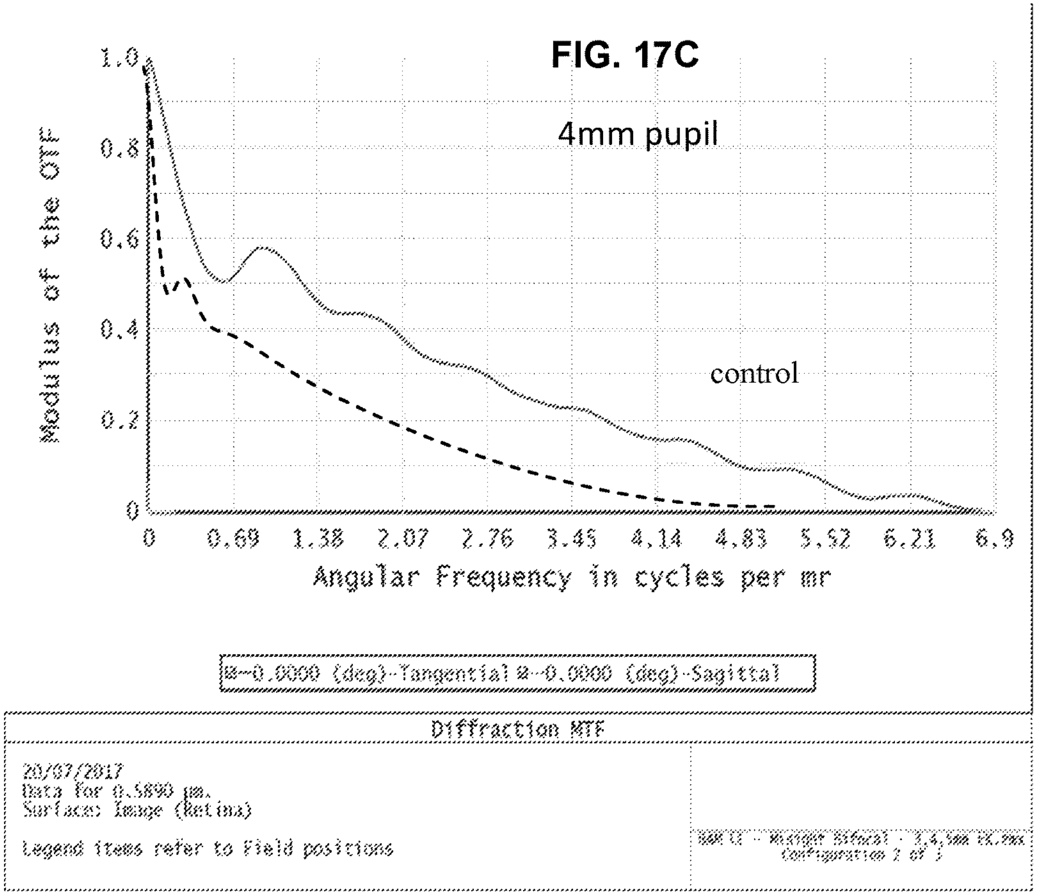
Figure 17D:
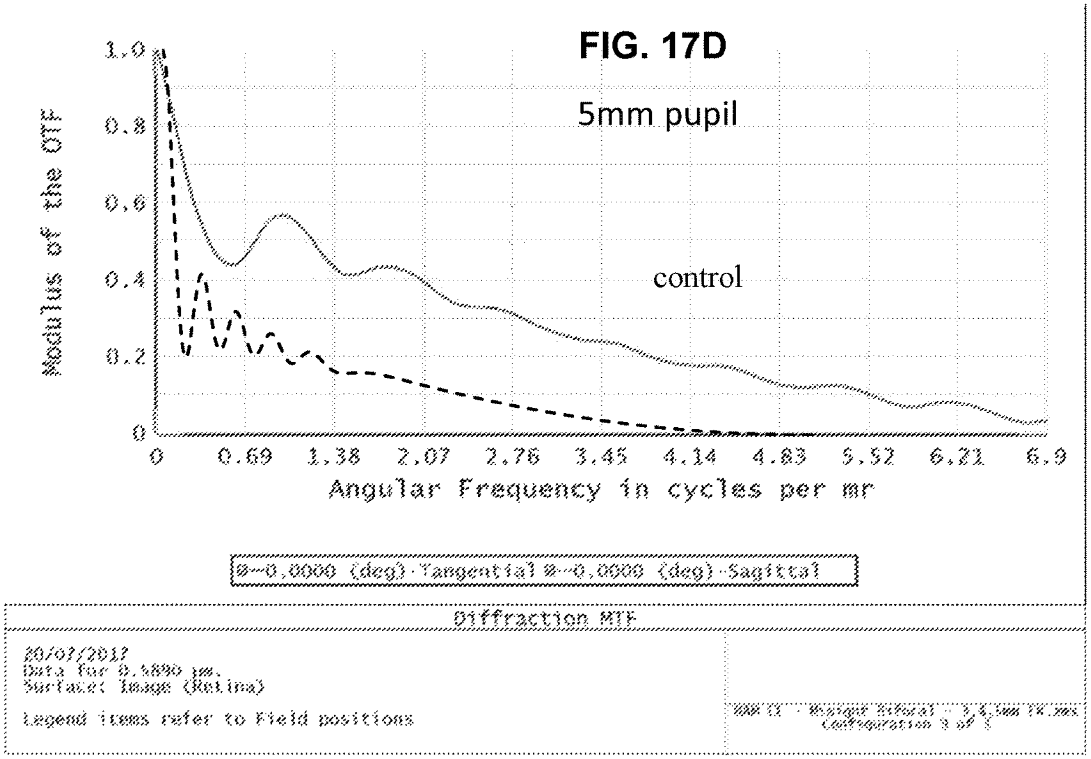

FIG. 17A shows the post optimization binary amplitude modulation map over a central 5 mm×5 mm rectangular portion 1703 of mask designed with no defocus power and 5 annular concentric rings. Prior to optimization, the binary amplitude mask was set with 5 radially spaced apart concentric rings r1 to r5 with 0.0 amplitude modulation i.e., no light transmittance, at starting radial locations 'r1 Rad' to 'r5 Rad' as shown in the data table and with post optimization thicknesses 'r1 Thick' to 'r5 Thick' also output in the data table. The remaining regions of the binary amplitude modulation map i.e., the lighter regions may have a modulation value of 1.0 indicating no additional reduction of light transmittance than expected for the base lens. The MTF plots of the no defocus mask design incorporating the 5 ring mask of dimensions shown in the data table resulting from the optimization process described previously compared to the with mask and control (MiSight) lens over 3 mm, 4 mm and 5 mm pupils are shown in FIGS. 17B-D. As can be seen in each MTF plots for each pupil size, the 5 ring test mask may achieve a close mimic of the control lens MTF at very low spatial frequencies for all 3 pupil sizes.

Figure 18A:
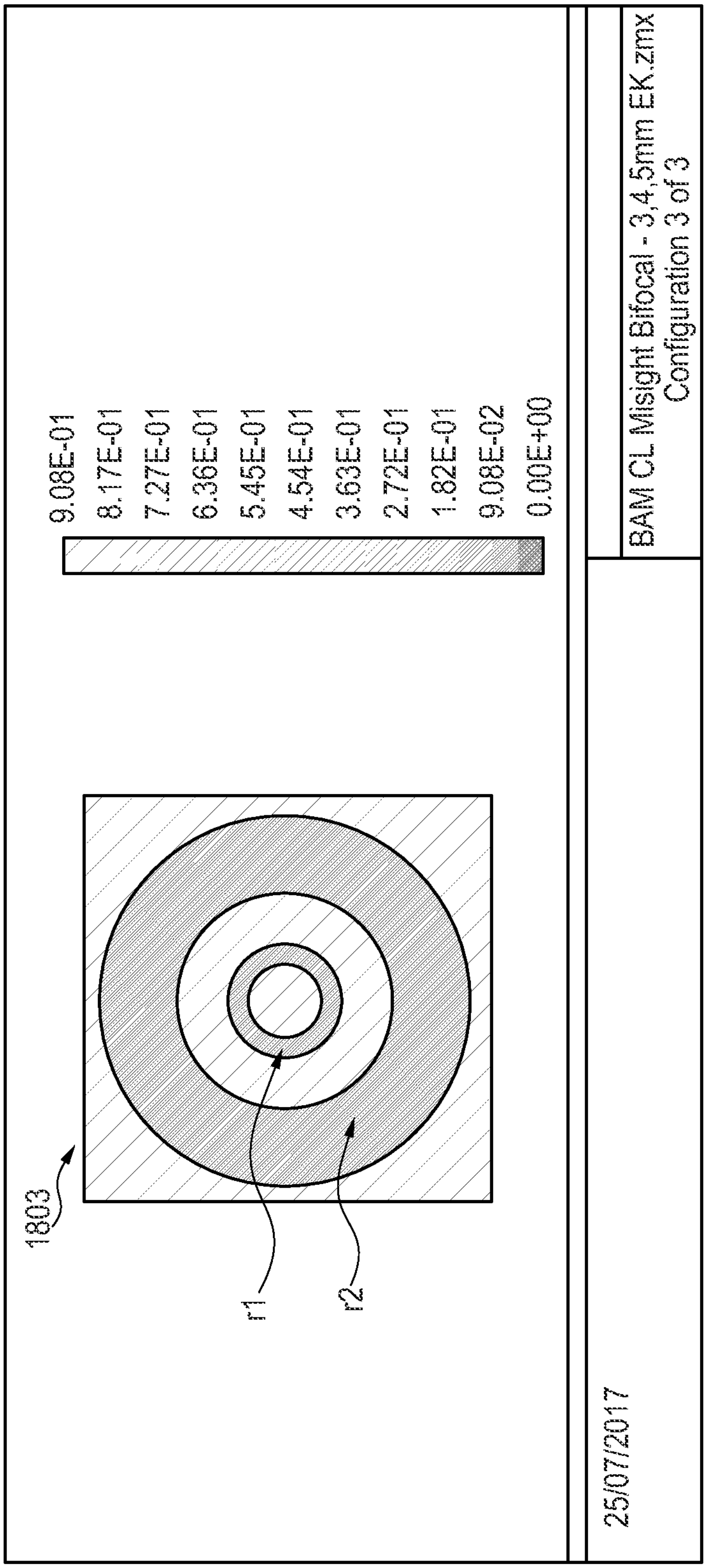
Figure 18B:
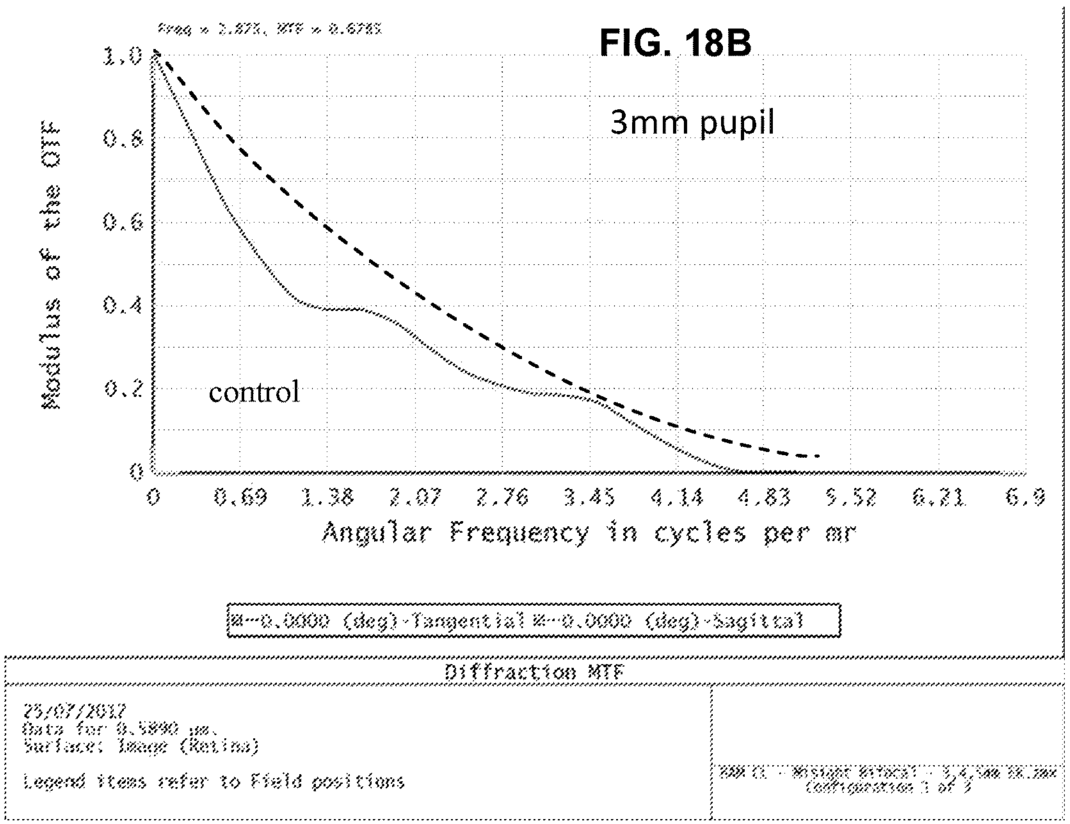
Figure 18C:
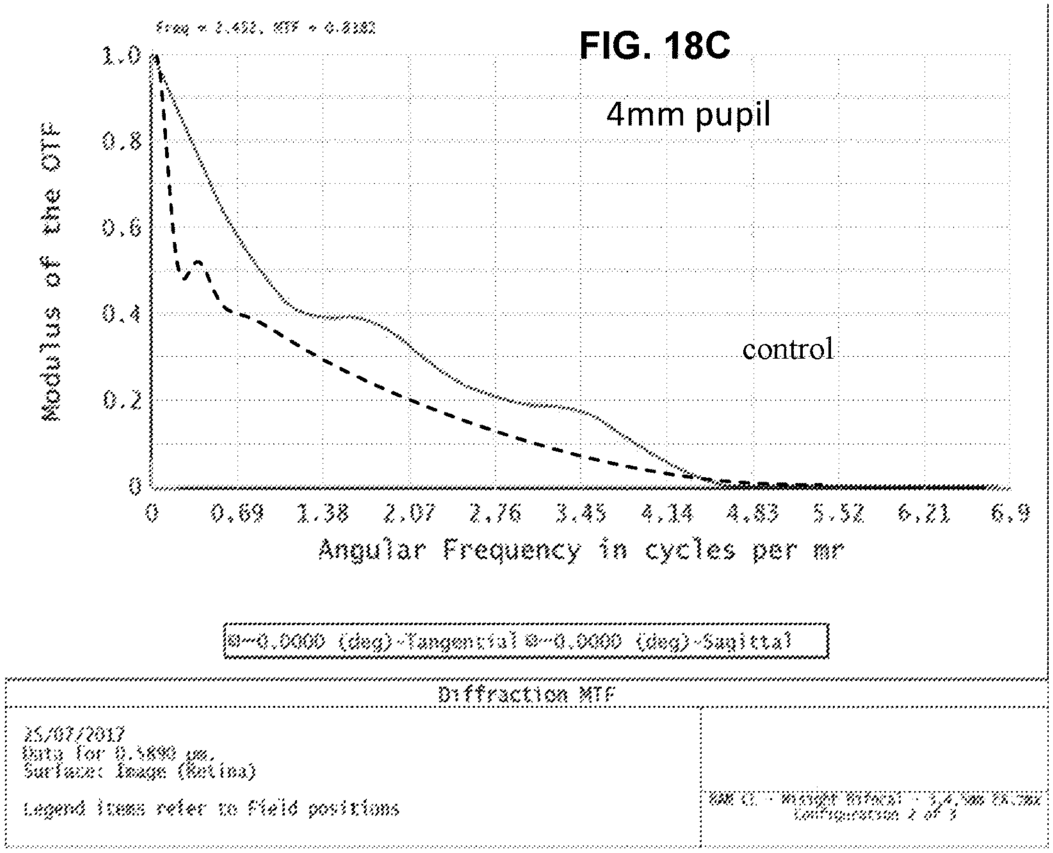
Figure 18D:
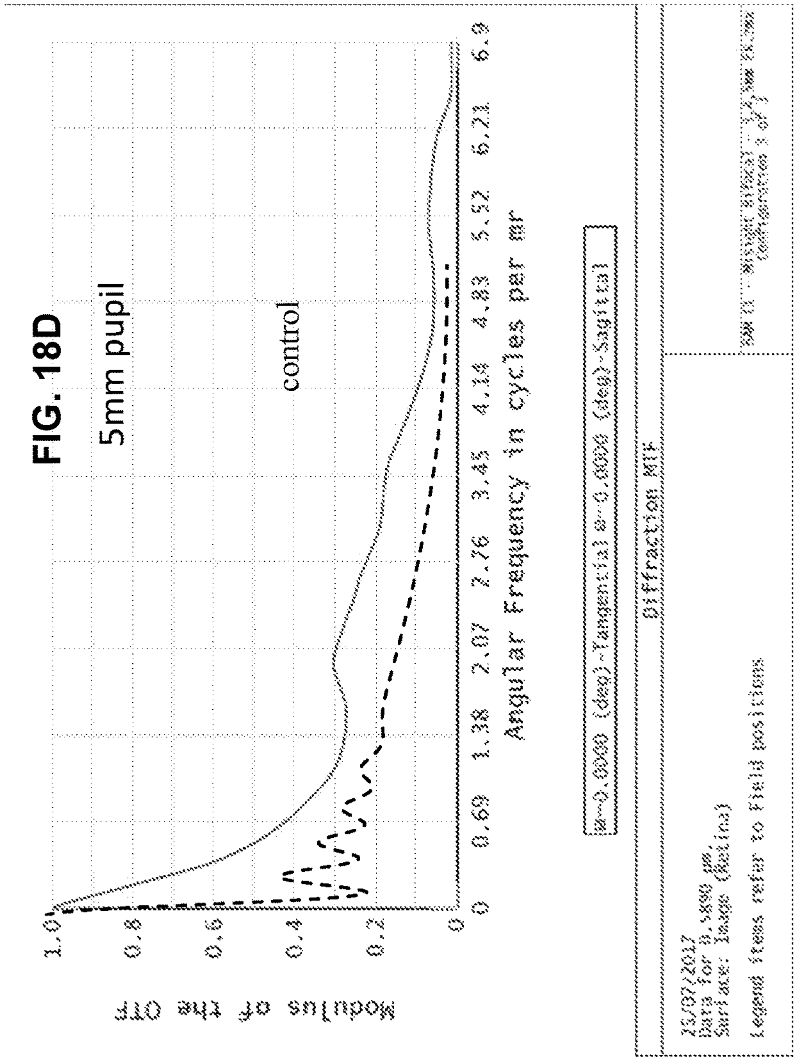

FIG. 18A shows the post optimization binary amplitude modulation map over a central 5 mm×5 mm rectangular portion 1803 of mask designed with no defocus power and 2 annular concentric rings. Prior to optimization, the binary amplitude mask was set with 2 radially spaced apart concentric rings r1 to r2 with 0.0 amplitude modulation i.e., no light transmittance, at starting radial locations 'r1 Rad' to 'r2 Rad' as shown in the data table and with post optimization thicknesses 'r1 Thick' to 'r2 Thick' also output in the data table. The remaining regions of the binary amplitude modulation map i.e., the lighter regions may have a modulation value of 1.0 indicating no additional reduction of light transmittance than expected for the base lens. The MTF plots of the no defocus mask design incorporating the 2 ring mask of dimensions shown in the data table resulting from the optimization process described previously compared to the with mask and control (MiSight) lens over 3 mm, 4 mm and 5 mm pupils are shown in FIGS. 18B-D. As can be seen in each MTF plots for each pupil size, the 2 ring test mask may achieve the best mimic of the control lens MTF across all spatial frequencies and for all 3 pupil sizes.

Figure 19A:
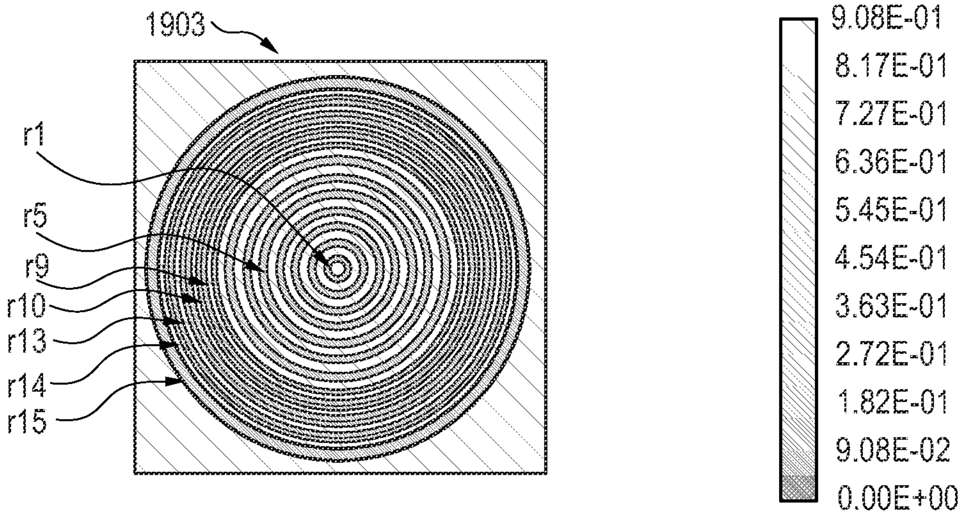
Figure 19B:
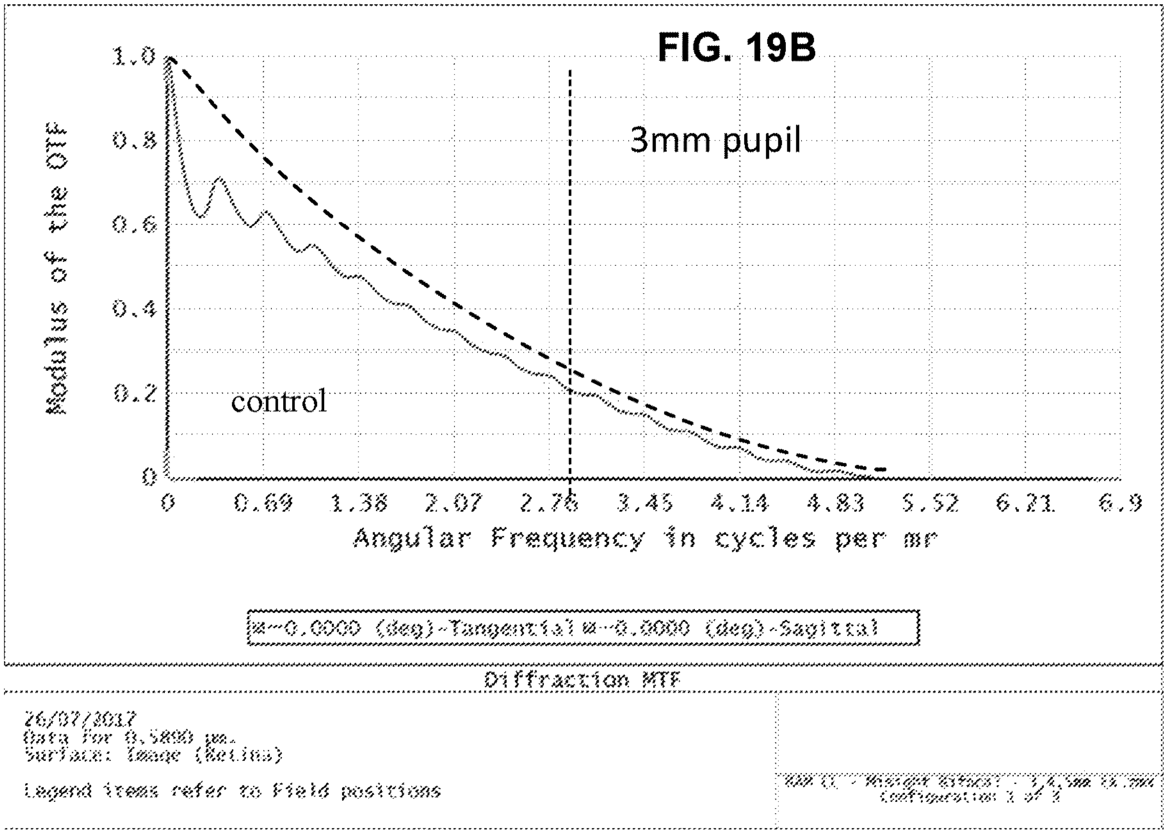
Figure 19C:
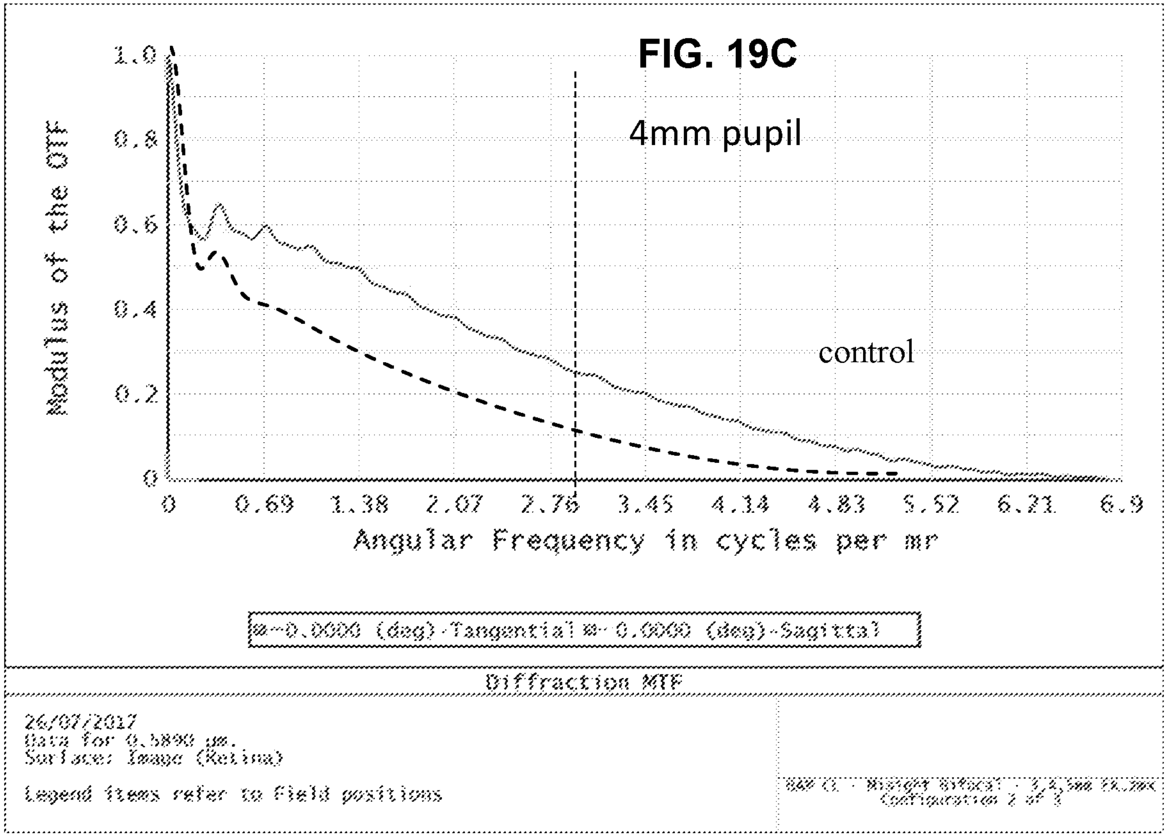
Figure 19D:
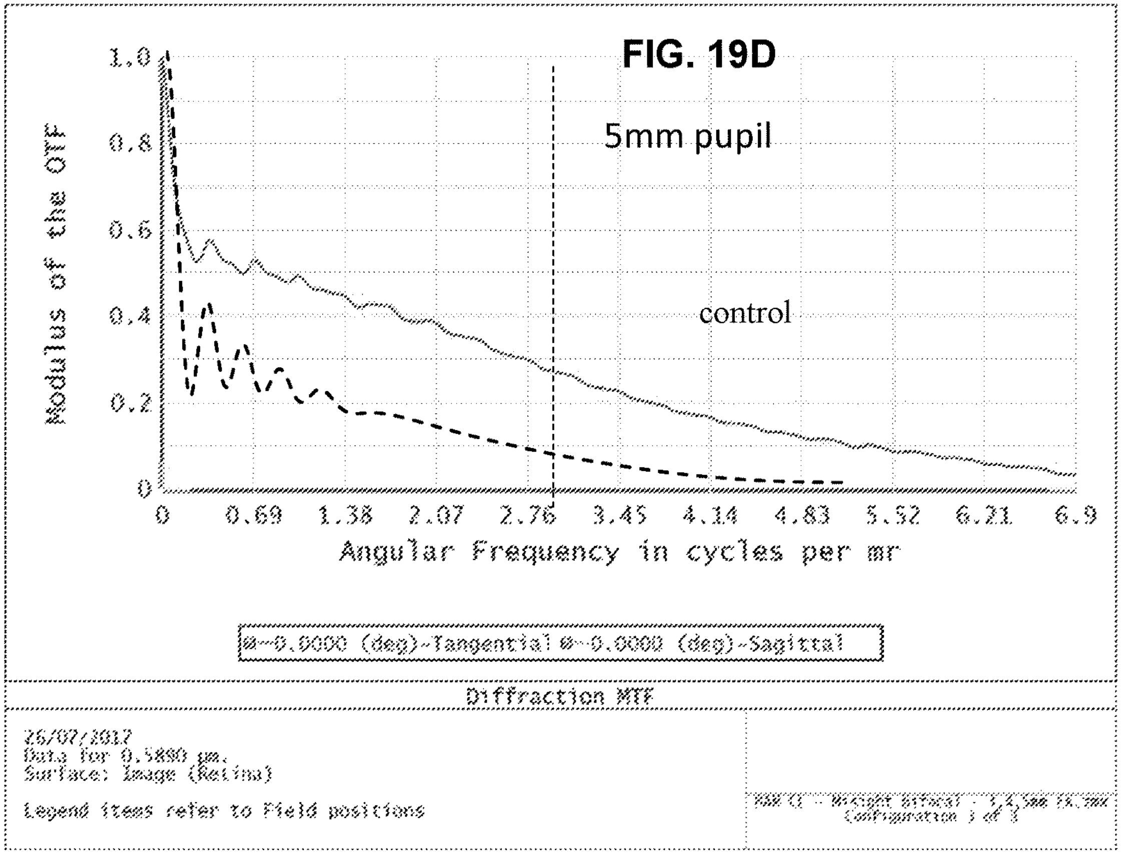

FIG. 19A shows the post optimization binary amplitude modulation map over a central 5 mm×5 mm rectangular portion 1903 of mask designed with no defocus power and 15 annular concentric rings. Prior to optimization, the binary amplitude mask was set with 15 radially spaced apart concentric rings r1 to r15 with 0.0 amplitude modulation i.e., no light transmittance, at starting radial locations 'r1 Rad' to 'r15 Rad' as shown in the data table and with post optimization thicknesses 'r1 Thick' to 'r15 Thick' also output in the data table. The remaining regions of the binary amplitude modulation map i.e. the lighter regions may have a modulation value of 1.0 indicating no additional reduction of light transmittance than expected for the base lens. The MTF plots of the no defocus mask design incorporating the 15 ring mask of dimensions shown in the data table resulting from the optimization process described previously compared to the with mask and control (MiSight) lens over 3 mm, 4 mm and 5 mm pupils are shown in FIGS. 19B-D. As can be seen in each MTF plots for each pupil size, the 15 ring test mask may achieve a similar approximation of the control lens MTF across spatial frequencies for 4 and 5 mm pupil sizes to the 5 ring mask of FIG. 17 but with less undulation.

FIGS. 20-22 provide plots of the transmittance through a central portion of a model eye for a range of zero defocus optical power optical designs utilizing binary amplitude modulation masks configured with a plurality of repeating concentric ring patterns. The optical modelling optimization of the zero defocus optical designs incorporating the ring shaped binary amplitude masks shown in FIGS. 20-22 was similar to the optimization used for the mask shown in FIGS. 16-19 and may also be based on using the MTF of MiSight as a merit function in Zemax. However, the repeating ring pattern may be defined by a number of sinusoidal functions centered about the origin and repeating to the full surface semi-diameter of the aperture and may be used in the optimization process in Zemax, for example, the ring pattern may be defined by the sign of a sum of sin series, as follows:

$$\text{pattern} = \text{sign}\left(\sum_n c_n * \sin\left(h_n * \text{mod}(r, \text{length}) * \frac{2*\pi}{\text{length}}\right)\right)$$

where: Cn is the $n^{th}$ coefficient, $h_n$ is the $n^{th}$ frequency multiplier (see modes), r is the semi-diameter coordinate length is semi-diameter over which the repeating pattern is is defined.

When pattern is negative, the transmittance may be attenuated and otherwise it may be 100%. As shown in the table in FIG. 20C, a number of input terms and parameters may be selected as part of the optimization process and may be further defined as follows;

Mode refers to the type of repeating pattern selected for the optimization, for example:

$$\text{type 1: consecutive } (0 < n < 501)\ h_n = n$$

$$\text{type 2: power of 2 } (0 < n < 33)\ h_n = 2^{n-1}$$

$$\text{type 3: Fibonacci } (0 < n < 47)\ h_n = h_{n-1} + h_{n-2} \text{ where } h_1 = 1, h_2 = 2$$

Num Terms refers to the number of sin terms present).

Length refers to the semi-diameter length over which the unique pattern is defined (mm).

Mask Rel Trans refers to the relative transmission fraction where the mask is applied from full attenuation to no attenuation.

Figure 20A:
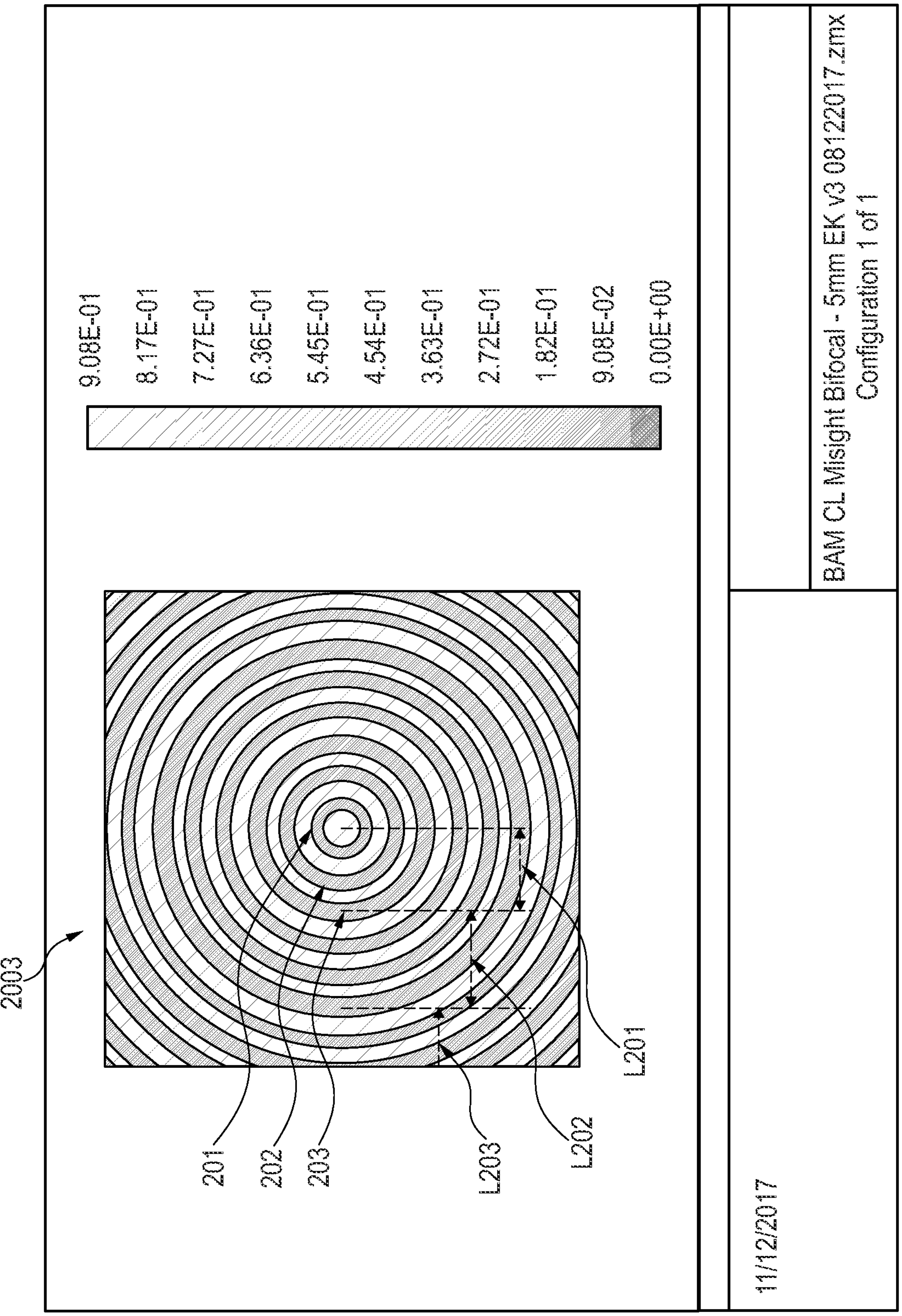
FIGS. 20A-22C provide exemplary embodiments of plots of the transmittance through a central portion of a model eye for a range of zero defocus optical power optical designs utilizing binary amplitude modulation masks configured with a plurality of repeating concentric ring patterns.
Figure 20B:
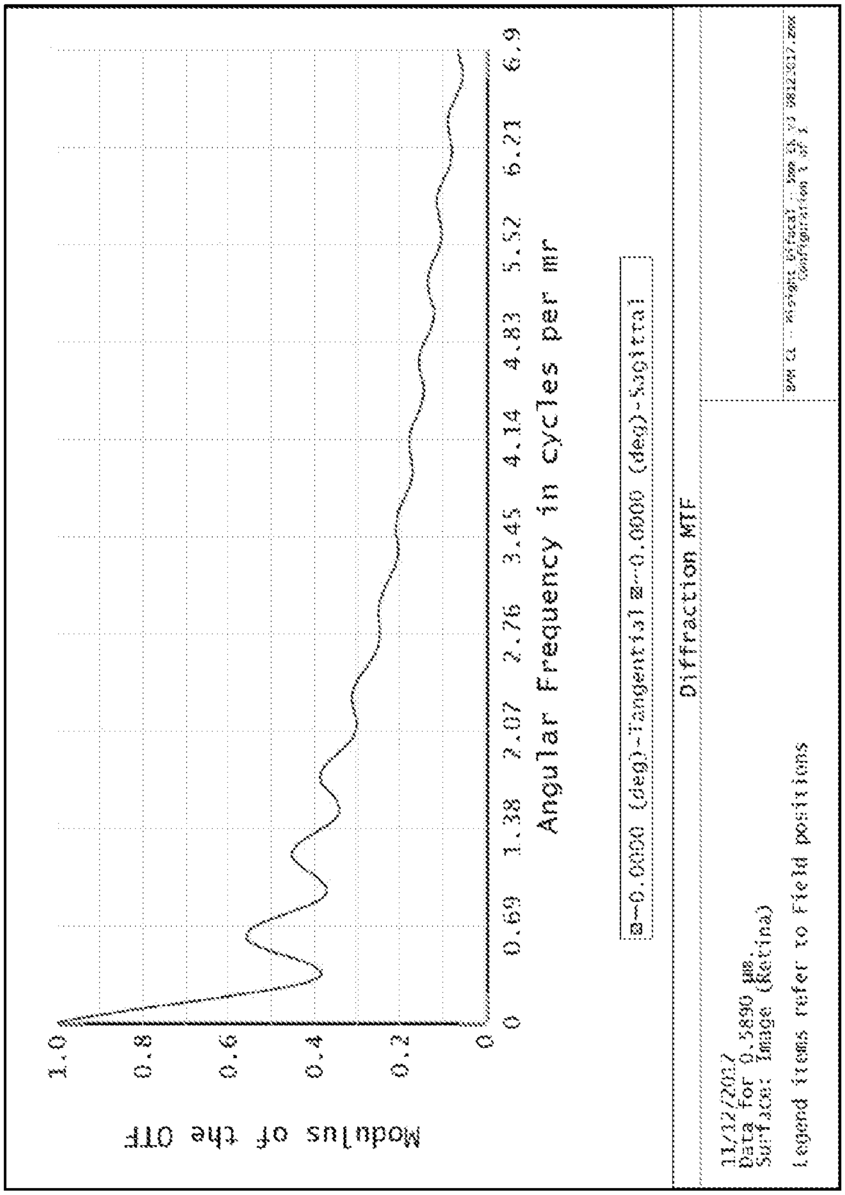

FIG. 20A provides a plot of the transmittance through a central portion 2003 of a lens mask-model eye system for a zero defocus optical power design utilizing binary amplitude modulation masks with the repeating annular ring pattern optimized through the optical simulation process using a sinusoidal function. FIG. 20B shows the modulation transfer functions (MTF) of the optimized model eye-mask system over a pupil diameter of 5 mm and may be compared to the MTF of the control (MiSight dual focus) contact lens over 5 mm from FIG. 15C used as the merit function in the optimization. FIG. 20C provides the details of the sinusoidal function used to generate the plurality of rings in the output mask design. As seen in FIG. 20C the optimization to configure the mask shown in FIG. 20A and resulting in the MTF of FIG. 20B was implemented by matching the merit function over 261 targeted points on the MTF spatial frequency curve of the MiSight contact lens over 5 mm (FIG. 15C) by selecting a consecutive (type 1) repeating pattern of 1.00 mm length (Length: 1.00) 3 sin terms/series (Variables: 3) with a starting mask merit function (initial MF) of 0.45266976 and optimized merit function (current MF) improved to 0.14357989 (the closer the current MF value is to a value of 0.0 indicates a more optimized match to the targeted merit function) and the optimization ran for 15.72 minutes (Time). Consequently, the optimized mask transmittance plot of FIG. 20A corresponds to the optimization terms specified in FIG. 20C including defining the length of a single cycle of the sinusoidal pattern over L201 and may consist of 3 rings of starting radial locations r201, r202 and r203 and as defined with 3 repeats L201, L202, L203 seen in the plot. The details of the sinusoidal function may be shown in FIG. 20C and may consist of 3 terms.

Figure 21A:
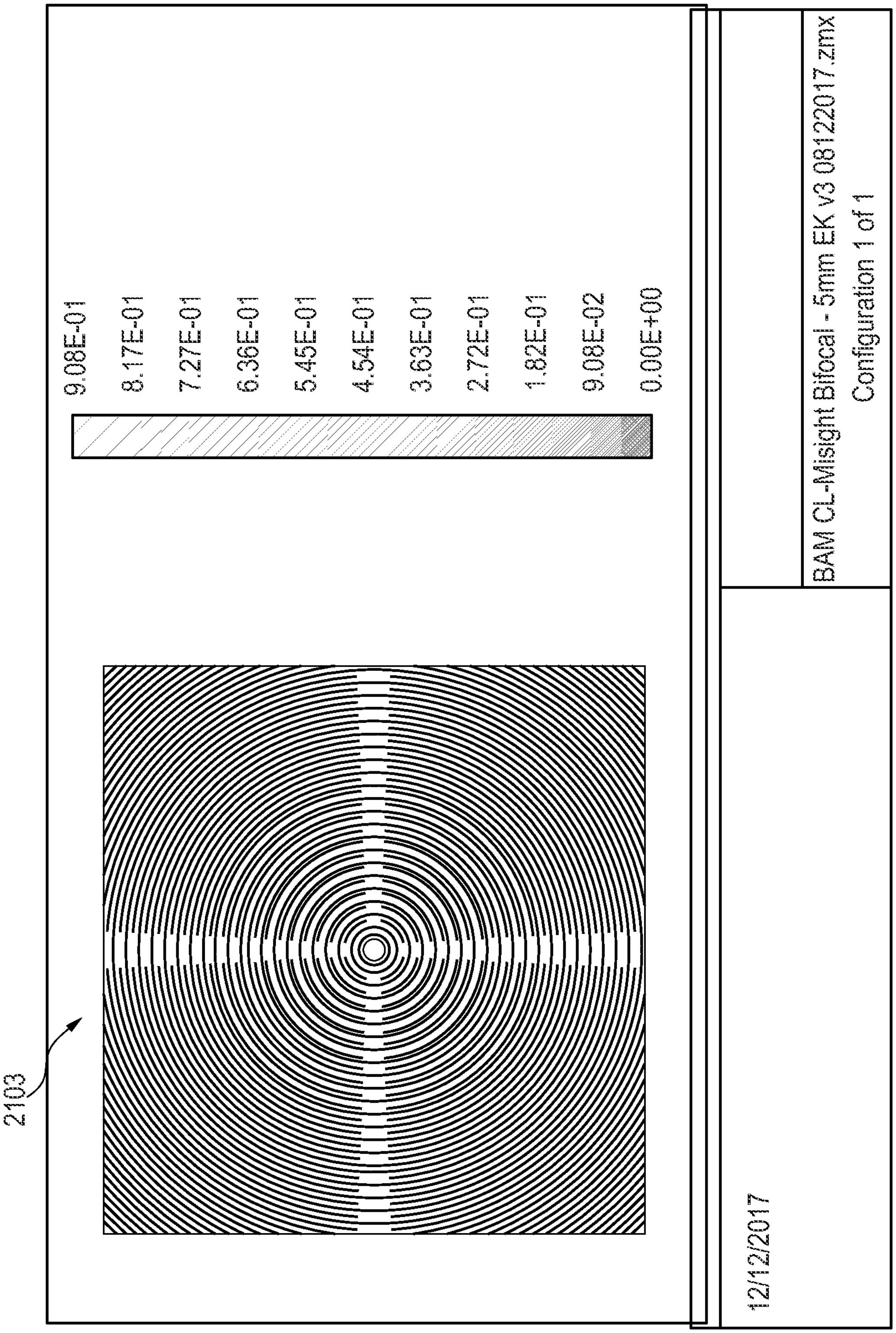
Figure 21B:
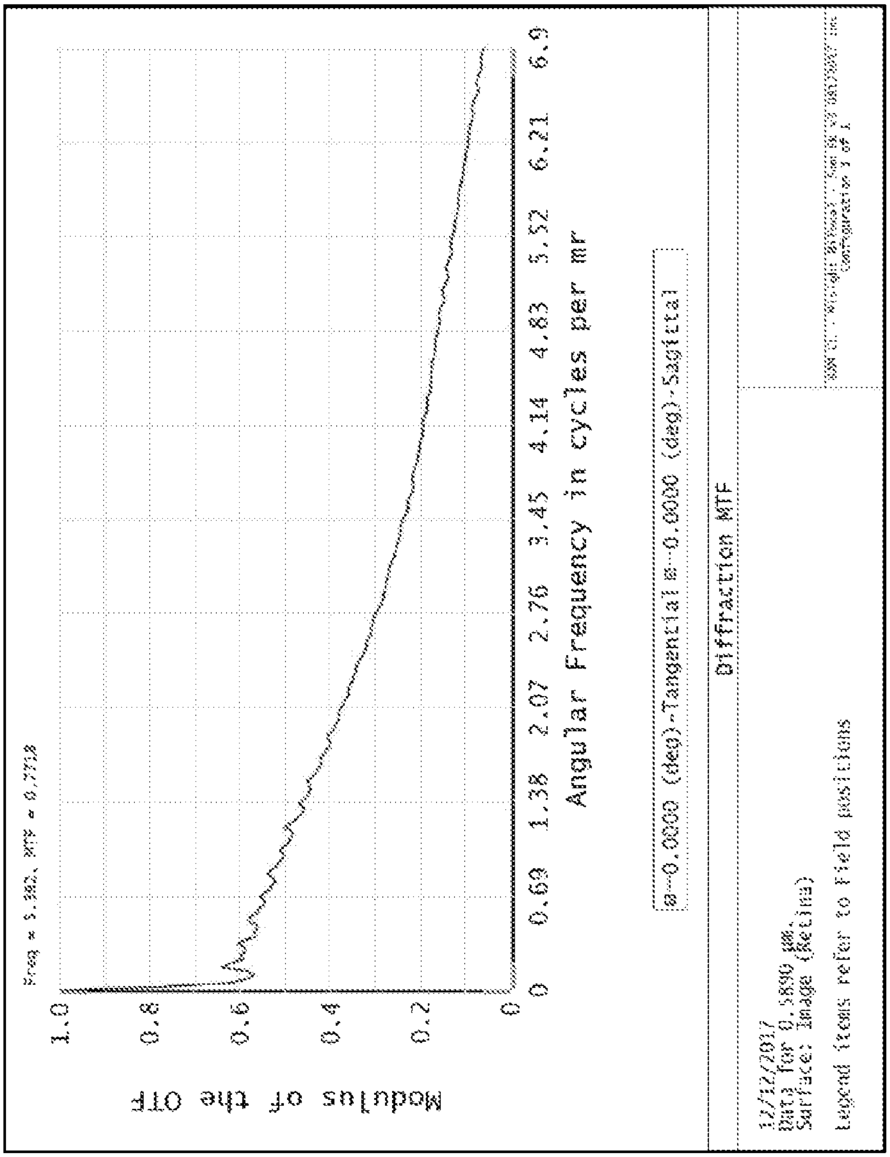

FIG. 21A provides a plot of the transmittance through a central portion 2103 of a lens mask-model eye system for a zero defocus optical power design utilizing binary amplitude modulation masks with the repeating annular ring pattern optimized through the optical simulation process using a sinusoidal function. FIG. 21B shows the modulation transfer functions (MTF) of the optimized model eye-mask system over a pupil diameter of 5 mm and may be compared to the MTF of the control (MiSight dual focus) contact lens over 5 mm from FIG. 15C used as the merit function in the optimization. FIG. 21C provides the details of the sinusoidal function used to generate the plurality of rings in the output mask design. As seen in FIG. 21C the optimization to configure the mask shown in FIG. 21A and resulting in the MTF of FIG. 21B was implemented by matching the merit function over 261 targeted points on the MTF spatial frequency curve of the MiSight contact lens over 5 mm (FIG. 15C) by selecting a 'power of 2' (type 2) repeating pattern of 3 sin terms/series (Variables: 3) of 0.20 mm length (Length: 0.20) with a starting mask merit function (initial MF) of 0.45266976 and optimized merit function (current MF) improved to 0.13582217 (the closer the current MF value is to a value of 0.0 indicates a more optimized match to the targeted merit function) and the optimization ran for 49.53 minutes (Time). The details of the sinusoidal function may be shown in FIG. 21C and may consist of 3 terms.

Figure 22A:
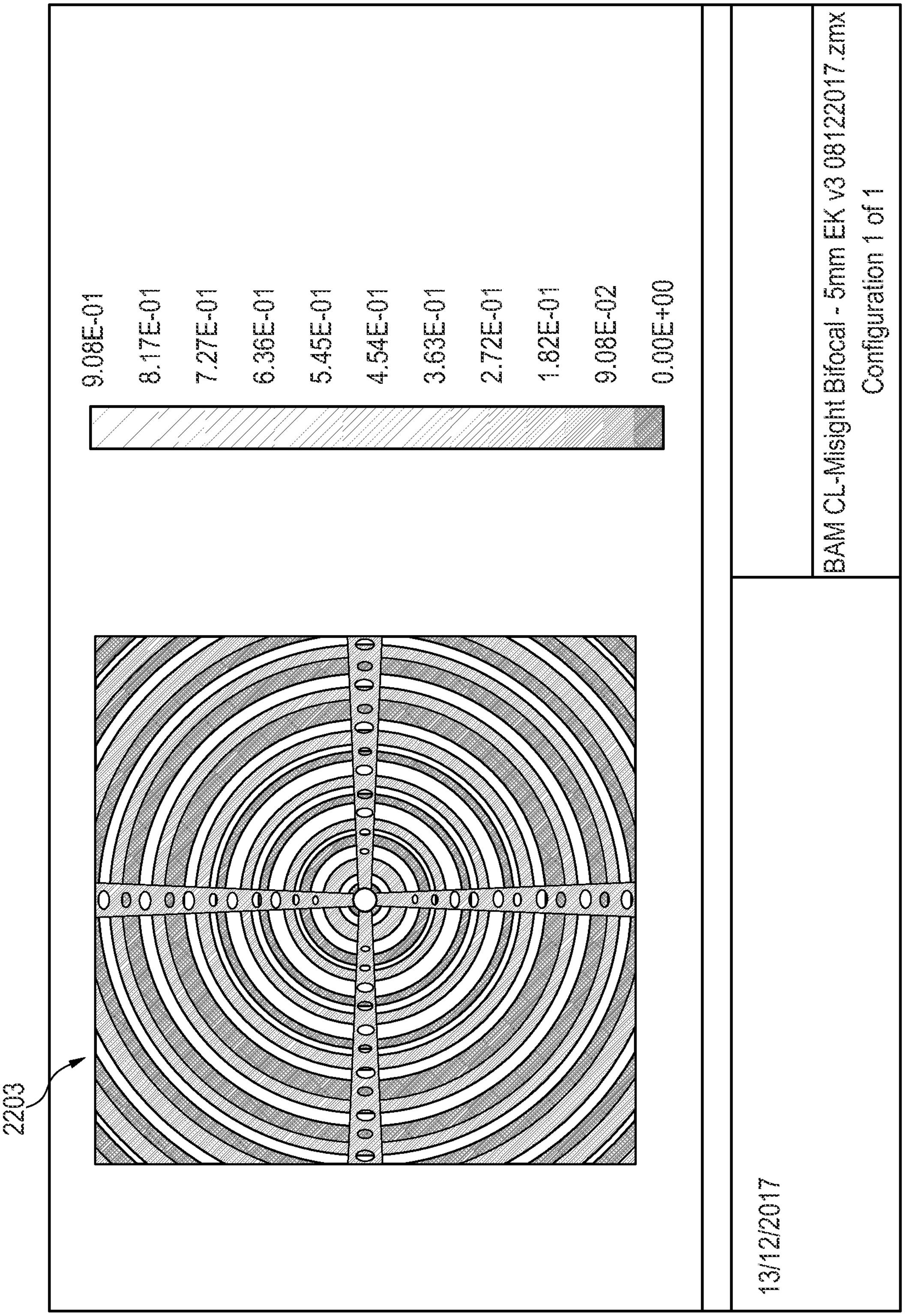
Figure 22B:
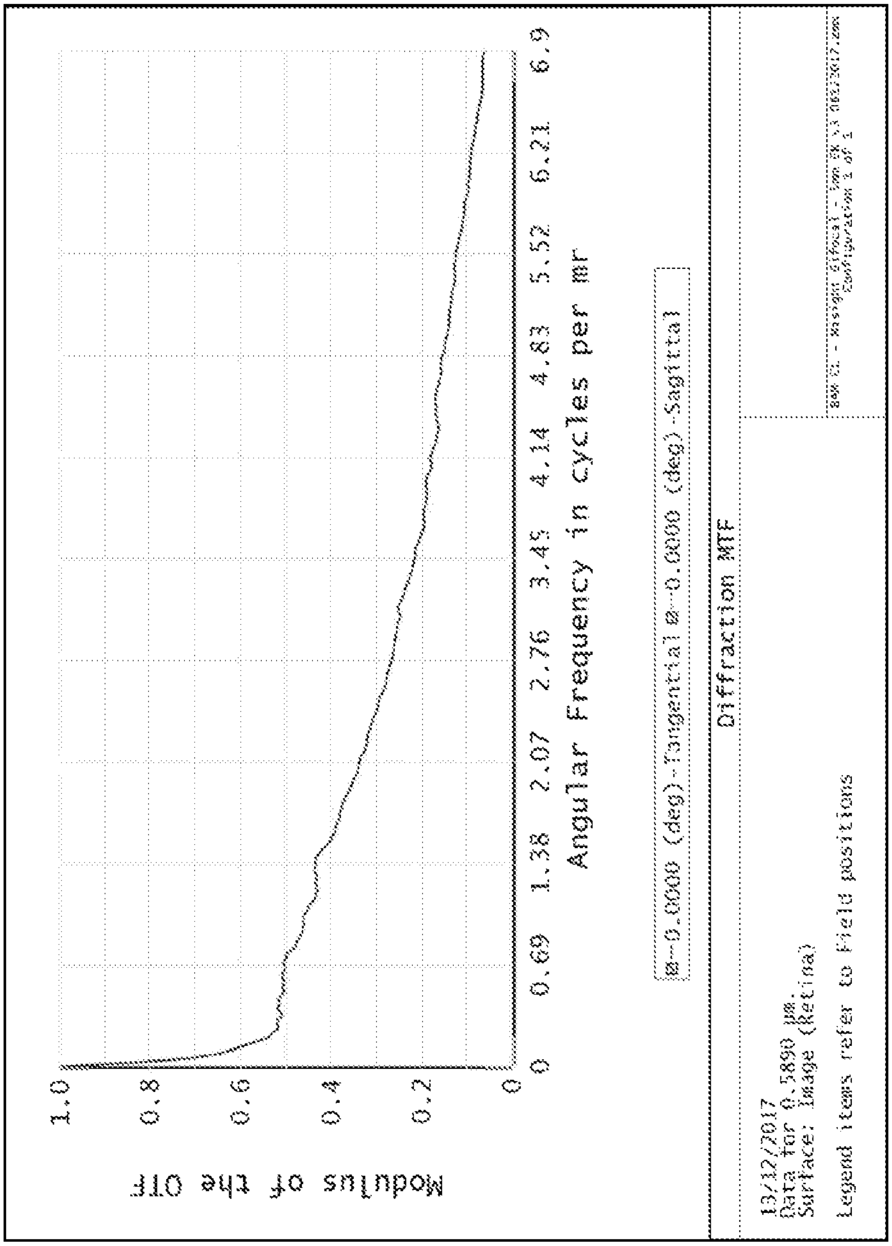

FIG. 22A provides a plot of the transmittance through a central portion 2203 of a lens mask-model eye system for a zero defocus optical power design utilizing binary amplitude modulation masks with the repeating annular ring pattern optimized through the optical simulation process using a sinusoidal function. FIG. 22B shows the modulation transfer functions (MTF) of the optimized model eye-mask system over a pupil diameter of 5 mm and may be compared to the MTF of the control (MiSight dual focus) contact lens over 5 mm from FIG. 15C used as the merit function in the optimization. FIG. 22C provides the details of the sinusoidal function used to generate the plurality of rings in the output mask design. As seen in FIG. 22C the optimization to configure the mask shown in FIG. 22A and resulting in the MTF of FIG. 22B was implemented by matching the merit function over 261 targeted points on the MTF spatial frequency curve of the MiSight contact lens over 5 mm (FIG. 15C) by selecting a 'power of 2' (type 2) repeating pattern of 7 sin terms/series (Variables: 7) of 0.40 mm length (Length: 0.40) with a starting mask merit function (initial MF) of 0.45266976 and optimised merit function (current MF) improved to 0.12990765 (the closer the current MF value is to a value of 0.0 indicates a more optimized match to the targeted merit function) and the optimization ran for 1.67 hours (Time). The details of the sinusoidal function may be shown in FIG. 22C and may consist of 7 terms.

In some embodiments, it may be advantageous to have even greater control over the design of the binary amplitude mask configuration and therefore the MTF at different spatial frequencies and across different apertures (pupils sizes) than the locations and widths and number of rings or repeating ring patterns as shown in FIGS. 16-19 and FIGS. 20-22. In some embodiments, the light amplitude masks may be designed with greater control and therefore achieve comparable or improved MTF and/or optical properties. For example, in some embodiments a light amplitude modulating mask may be non-binary, for example may have a gradient i.e. with light amplitude values from 1 through 0 at least in part and/or over at least a portion of a mask feature. In some embodiments, the mask may not be ring like, for example may be any shape or may be asymmetrical and of any dimension or location or thickness or number of features or may be patterned into an array or may be randomly distributed or may be described mathematically as a surface distribution including sphere, asphere, conics, polynomial, Zernike or superconics.

FIGS. 23-26 provide plots of the light transmittance through a central portion of a model eye for a range of zero defocus optical power optical designs utilizing binary amplitude modulation masks configured with irregular and/or asymmetric patterns generated using a optimisation process in Zemax based on Zernike wavefront surfaces. The optical modelling optimization of the zero defocus optical designs incorporating the irregular and/or asymmetric pattern binary amplitude masks shown in FIGS. 23-26 may be similar to the optimization used for the mask shown in FIGS. 16-22 and may also be based on using the MTF of MiSight as a merit function in Zemax. However, the mask patterns in FIGS. 23-36 may be defined by a more complex mathematical function than used in the previous examples of FIG. 16-22, for example, by using a Zernike wavefront as a surface included in the optimization process in Zemax, for example, the mask pattern may be formed by isobars i.e. regions defined within a band of light transmittance values e.g. of consistent values or of values within a defined range e.g. 10% or less or 30% or less or 50% or less light transmittance, that may be spaced apart (pitch) and of a width (thickness) on a Zernike surface and the isobars may be parameters used in an optical modeling optimization process. The isobar pattern may be formed as follows:

$$trans = \mathrm{mod}\left(\left|zern\left(c_0{:}c_N, x, y\right)\right|, isobarPitch\right) < isobarThickness$$

| | | |
|---|---|---|
| where: | $\lvert zern(c_0{:}\ c_N, x, y)\rvert$ | Is the absolute value of a zernike surface at (x, y) with coefficients $c_0$: $c_N$ |
| | isobarPitch | Determines the spacing between isobars |
| | isobarThickness | Determines the thickness of the isobars |

The above formula gives zero transmission through the light amplitude modulating regions of the mask but any transmittance value through the mask regions, including the isobar regions, may be specified and varied between values of 0 and 1 and anywhere in between. As shown in FIG. 23C, a number of input terms and parameters may be selected as part of the optimization process and may be further defined as follows;

NormRadius: The radius to normalize the zernike surface to.

NumTerms: The number of Zernike terms, rounded up to the next complete n set.

IsobarPitch: The spacing between isobars (surface z distance, same units as coeffs)

IsobarThick: The thickness of isobars (normalized, 0 to 1)

Coeff 0

Coeff 1

. . .

Coeff N

The optical modelling method and setup for calculation was based on using the MTFs of the MiSight contact lens as the initial Merit Function in Zemax. Each of the output binary mask zones with no power may be defined by isobars (pitch and thicknesses) and a series of Zernike coefficients as the output merit function (Current MF) of an optimized mask with no power over a targeted sampling of coordinates (Targets) on the MTF/spatial frequency curve, for example between 250-850 points. The zones may be defined within central 5 mm. Arrangements of these binary light amplitude modulation zones may enable the ophthalmic lens, for example a contact lens, to slow myopia progression by providing an MTF comparable to the MTF resulting from a dual refractive focus effect, for example MiSight.

Figure 23A:
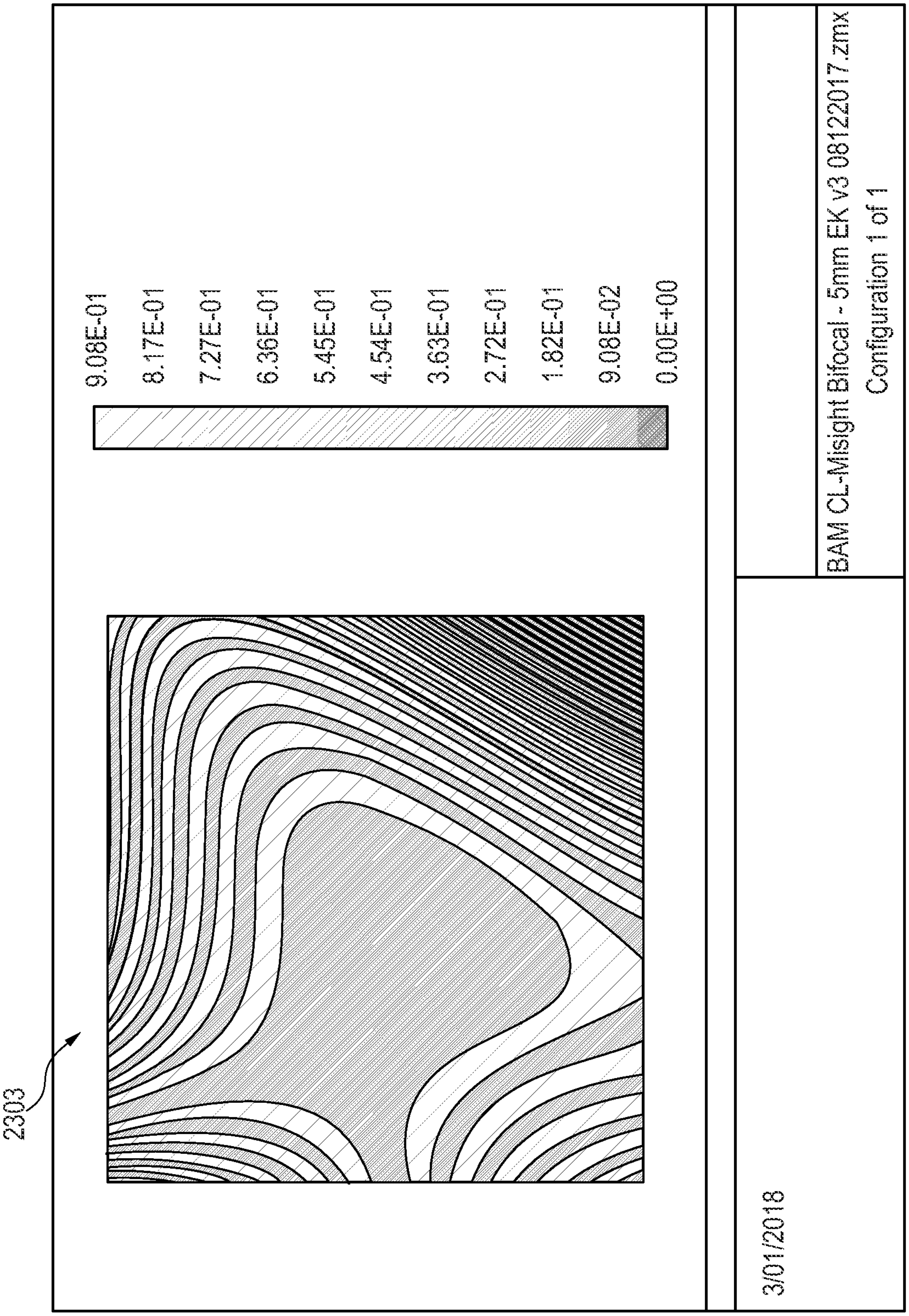
FIGS. 23A-26 provide exemplary embodiments of plots of the light transmittance through a central portion of a model eye for a range of zero defocus optical power optical designs utilizing binary amplitude modulation masks configured with irregular and/or asymmetric patterns generated using a optimization process in Zemax based on Zernike wavefront surfaces.
Figure 23B:
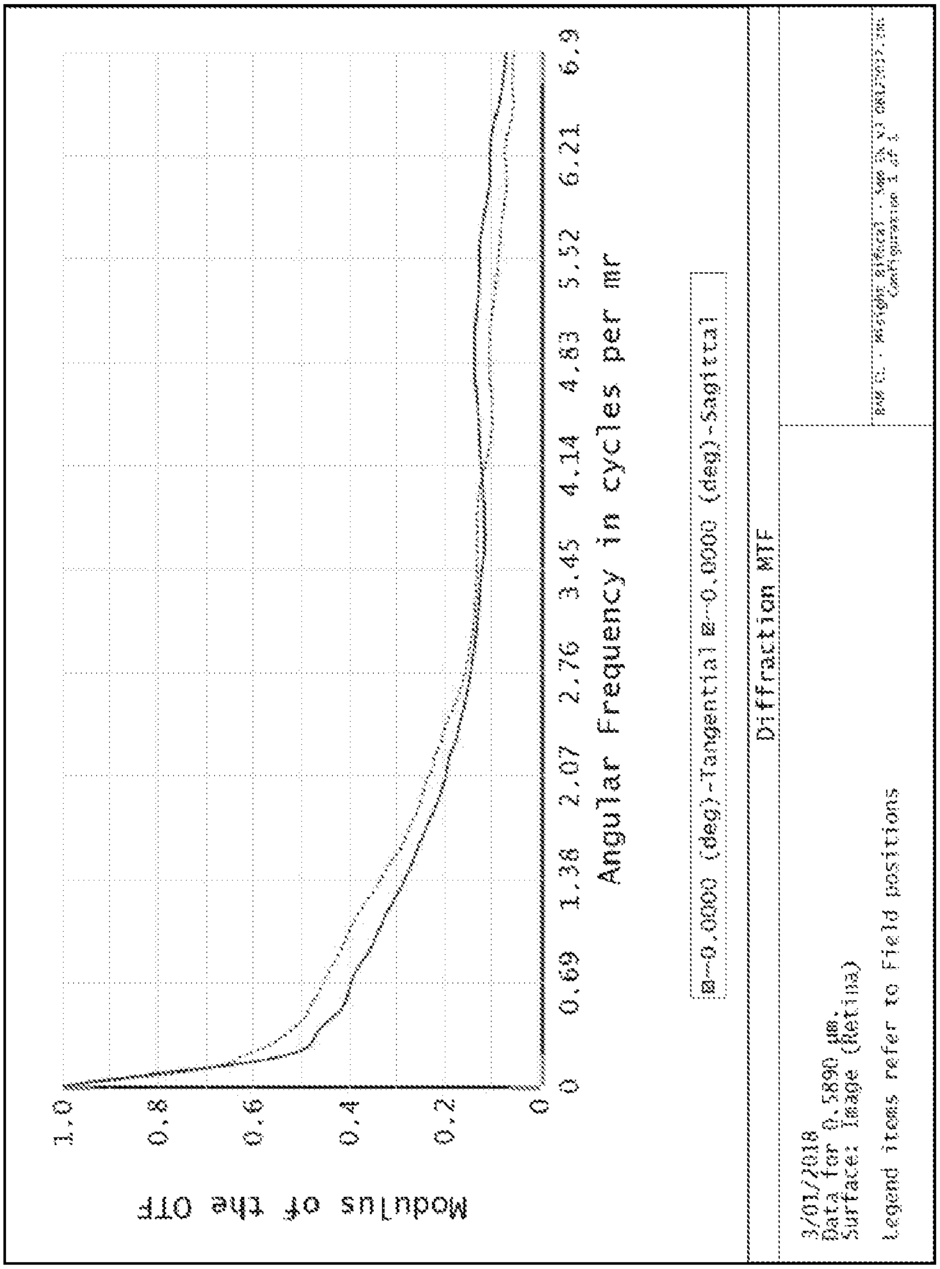

FIG. 23A provides a plot of the transmittance through a central portion 2303 of a lens mask-model eye system for a zero defocus optical power design utilizing binary amplitude modulation masks incorporating a binary amplitude mask based on a set of Zernike surface applied to the light transmittance function of the base lens (i.e. full unimpeded transmittance). FIG. 23B shows the modulation transfer functions (MTF) of the optimized model eye-mask system over a pupil diameter of 5 mm and may be compared to the MTF of the control (MiSight dual focus) contact lens over 5 mm from FIG. 15C used as the merit function in the optimization. FIG. 23C provides the details of the Zernike surface function used to generate the plurality of binary amplitude mask regions in the output of the optimized mask design. As seen in FIG. 23C the optimization that may configure the no defocus optical power binary amplitude mask shown in FIG. 23A and that may result in the MTF of FIG. 23B was implemented by matching the merit function over 261 targeted points on the MTF spatial frequency curve of the MiSight contact lens over 5 mm (FIG. 15C) by selecting the number of terms permitted in the Zernicke surface (Num Terms: 10), the maximum spacing between the mask regions (IsobarPitch: 0.50 mm) and maximum isobar thickness or width (IsobarThick: 0.50 mm) and the number of variables (Variables: 10) The starting merit function (Initial MF) of 0.19081971 indicated the starting mask transmittance may result in an MTF relative to the target MTF that may not be optimal and the optimized merit function (Current MF) improved to 0.09929833 (the closer the 'Current MF' value is to a value of 0.0 indicates a more optimized match to the targeted merit function i.e. the MTF of the MiSight contact lens) and the optimization ran for 57.1 minutes (Time). Consequently, the optimized mask transmittance plot of FIG. 23A may correspond to the optimization terms specified in FIG. 23C. The details of the Zernicke coefficients function may be shown in FIG. 23C and may consist of 10 terms.

As shown in FIG. 23A, the transmission plot displayed in this example lens displays the light transmission of the optimized binary amplitude mask over a 5 mm×5 mm area, for example where the darker blue areas indicates a value of 0 where light may not be not transmitted i.e. is blocked and red areas indicates a value of 1 where light is not blocked at all, for example, may be transmitted unimpeded. In some embodiments, the transmission mask may be designed to be non-binary where light may be modulated in a range from and between 0 to 1. The MTF graph of FIG. 23B shows 2 lines representing a tangential MTF and a sagittal MTF as the masks may also be asymmetric and therefore the MTF may not be similar in the two directions.

Figure 24A:
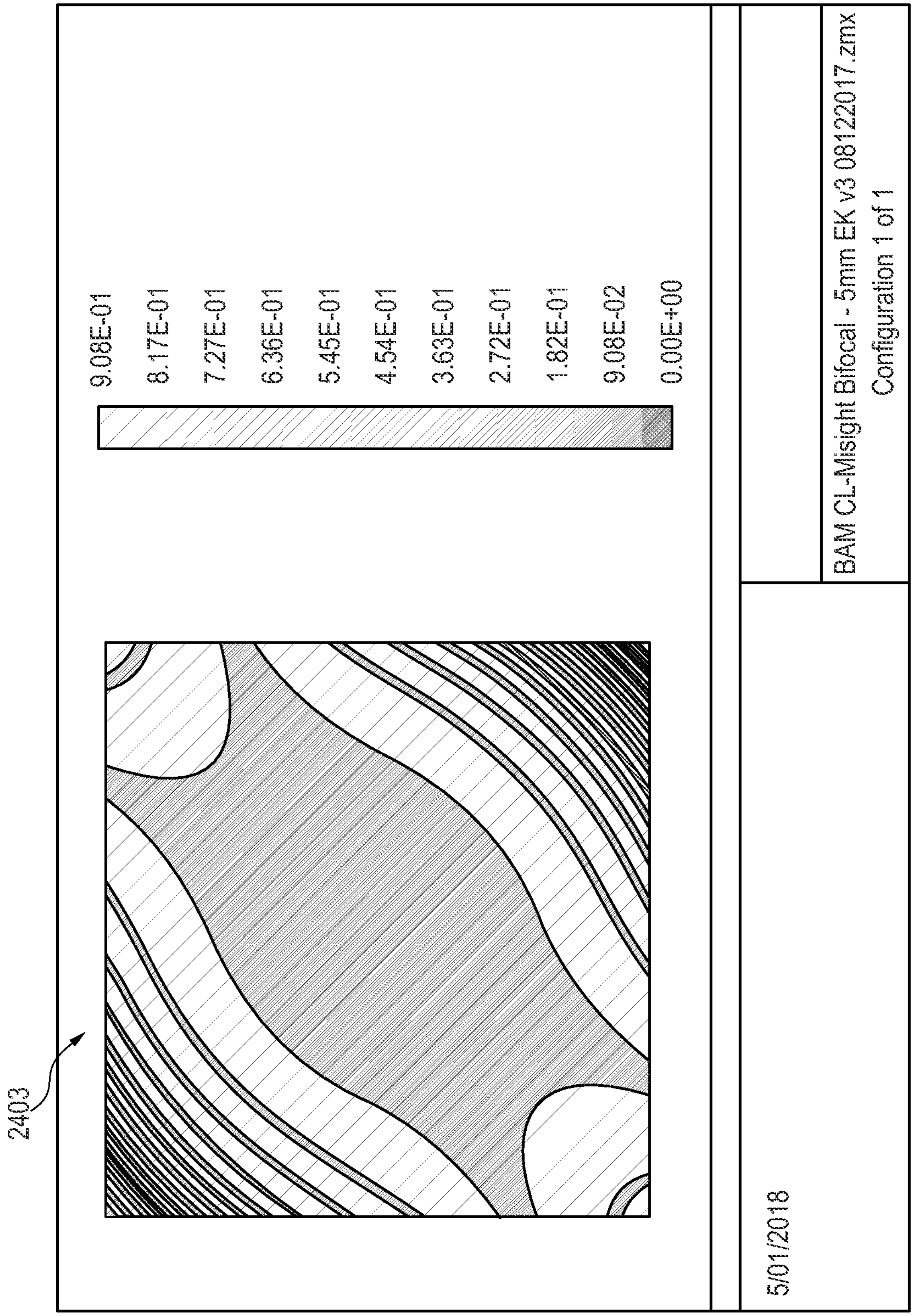
Figure 24B:
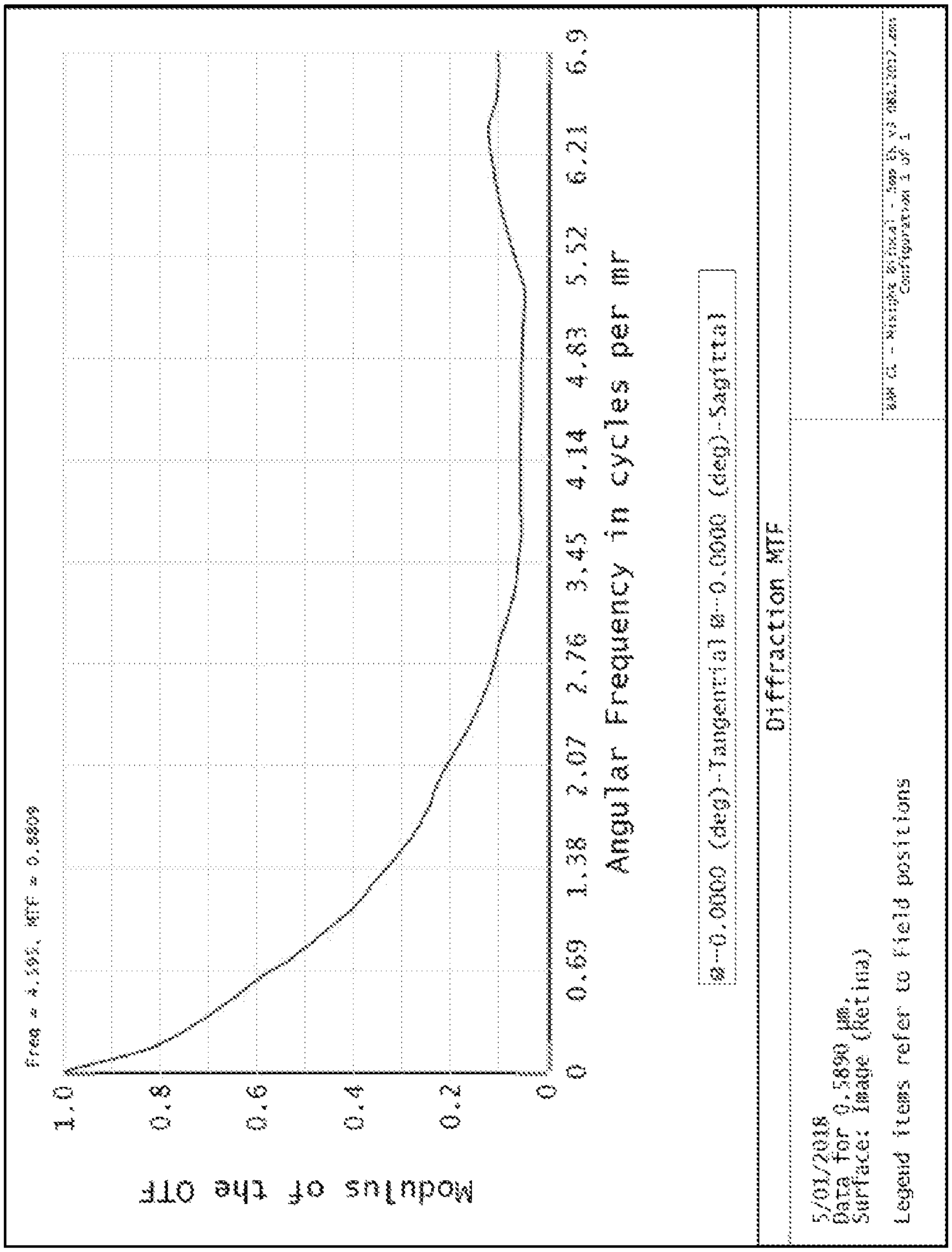

FIG. 24A provides a plot of the transmittance through a central portion 2403 of a lens mask-model eye system for a zero defocus optical power design utilizing binary amplitude modulation masks incorporating a binary amplitude mask based on a set of Zernike surface applied to the light transmittance function of the base lens (i.e., full unimpeded transmittance). FIG. 24B shows the modulation transfer functions (MTF) of the optimized model eye-mask system over a pupil diameter of 5 mm and may be compared to the MTF of the control (MiSight dual focus) contact lens over 5 mm from FIG. 15C used as the merit function in the optimization. FIG. 24C provides the details of the Zernike surface function used to generate the plurality of binary amplitude mask regions in the output of the optimized mask design. As seen in FIG. 24C the optimization that may configure the no defocus optical power binary amplitude mask shown in FIG. 24A and that may result in the MTF of FIG. 24B was implemented by matching the merit function over 261 targeted points on the MTF spatial frequency curve of the MiSight contact lens over 5 mm (FIG. 15C) by selecting the number of terms permitted in the Zernicke surface (Num Terms: 15), the maximum spacing between the mask regions (IsobarPitch: 0.60 mm) and maximum isobar thickness or width (IsobarThick: 0.20 mm) and the number of Zernicke variables used (Variables: 6). The starting merit function (Initial MF) of 0.19081971 indicated the starting mask transmittance may result in an MTF relative to the target MTF that may not be optimal and the optimized merit function (Current MF) improved to 0.16295166 (the closer the 'Current MF' value is to a value of 0 indicates a more optimized match to the targeted merit function i.e., the MTF of the MiSight contact lens) and the optimization ran for 48.3 minutes (Time). Consequently, the optimized mask transmittance plot of FIG. 24A may correspond to the optimization terms specified in FIG. 24C. The details of the Zernicke coefficients function may be shown in FIG. 24C and may consist of 6 set terms.

As shown in FIG. 24A, the transmission plot displayed in this example lens displays the light transmission of the optimized binary amplitude mask over a 5 mm×5 mm area, for example where the darker blue areas indicates a value of 0 where light may not be not transmitted i.e. is blocked and red areas indicates a value of 1 where light is not blocked at all, for example, may be transmitted unimpeded. In some embodiments, the transmission mask may be designed to be non-binary where light may be modulated in a range from and between 0 to 1. The MTF graph of FIG. 24B shows 2 lines representing a tangential MTF and a sagittal MTF as the masks may also be asymmetric and therefore the MTF may not be similar in the two directions.

Figure 25A:
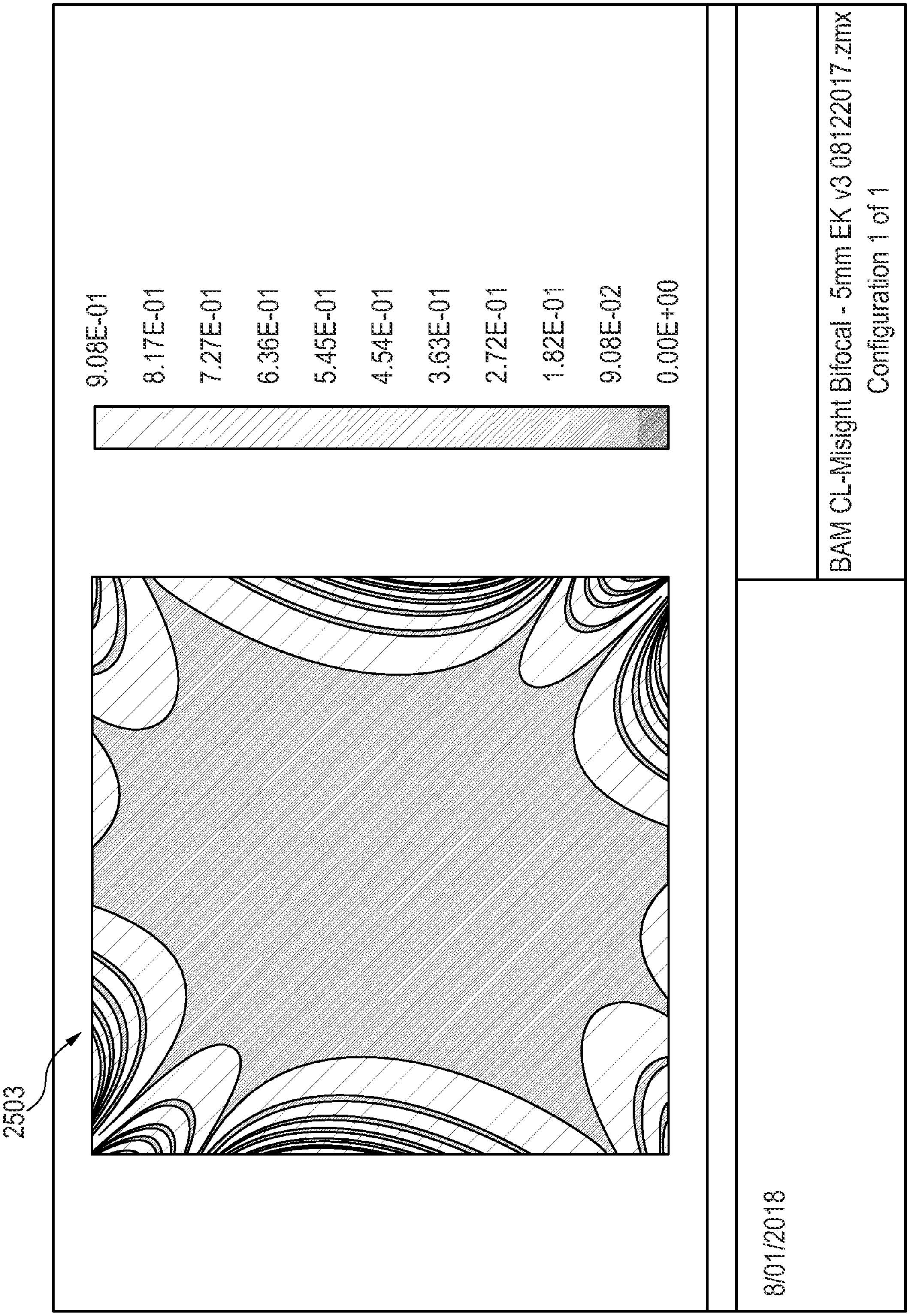
Figure 25B:
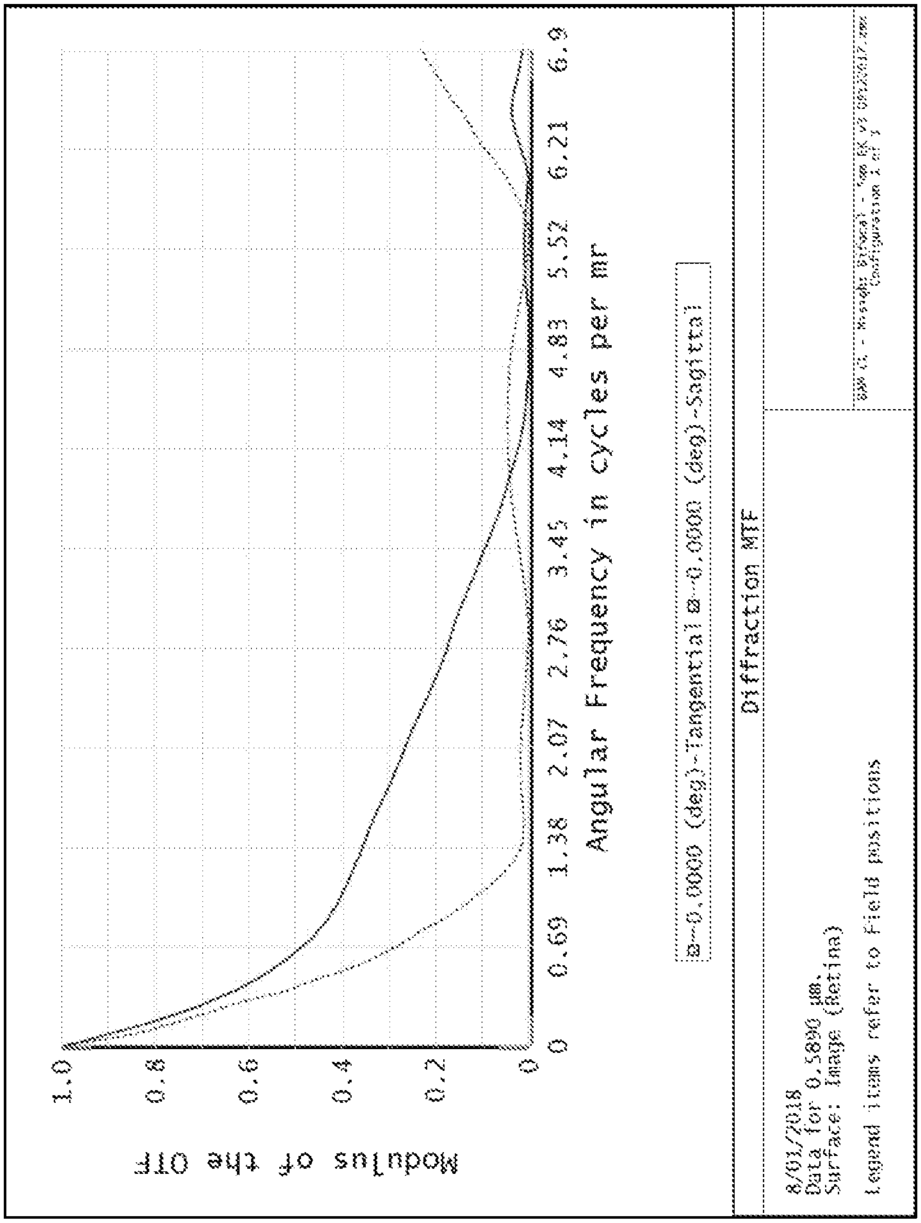

FIG. 25A provides a plot of the transmittance through a central portion 2503 of a lens mask-model eye system for a zero defocus optical power design utilizing binary amplitude modulation masks incorporating a binary amplitude mask based on a set of Zernike surface applied to the light transmittance function of the base lens (i.e., full unimpeded transmittance). FIG. 25B shows the modulation transfer functions (MTF) of the optimized model eye-mask system over a pupil diameter of 5 mm and may be compared to the MTF of the control (MiSight dual focus) contact lens over 5 mm from FIG. 15C used as the merit function in the optimization. FIG. 25C provides the details of the Zernike surface function used to generate the plurality of binary amplitude mask regions in the output of the optimized mask design. As seen in FIG. 25C the optimization that may configure the no defocus optical power binary amplitude mask shown in FIG. 25A and that may result in the MTF of FIG. 25B was implemented by matching the merit function over 261 targeted points on the MTF spatial frequency curve of the MiSight contact lens over 5 mm (FIG. 15C) by selecting the number of terms permitted in the Zernicke surface (Num Terms: 45), the maximum spacing between the mask regions (IsobarPitch: 0.10 mm) and maximum isobar thickness or width (IsobarThick: 0.20 mm) and the number of variables (Variables: 23). The starting merit function (Initial MF) of 0.19081971 indicated the starting mask transmittance may result in an MTF relative to the target MTF that may not be optimal and the optimised merit function (Current MF) improved to 0.09066014 (the closer the 'Current MF' value is to a value of 0.0 indicates a more optimised match to the targeted merit function i.e. the MTF of the MiSight contact lens) and the optimisation ran for 55.39 minutes (Time). Consequently, the optimised mask transmittance plot of FIG. 25A may correspond to the optimisation terms specified in FIG. 25C. The details of the Zernicke coefficients function may be shown in FIG. 25C and may consist of 23 terms.

As shown in FIG. 25A, the transmission plot displayed in this example lens displays the light transmission of the optimized binary amplitude mask over a 5 mm×5 mm area, for example where the darker blue areas indicates a value of 0 where light may not be not transmitted i.e. is blocked and red areas indicates a value of 1 where light is not blocked at all, for example, may be transmitted unimpeded. In some embodiments, the transmission mask may be designed to be non-binary where light may be modulated in a range from and between 0 to 1. The MTF graph of FIG. 25B shows 2 lines representing a tangential MTF and a sagittal MTF as the masks may also be asymmetric and therefore the MTF may not be similar in the two directions.

Figure 26A:
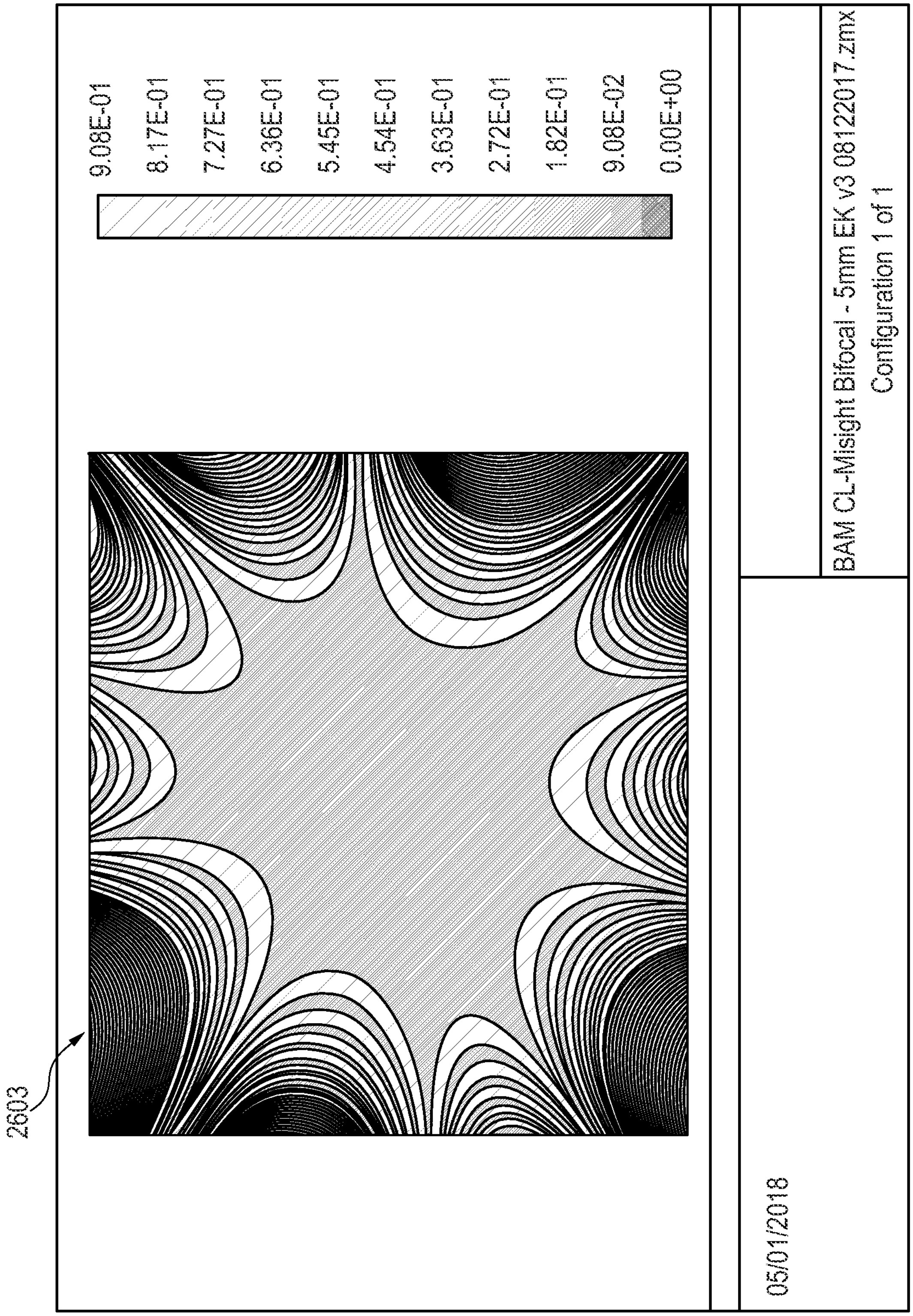
Figure 26B:
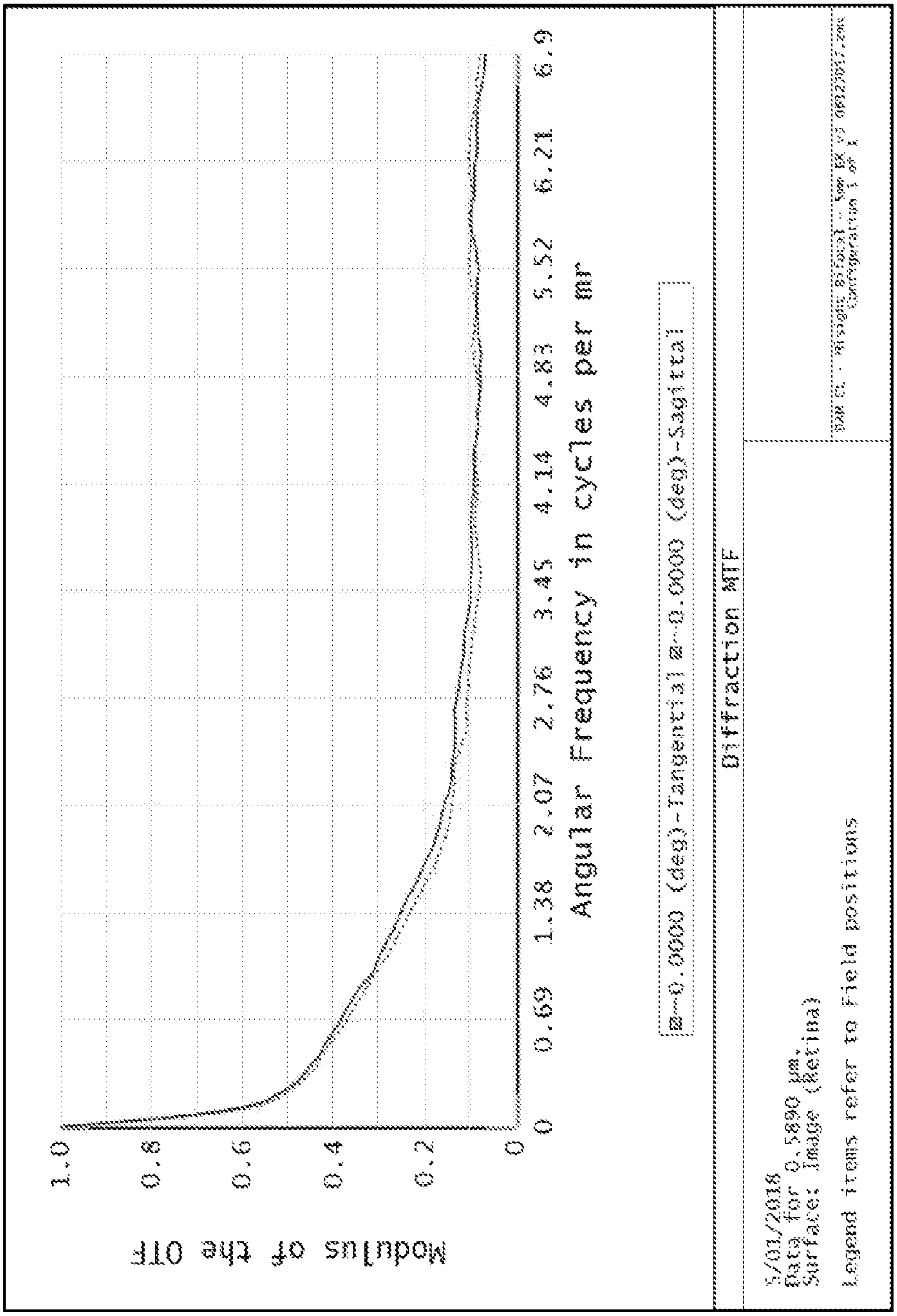

FIG. 26A provides a plot of the transmittance through a central portion 2603 of a lens mask-model eye system for a zero defocus optical power design utilizing binary amplitude modulation masks incorporating a binary amplitude mask based on a set of Zernike surface applied to the light transmittance function of the base lens (ie full unimpeded transmittance). FIG. 26B shows the modulation transfer functions (MTF) of the optimized model eye-mask system over a pupil diameter of 5 mm and may be compared to the MTF of the control (MiSight dual focus) contact lens over 5 mm from FIG. 15C used as the merit function in the optimization. FIG. 26C provides the details of the Zernike surface function used to generate the plurality of binary amplitude mask regions in the output of the optimized mask design. As seen in FIG. 26C the optimization that may configure the no defocus optical power binary amplitude mask shown in FIG. 25A and that may result in the MTF of FIG. 26B was implemented by matching the merit function over 261 targeted points on the MTF spatial frequency curve of the MiSight contact lens over 5 mm (FIG. 15C) by selecting the number of terms permitted in the Zernicke surface (Num Terms: 16), the maximum spacing between the mask regions (IsobarPitch: 0.70 mm) and maximum isobar thickness or width (IsobarThick: 0.5 mm) and the number of variables (Variables: 21). The starting merit function (Initial MF) of 0.19081971 indicated the starting mask transmittance may result in an MTF relative to the target MTF that may not be optimal and the optimized merit function (Current MF) improved to 0.05512701 (the closer the 'Current MF' value is to a value of 0.0 indicates a more optimized match to the targeted merit function i.e. the MTF of the MiSight contact lens). Consequently, the optimized mask transmittance plot of FIG. 26A may correspond to the optimization terms specified in FIG. 26C. The details of the Zernicke coefficients function may be shown in FIG. 26C and may consist of 21 terms.

As shown in FIG. 26A, the transmission plot displayed in this example lens displays the light transmission of the optimized binary amplitude mask over a 5 mm×5 mm area, for example where the darker blue areas indicates a value of 0 where light may not be not transmitted i.e. is blocked and red areas indicates a value of 1 where light is not blocked at all, for example, may be transmitted unimpeded. In some embodiments, the transmission mask may be designed to be non-binary where light may be modulated in a range from and between 0 to 1. The MTF graph of FIG. 26B shows 2 lines representing a tangential MTF and a sagittal MTF as the masks may also be asymmetric and therefore the MTF may not be similar in the two directions.

In some embodiments, any other mathematical functions, for example a sphere, an asphere, extended odd polynomial, extended even polynomial, conic section, biconic section, superconics, toric surface or Zernike polynomials may be applied to the starting transmission plot in order to design a mask with transmission properties that may modulate the light amplitude to achieve the desired optical properties of the ophthalmic lens, including the MTF.

Figures 27, 27A, 27B:
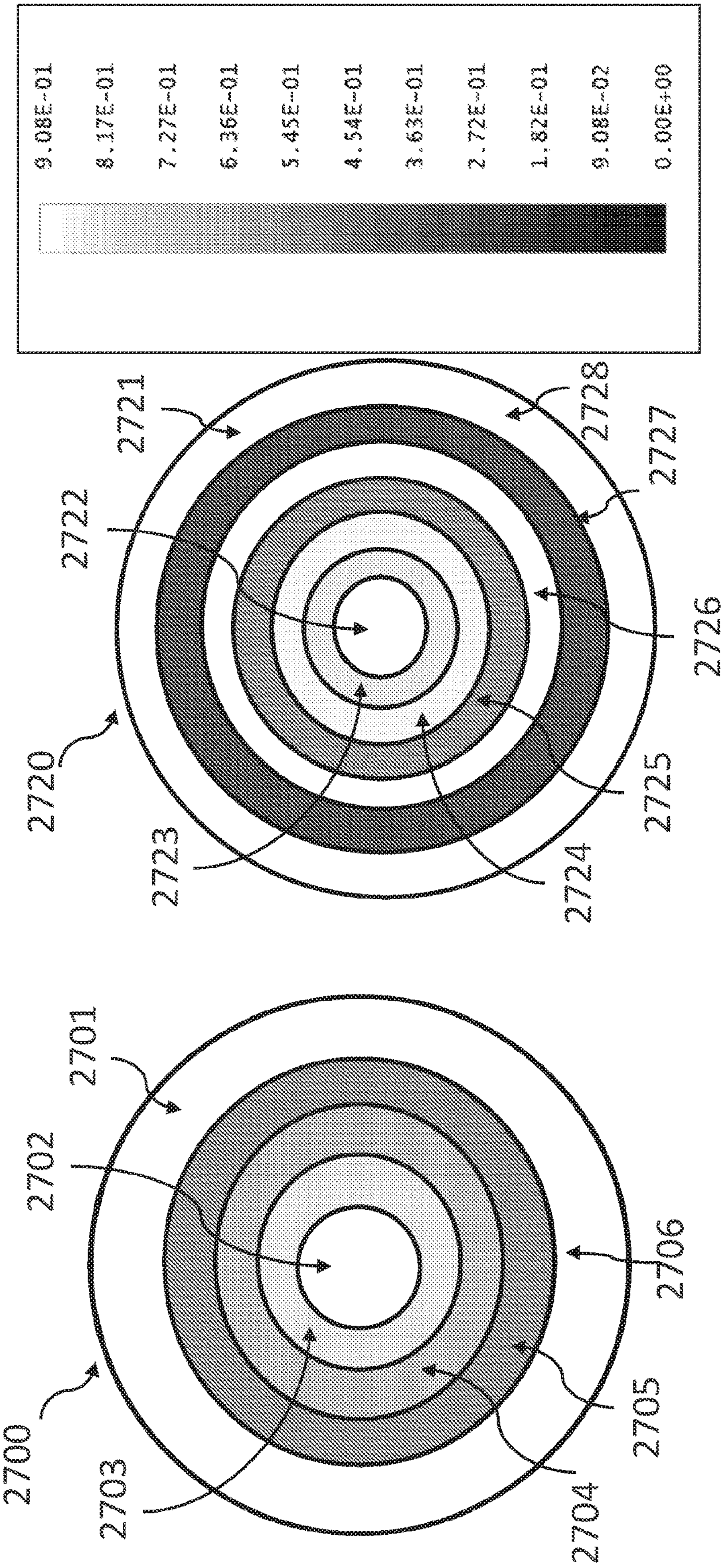
FIGS. 27-29 show exemplary embodiments of plan views of several ophthalmic lenses comprising, at least in part, configurations of elements (e.g., spaced apart, conjoined, continuous, etc.) incorporating light amplitude modulation masks having binary and/or non-binary and/or gradient amplitude modulation e.g. where a light transmittance may be modulated by a value between 0 and 1 or a gradient e.g., 2 or more values of amplitude modulation.
Figures 28, 28A, 28B:
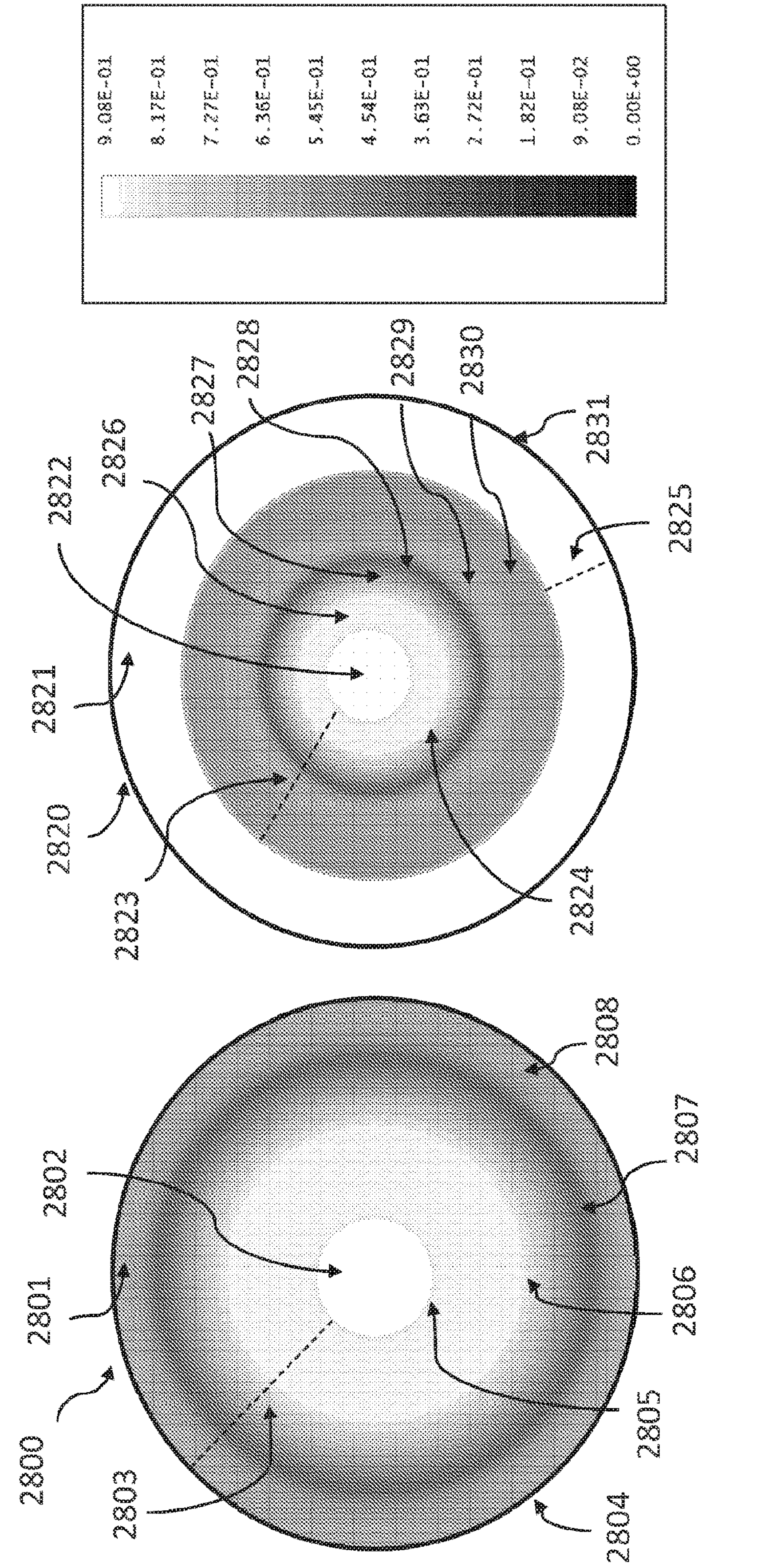
Figures 29, 29A, 29B, 29C:
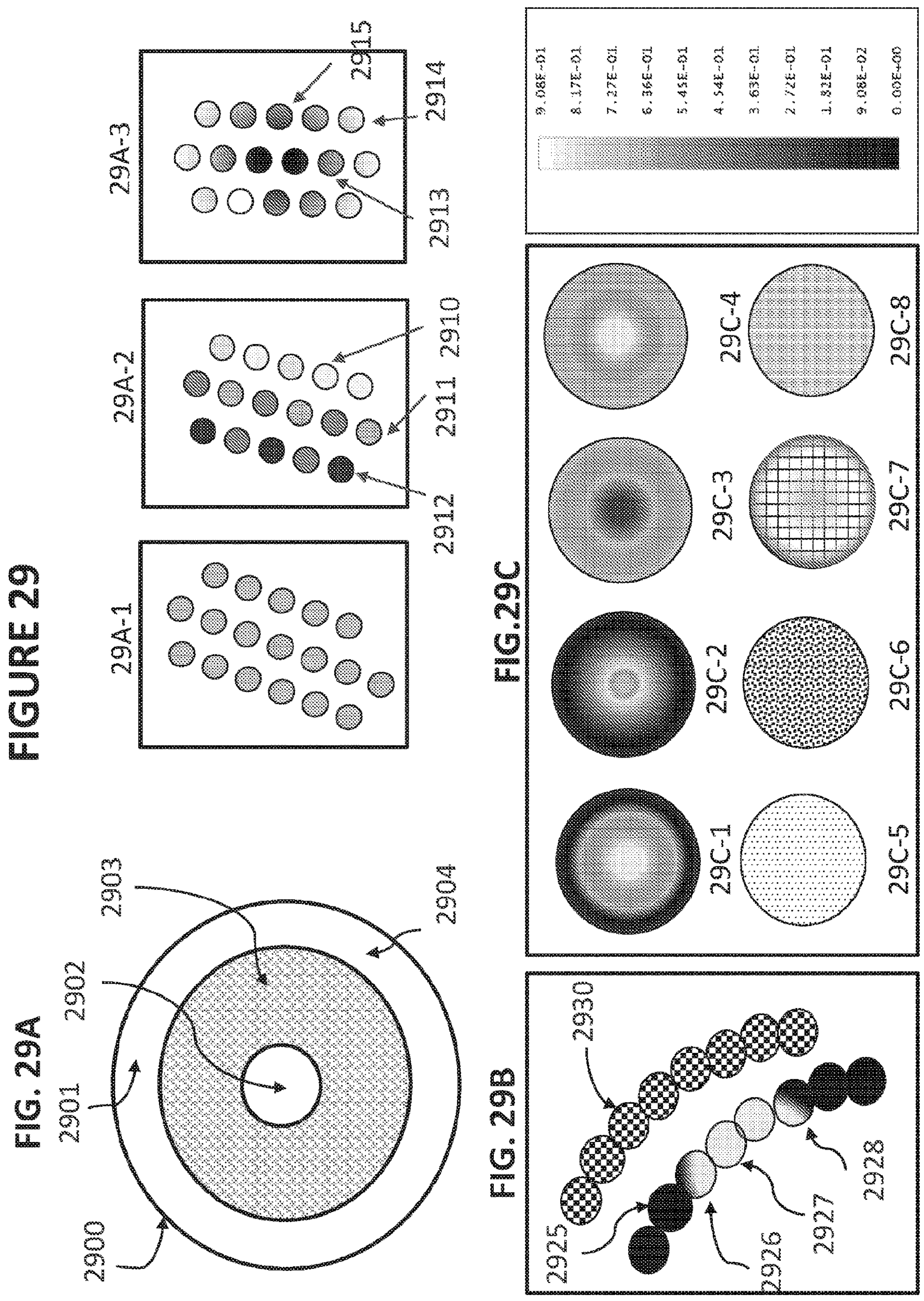

FIGS. 27-29 show plan views of several ophthalmic lenses comprising, at least in part, configurations of elements (spaced apart, conjoined, continuous) incorporating light amplitude modulation masks having binary and/or non-binary and/or gradient amplitude modulation e.g. where a light transmittance may be modulated by a value between 0 and 1 or a gradient e.g., 2 or more values of amplitude modulation. In addition to the mask, the ophthalmic lenses may have a single base power profile inclusive of the regions incorporating a mask element i.e. may not include a defocus optical power or multiple base power profiles for correcting refractive error and/or creating defocus and/or any other refractive power profile and/or may incorporate any other optical principle beneficial for vision correction and/or treating refractive error of the wearer including treating myopia progression.

FIG. 27 illustrates plan views of an ophthalmic lens 2700 (FIG. 27A) and 2720 (FIG. 27B) each comprising a gradient binary amplitude mask configuration intended to modulate the light transmittance through the respective lenses in order to modify the image quality of light passing through the mask, including for example an MTF and/or an image contrast. As shown in FIG. 27A the lens 2700 may have a front surface 2701 and a central zone 2702 and a plurality e.g. 3 annular zones 2703 to 2705 surrounded by an outer peripheral zone 2706. In this embodiment, the lens may be a single vision lens i.e., the base lens power profile may not include a defocus optical power and may be designed to correct the distance refractive error of the lens wearer, for example −3.50 D, and therefore each of the zones 2702 to 2706 on the lens 2700 may have a base power profile configured to correct a refractive error of −3.50 D. In some embodiments, the refractive error may include an astigmatic refractive error correction or correct the refractive errors of a presbyope at one or more distances between a far distance and a close work distance. In some embodiments, refractive and/or non-refractive, e.g. light scattering, optical elements that may provide retinal receptors with visual signals useful for slowing or stopping or controlling axial eye growth may be distributed across one or more zones 2702 to 2706. As shown in FIG. 27A the gradient light amplitude mask may be configured into 3 annular zones 2703 to 2705 and the degree of light amplitude modulation may be about constant within each zone and each zone may decrease in the amplitude of light transmitted toward the periphery i.e. zone 2703 may have a lower light modulation (higher transmittance and a value on the scale closer to 1) than the other 2 zones. Likewise, zone 2704 may have less light amplitude modulation (higher transmittance and a value on the scale closer to 1) than the outermost zone 2705, which may have the lowest amount of light transmittance than the other 2 zones 2703 and 2704. As shown in FIG. 27B the lens 2720 may have a front surface 2721 and a central zone 2722 and a plurality e.g. 6 annular zones 2723 to 2727 surrounded by an outer peripheral zone 2728. In this embodiment, the lens may be a single vision lens i.e., the base lens power profile may not include a defocus optical power and may be designed to correct the distance refractive error of the lens wearer, for example −3.50 D, and therefore each of the zones 2702 to 2706 on the lens 2700 may have a base power profile configured to correct a refractive error of −3.50 D. In some embodiments, the refractive error may include an astigmatic refractive error correction or correct the refractive errors of a presbyope at one or more distances between a far distance and a close work distance. In some embodiments, refractive optical elements and/or non-refractive, e.g. light scattering, optical elements that may provide retinal receptors with visual signals useful for slowing or stopping or controlling axial eye growth may be distributed across one or more zones 2722 to 2728. As shown in FIG. 27B, the front surface 2721 may be configured into 3 annular zones 2723, 2725 and 2727 each incorporating a light amplitude mask and another 3 alternate annular zones 2724, 2726 and 2728 not incorporating any amplitude mask. The 3 zones 2723, 2725 and 2727 incorporating a light amplitude mask that may be designed such that the degree of light amplitude modulation may be about constant within each zone and each more peripheral zone may decrease in the amount of light transmitted toward the periphery i.e. zone 2723 may have less light modulation (higher transmittance and a value on the scale closer to 1.0) than the other 2 zones. Likewise, zone 2725 may have less light modulation (higher transmittance and a value on the scale closer to 1.0) than the zone 2727, which may have the lowest amount of light transmittance than the other 2 zones 2723 and 2725.

FIG. 28 illustrates plan views of an ophthalmic lens 2800 (FIG. 28A) and 2820 (FIG. 28B) each comprising a continuous gradient binary amplitude mask configuration that may modulate the light amplitude transmittance through the respective lenses in order to modify the image quality of light passing through the mask, including for example an MTF and/or an image contrast. As shown in FIG. 28A the lens 2800 may have a front surface 2801 and a central zone 2802 and a peripheral zone 2803 that may continue to the lens edge 2804. In this embodiment, the lens may be a single vision lens i.e., the base lens power profile may not include a defocus optical power and may be designed to correct the distance refractive error of the lens wearer, for example −2.00 D, and therefore each of the zones 2802 and 2804 on the lens 2800 may have a base power profile configured to correct a refractive error of −2.00 D. In some embodiments, the refractive error may include an astigmatic refractive error correction or correct the refractive errors of a presbyope at one or more distances between a far distance and a close work distance. In some embodiments, refractive optical elements and/or non-refractive, e.g. light scattering, optical elements that may provide retinal receptors with visual signals useful for slowing or stopping or controlling axial eye growth may be distributed across one or more portions of the central zone 2802 and/or peripheral zone 2803. As shown in FIG. 28A the central zone 2802 is clear and free of any light amplitude modulating mask while the peripheral zone 2803 may be configured with a continuously variable gradient light amplitude mask across the zone to the lens edge 2804. The gradient mask may be designed to gradually increase from a mild level of light amplitude modulation from the edge of the clear central zone at 2805 out to the region at about 2806 and then progress more rapidly and to a moderate light amplitude modulation from 2806 out to a maximum and moderately high light amplitude modulation (i.e. less light transmittance) at the annular region, for example, located at about 2807 and thereafter decreasing more slowly to a more constant moderate value until the lens edge 2804. By continuously varying the light amplitude modulation across a lens the MTF may be more precisely controlled and tailored to provide an image quality more appropriate for a particular application. For example, in this case of a single vision lens a contrast reduction may be tailored for different spatial frequencies and thus the retinal image quality at a retinal plane may be designed to slow a progression of myopia in a progressing myope. Alternatively, in a multifocal or an extended depth of focus ophthalmic lens where simultaneous images of the multiple focal points may give rise to certain undesirable optical effects at the retinal image plane including perceived haze or a ghosting or a halo or other visual disturbances. Designing a light amplitude modulation in conjunction with the multifocal refractive error correction may be mitigate and, for example, reduce the observation of the undesirable visual effects that may arise from a portion or portions of the optical designs or optical zones, for example, a junction or a discontinuity or out of focus light. In some embodiments a light amplitude modulation may be used in conjunction, e.g. overlay, with a transition zone between an abrupt change in optical power to minimize associated optical effects, including but not limited to prismatic, refractive and/or light scattering or any combinations thereof.

As shown in FIG. 28B the lens 2820 may have a front surface 2821 and a central zone 2822 and an inner peripheral zone 2823 and an outer peripheral zone 2825 that may continue to the lens edge 2831. In this embodiment, the lens may be a single vision lens i.e. the base lens power profile may not include a defocus optical power and may be designed to correct the distance refractive error of the lens wearer, for example −2.00 D, and therefore each of the zones 2822, 2823 and 2824 on the lens 2800 may have a base power profile configured to correct a refractive error of −2.00 D. In some embodiments, the refractive error may include an astigmatic refractive error correction or correct the refractive errors of a presbyope at one or more distances between a far distance and a close work distance. In some embodiments, refractive and/or non-refractive, e.g. light scattering, optical elements that may provide retinal receptors with visual signals useful for slowing or stopping or controlling axial eye growth may be distributed across one or more zones 2822 and/or 2823 and/or 2825. As shown in FIG. 28B the central zone 2822 may comprise a plurality of spaced apart light amplitude modulating elements and the peripheral zone 2823 may be configured with a mask that may provide a variable gradient light amplitude modulation in about 5 annular portions of the zone 2823 identified by the location of the center of the annular portions at about 2826, 2827, 2828, 2829 and 2830 across the zone to the end of the inner peripheral zone 2825. The mask in peripheral zone 2823 may be considered a gradient mask and may include regions of constant light modulation, for example at 2826, 2829 and 2830 and may also include regions of gradient light amplitude modulation, for example at 2827 and 2828. The degree of light amplitude modulation may also vary across zone 2823 and may be a mild level of light amplitude modulation at portion 2826 and may be a mild-moderate and slowly progressing light amplitude modulation at about portion 2827 and also have a narrow high level of light amplitude at portion 2828 while a similar and moderate light amplitude may be modulated over the lens at portions 2829 and 2830 and the outer peripheral zone 2825 may have no light amplitude modulation.

FIG. 29A illustrates a plan view of an ophthalmic lens 2900 comprising a light amplitude modulating mask that may modulate the light transmittance through the ophthalmic lens and therefore modify the image quality formed by the ophthalmic lens, for example an MTF and an image contrast. As shown in FIG. 29A, the ophthalmic lens 2900 may have a front surface 2901 and a central zone 2902 and an inner annular peripheral zone 2903 incorporating a light amplitude mask surrounded by an outer peripheral zone 2904. In this embodiment, the lens may be a single vision lens i.e., the base lens power profile may not include a defocus optical power profile and may be designed to correct the distance refractive error of the lens wearer, for example −2.50 D, and therefore each of the zones 2902, 2903 and 2904 on the lens 2900 may have a base power profile configured to correct a distance refractive error of −2.50 D without any defocus optical power. In some embodiments, the refractive error may include an astigmatic refractive error correction or correct the refractive errors of a presbyope at one or more distances between a far distance and a close work distance. In some embodiments, the lens may include a defocus optical power in the base power profile that may be designed, at least in part, to provide a signal to retinal cell receptors to slow or stop axial elongation and therefore control the progression of myopia. For example, the light modulating mask may be used, at least in part, over a portion of the lens surface that may include other optical designs including refractive, diffractive, contrast modulating, phase-modulating, meta-surfaces, light scattering, aberrated, holographic, diffusing, light deviating or a combination of one or more elements thereof. The inner peripheral zone 2903 may incorporate a light amplitude modulating mask that may include spaced apart light amplitude modulating elements and the plurality of elements may be arranged in a pattern or an array, for example a ring or plurality of rings as shown in windows 29A-1, 29A-2 and 29A-3. The light amplitude mask in zone 2903 may be configured with spaced apart light amplitude modulating elements that may be of the same or similar light amplitude modulating value as shown in 29A-1 or at least two or more of the elements may be of a different light amplitude modulating value as shown in 29A-2, for example element 2912 has a lower light transmittance than elements 2911 and 2910. In some embodiments, as shown in 29A-3, the light amplitude mask in zone 2903 may be configured with spaced apart light amplitude modulating elements that may include at least one or more of the elements that may have a gradient of light amplitude modulation within an element, for example as shown in 29A-3, where light transmittance varies across elements 2913, 2914 and 2915. In some embodiments, the spaced apart light amplitude modulating elements may be randomly arranged in any suitable pattern or arrangement including hexagonal, square, elliptical, regular or irregular or may be offset from each other. In some embodiments, the inner peripheral zone 2903 may incorporate a light amplitude modulating mask that may include light amplitude modulating elements that may not be spaced apart and may be configured as a plurality of elements arranged in an array or pattern or clumps, for example annular rings of conjoined light amplitude modulating elements as shown in FIG. 29B, for example where elements 2926 and 2927 may be in contact. In some embodiments, for example the light amplitude modulating elements 2928 or 2930, may be partly designed without any light amplitude modulation while at least another portion of the element may block light transmittance i.e. light amplitude modulation may be binary within the element from a value of 1.0 at least in part and a value of 0 at least in part. In some embodiments, as illustrated in FIG. 29B, the individual elements may, at least in part, be designed with a gradient of light amplitude modulation i.e. in portions of the light amplitude modulating element light may be modulated to different degrees within the values of 0 and 1 and may be continuously variable at least in a portion of the element, for example as shown in for element 2928 shows a gradual change in modulation based on the grey scale changing from darker grey to very light grey. FIG. 29C illustrates further example elements 29C-1 to 29C-8 incorporating binary and/or non-binary and/or gradient light amplitude modulating masks and the masks range from spaced apart (29C-6) to a range of different gradients (29C-1, 29C-2, 29C-3, 29C-4) or spaced apart (29C-5) or with spacings offset by a controlled factor (29C-5) or overlaying (29C-7) or overlapping (29C-8). In some embodiments, the light amplitude modulating region(s) and/or light amplitude modulating elements forming a light amplitude modulating region may be configured with or without progressive light amplitude modulating gradients or may be continuously progressive within at least a portion of at least one or more elements and may be of any shape and dimension and may be arranged in any distribution including patterned or an array or random or spaced apart or conjoined. In some embodiments, the light amplitude modulating elements or features may be configured to coincide e.g. overlay at least a portion of the optical elements configured to provide a signal to retinal cell receptors to slow or stop axial elongation and therefore control the progression of myopia. In some embodiments, the light amplitude modulating elements or features may be configured to not coincide e.g. do not overlay at least a portion of the optical elements configured to provide a signal to retinal cell receptors to slow or stop axial elongation and therefore control the progression of myopia. In some embodiments, the ophthalmic lens may be configured to comprise light amplitude modulating elements or features that both coincide and not coincide at least a portion of the optical elements configured to provide a signal to retinal cell receptors to slow or stop axial elongation and therefore control the progression of myopia. In some embodiments, the optical elements distributed over a portion of the ophthalmic lens that provide a signal to retinal cell receptors to slow or stop axial elongation and therefore control the progression of myopia may include but may not be limited to optical designs including refractive, diffractive, contrast modulating, phase-modulating, meta-surfaces, light scattering, aberrated, holographic, diffusing, light deviating or a combination of one or more elements thereof. In some embodiments, the refractive optical elements may include lenslets, astigmatic or non-astigmatic annular rings that may be concentric e.g. coaxial rings, spheroidal torus, non-spheroidal torus e.g. sinusoidal or any other surface modulation by a mathematical function, or non-concentric e.g. spiral, or symmetrical or asymmetrical, or any partial annular shape e.g. incomplete rings, at least one or more sectors of a ring, regions of the lens surface or any combinations thereof.

It will be understood that the embodiments disclosed and defined in this specification extends to all alternative combinations of two or more of the individual features mentioned or evident from the text or drawings. All these different combinations constitute various alternative aspects of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. An ophthalmic lens comprising:

at least one pattern or mask which blocks and/or attenuates light by amplitude modulation;

wherein the amplitude modulation is at least one of binary or non-binary; and wherein a modulation transfer function (MTF) of the lens over a fixed portion or over an amplitude modulating shape is reduced by 10% or more or 20% or more or 30% or more.

2. The ophthalmic lens of claim 1, wherein the amplitude modulation has multiple steps wherein zero amplitude means absorption or blocking of light and a value of one means that light may be transmitted through the lens without change and a value between zero and one means only a portion of the light is attenuated or blocked.

3. The ophthalmic lens of claim 1, wherein the amplitude modulation has 2, 3, 4, 5, 6, 7, 8, 9, or 10 steps.

4. The ophthalmic lens of claim 1, wherein the amplitude modulation is continuous between zero and one.

5. The ophthalmic lens of claim 1, wherein the ophthalmic lens is one of a spectacle lens, a contact lens, a corneal onlay or inlay, an intraocular lens or a combination thereof.

6. The ophthalmic lens of claim 1, wherein the ophthalmic lens is part of an ophthalmic lens system.

7. The ophthalmic lens of claim 1, wherein the at least one pattern or mask is symmetrical.

8. The ophthalmic lens of claim 1, wherein the at least one pattern or mask is asymmetrical.

9. The ophthalmic lens of claim 1, wherein the at least one pattern or mask is localized to one or more regions of the lens.

10. The ophthalmic lens of claim 1, wherein the at least one pattern or mask is composed of shapes, concentric rings, in a form of a grid, in the form of a circular distribution, in the form of a hexagonal array, in the form of a spiral array, in the form of a rectangular array, in the form of a linear array, in the form of a non-linear array, and/or any other random or predetermined pattern.

11. The ophthalmic lens of claim 1, wherein the at least one pattern or mask forms a transmission that is uniform or not uniform.

12. The ophthalmic lens of claim 1, wherein the at least one pattern or mask is incorporated into a plurality of spaced apart shapes that are distributed over at least a portion of the lens.

13. The ophthalmic lens of claim 1, wherein one or more amplitude modulation elements are implemented across at least one of the entire lens or located within certain regions of a lens.

14. The ophthalmic lens of claim 1, wherein the ophthalmic lens is implemented within only certain portions of a diameter of an overall lens system.

15. The ophthalmic lens of claim 1, wherein the lens has a clear center zone.

16. The ophthalmic lens of claim 1, wherein the center zone contains amplitude modulation patterns.

17. The ophthalmic lens of claim 1, wherein a plurality of the amplitude modulation elements are distributed across the lens.

18. An ophthalmic lens comprising:

at least one pattern or mask which blocks and/or attenuates light by amplitude modulation;

wherein the amplitude modulation is at least one of binary or non-binary; and wherein an MTF is selectively reduced by 10% or more or 20% or more or 30% or more at low (<6 cycles/degree), medium (6-10 cycles/degree) or high (>10 cycles/degree) spatial frequencies or across one or more spatial frequencies in a uniform manner or selectively attenuated or boosted for one or more spatial frequencies.

19. An ophthalmic lens comprising:

at least one pattern or mask which blocks and/or attenuates light by amplitude modulation;

wherein the amplitude modulation is at least one of binary or non-binary; and wherein a plurality of amplitude modulation elements are patterned in an array or randomly distributed.

* * * * *